US012696208B2

(12) United States Patent
Shimoda et al.

(10) Patent No.: US 12,696,208 B2
(45) Date of Patent: Jul. 28, 2026

(54) COMMUNICATION SYSTEM AND RECEIVER

(71) Applicant: Mitsubishi Electric Corporation, Chiyoda-ku (JP)

(72) Inventors: Tadahiro Shimoda, Tokyo (JP); Mitsuru Mochizuki, Tokyo (JP); Noriyuki Fukui, Tokyo (JP); Daichi Uchino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/316,933

(22) Filed: May 12, 2023

(65) Prior Publication Data

US 2023/0284162 A1 Sep. 7, 2023

Related U.S. Application Data

(63) Continuation of application No. 17/281,510, filed as application No. PCT/JP2019/042644 on Oct. 30, 2019, now abandoned.

(30) Foreign Application Priority Data

Oct. 31, 2018 (JP) ................................. 2018-204805

(51) Int. Cl.
*H04W 56/00* (2009.01)
*H04L 1/1829* (2023.01)
(52) U.S. Cl.
CPC ......... *H04W 56/003* (2013.01); *H04L 1/1851* (2013.01); *H04W 56/0065* (2013.01); *H04W 56/0095* (2013.01)
(58) Field of Classification Search
CPC ........... H04W 56/003; H04W 56/0065; H04W 56/0095; H04L 1/1851; H04L 1/08; H04L 1/1854
See application file for complete search history.

(56) References Cited

U.S. PATENT DOCUMENTS 7,940,650 B1 5/2011 Sandhir
2010/0099429 A1* 4/2010 Ishii .................... H04W 52/365
455/522
(Continued)

FOREIGN PATENT DOCUMENTS

JP 2016-32252 A 3/2016
JP 2018-500846 A 1/2018
(Continued)

OTHER PUBLICATIONS

Japanese Patent Office, Office Action, Application No. JP2020-553994, dated Sep. 5, 2023, in 10 pages.
(Continued)

*Primary Examiner* — Christine Ng
(74) *Attorney, Agent, or Firm* — PROCOPIO, CORY, HARGREAVES & SAVITCH LLP

(57) ABSTRACT

Provided is a radio communication technology that can achieve low latency, high reliability, and low jitter characteristics. A transmitter is configured to duplicate a packet and transmit the duplicated packets. The receiver is configured to receive the duplicated packets. The receiver is configured to transfer, to an upper layer in the receiver, a first packet (1401, 1403, 1405, 1408) that is a packet received earlier out of the duplicated packets. A transfer timing that is a timing with which the first packet (1401, 1403, 1405, 1408) is transferred to the upper layer includes at least one of: a reception timing of a second packet (1402, 1404, 1406, 1407) that is a packet received later than the first packet out of the duplicated packets; and a cyclical timing (Cycle time) corresponding to a transmission cycle of the duplicated packets.

11 Claims, 40 Drawing Sheets

(56) References Cited

U.S. PATENT DOCUMENTS

| | | | | |
|---|---|---|---|---|
| 2010/0125661 A1 | 5/2010 | Perala | | |
| 2012/0127869 A1* | 5/2012 | Yin | | H04W 28/06 |
| | | | | 370/252 |
| 2012/0236776 A1* | 9/2012 | Zhang | | H04W 60/00 |
| | | | | 370/312 |
| 2016/0353416 A1 | 12/2016 | Takano | | |
| 2017/0156130 A1* | 6/2017 | Wang | | H04L 5/0048 |
| 2017/0215183 A1* | 7/2017 | Gulati | | H04L 1/1896 |
| 2017/0290017 A1* | 10/2017 | Takeda | | H04W 72/0453 |
| 2017/0303319 A1 | 10/2017 | Han | | |
| 2017/0366920 A1* | 12/2017 | Agiwal | | H04W 4/02 |
| 2018/0070264 A1 | 3/2018 | Saiwai et al. | | |
| 2018/0092067 A1* | 3/2018 | Liu | | H04W 72/52 |
| 2018/0220304 A1* | 8/2018 | Yoshino | | H04W 72/543 |
| 2018/0234973 A1* | 8/2018 | Lee | | H04W 88/04 |
| 2019/0327641 A1 | 10/2019 | Mok | | |
| 2019/0364588 A1 | 11/2019 | Lu et al. | | |
| 2019/0394786 A1* | 12/2019 | Parron | | H04W 4/46 |
| 2020/0037132 A1* | 1/2020 | Wu | | H04W 76/14 |
| 2020/0205166 A1* | 6/2020 | Huang | | H04W 76/27 |
| 2020/0221440 A1* | 7/2020 | Yasukawa | | H04W 4/70 |
| 2020/0374858 A1* | 11/2020 | Vargas | | H04B 7/0617 |
| 2021/0051536 A1 | 2/2021 | Yang et al. | | |
| 2021/0051611 A1 | 2/2021 | Xu | | |
| 2021/0136781 A1* | 5/2021 | Hosseini | | H04W 72/569 |
| 2021/0227464 A1* | 7/2021 | Kung | | H04W 52/0229 |
| 2021/0243586 A1* | 8/2021 | Osawa | | H04W 84/18 |
| 2021/0251023 A1* | 8/2021 | Phan | | H04W 4/70 |
| 2021/0321363 A1* | 10/2021 | Belleschi | | H04W 72/02 |
| 2021/0410129 A1* | 12/2021 | Freda | | H04W 72/20 |
| 2022/0007403 A1* | 1/2022 | Li | | H04W 72/20 |
| 2022/0070874 A1* | 3/2022 | Yang | | H04W 72/542 |
| 2022/0287055 A1* | 9/2022 | Lee | | H04W 72/1263 |
| 2022/0346118 A1* | 10/2022 | Wu | | H04L 1/1825 |
| 2023/0020105 A1* | 1/2023 | Shin | | H04W 72/542 |

FOREIGN PATENT DOCUMENTS

| | | | |
|---|---|---|---|
| JP | 2018-502478 A | 1/2018 |
| WO | 2016/072814 A1 | 5/2016 |
| WO | WO 2016/097459 A1 | 6/2016 |
| WO | 2016/186059 A1 | 11/2016 |
| WO | 2018/027528 A1 | 2/2018 |
| WO | 2018/145296 A1 | 8/2018 |
| WO | 2019/014892 A1 | 1/2019 |

OTHER PUBLICATIONS

Indian Office Action issued Dec. 14, 2022, in Indian Application No. 202147018585 with English translation, 7 pgs.

International Search Report issued on Dec. 17, 2019 in PCT/JP2019/042644 filed on Oct. 30, 2019.

3GPP TS 36.300 V15.2.0, 3$^{rd}$ Generation Partnership Project; Technical Specification Group Radio Access Network;. Evolved Universal Terrestrial Radio Access (E-UTRA) and Evolved Universal Terrestrial Radio Access Network (E-UTRAN); Overall description; Stage 2 (Release 15), 2018, pp. 1-357 (with cover sheet).

3GPP TSG-SA1 #42, S1-083461, "LS on HNB/HeNB Open Access Mode", Seoul, South Korea, Oct. 13-17, 2008, 3 total pages.

3GPP TR 36.814 V9.2.0, 3$^{rd}$ Generation Partnership Project; Technical Specification Group Radio Access Network; Evolved Universal Terrestrial Radio Access (E-UTRA); Further advancements for E-UTRA physical layer aspects (Release 9), 2017, pp. 1-105 (with cover sheet).

3GPP TR 36.912 V15.0.0, 3rd Generation Partnership Project; Technical Specification Group Radio Access Network; Feasibility study for Further Advancements for E-UTRA (LTE-Advanced) (Release 15), 2018, 253 total pages.

Popovski et al., "Scenarios, requirements and KPIs for 5G mobile and wireless system", ICT-317669, ICT-317669- METIS/D1.1, Version 1, 2013, pp. 1-75 (84 total pages).

3GPP TR 23.799 V14.0.0, 3$^{rd}$ Generation Partnership Project: Technical Specification Group Services and System Aspects; Study on Architecture for Next Generation System (Release 14), 2016, pp. 1-522 (with cover sheet).

3GPP TR 38.801 V14.0.0, 3$^{rd}$ Generation Partnership Project: Technical Specification Group Radio Access Network; Study on new radio access technology: Radio access architecture and interfaces (Release 14), 2017, pp. 1-91 (with cover sheet).

3GPP TR 38.802 V14.2.0, 3$^{rd}$ Generation Partnership Project; Technical Specification Group Radio Access Network; Study on New Radio Access Technology Physical Layer Aspects (Release 14), 2017, pp. 1-144 (with cover sheet).

3GPP TR 38.804 V14.0.0, 3$^{rd}$ Generation Partnership Project; Technical Specification Group Radio Access Network; Study on New Radio Access Technology; Radio Interface Protocol Aspects (Release 14), 2017, pp. 1-57 (with cover sheet).

3GPP TR 38.912 V14.1.0, 3$^{rd}$ Generation Partnership Project: Technical Specification Group Radio Access Network; Study on New Radio (NR) access technology (Release 14), 2017, pp. 1-74 (with cover sheet).

3GPP TSG RAN Meeting #77, RP-172115 (revision of RP-172109), "Revised WID on New Radio Access Technology", Sapporo, Japan, Sep. 11-14, 2017, 48 total pages.

3GPP TS 37.340 V15.2.0, 3$^{rd}$ Generation Partnership Project; Technical Specification Group Radio Access Network; Evolved Universal Terrestrial Radio Access (E-UTRA) and NR; Multi-connectivity; Stage 2 (Release 15), 2018, pp. 1-55 (with cover sheet).

3GPP TS 38.211 V15.2.0, 3$^{rd}$ Generation Partnership Project; Technical Specification Group Radio Access Network; NR; Physical channels and modulation (Release 15), 2018, pp. 1-93 (with cover sheet).

3GPP TS 38.213 V15.2.0, 3$^{rd}$ Generation Partnership Project; Technical Specification Group Radio Access Network; NR; Physical layer procedures for control (Release 15), 2018, pp. 1-98 (with cover sheet).

3GPP TS 38.214 V15.2.0, 3$^{rd}$ Generation Partnership Project; Technical Specification Group Radio Access Network; NR; Physical layer procedures for data (Release 15), 2018, pp. 1-95 (with cover sheet).

3GPP TS 38.300 V15.2.0, 3$^{rd}$ Generation Partnership Project; Technical Specification Group Radio Access Network; NR; NR and NG-RAN Overall Description; Stage 2 (Release 15), 2018, pp. 1-87(with cover sheet).

3GPP TS 38.321 V15.2.0, 3$^{rd}$ Generation Partnership Project; Technical Specification Group Radio Access Network; NR; Medium Access Control (MAC) protocol specification (Release 15), 2018, pp. 1-73 (with cover sheet).

3GPP TS 38.212 V15.2.0, 3$^{rd}$ Generation Partnership Project; Technical Specification Group Radio Access Network; NR; Multiplexing and channel coding (Release 15), 2018, pp. 1-94 (with cover sheet).

3GPP RP-161266, 5G Architecture Options—Full Set, Joint RAN/SA Meeting, Jun. 14, 2016, Busan, Deutsche Telekom AG, pp. 1-11 (with cover sheet).

3GPP TSG-RAN#80, RP-180974, "Release 16 NR URLLC Enhancements: Company positions on technical proposals", La Jolla, CA, USA, Jun. 11-14, 2018, pp. 1-23 (with cover sheet).

3GPP TSG-RAN#80, RP-181469, "New WID on DC and CA enhancements (NR_DCCA_Enh)", La Jolla, CA, USA, Jun. 11-14, 2018, 7 total pages.

3GPP TSG RAN Meeting #81, RP-182111 (Revision of RP-182080), "Revised SID: Study on NR V2X", Gold Coast, Australia, Sep. 10-13, 2018, 7 total pages.

3GPP TR 22.804 V16.1.0, 3$^{rd}$ Generation Partnership Project; Technical Specification Group Services and System Aspects; Study on Communication for Automation in Vertical Domains (Release 16), 2018, pp. 1-189 (with cover sheet).

3GPP TS 36.321 V15.2.0, 3$^{rd}$ Generation Partnership Project; Technical Specification Group Radio Access Network; Evolved Universal Terrestrial Radio Access (E-UTRA); Medium Access Control (MAC) protocol specification (Release 15), 2018, pp. 1-126 (with cover sheet).

(56) References Cited

OTHER PUBLICATIONS

3GPP RAN #73, RP-161788, Revision of RP-161504, "V2V Work Item Completion", New Orleans, LA, USA, Sep. 19-22, 2016, pp. 1-3 (with cover sheet).

3GPP TS 38.331 V15.2.1, $3^{rd}$ Generation Partnership Project; Technical Specification Group Radio Access Network; NR; Radio Resource Control (RRC) protocol specification (Release 15), 2018, pp. 1-303 (with cover sheet).

3GPP TS 36.213 V15.3.0, $3^{rd}$ Generation Partnership Project; Technical Specification Group Radio Access Network; Evolved Universal Terrestrial Radio Access (E-UTRA); Physical layer procedures (Release 15), 2018, 541 total pages.

European Patent Office, Extended European Search Report, Application No. 23196356.2, dated Dec. 1, 2023, in 10 pages.

InterDigital Inc., 3GPP TSG RAN WG1 Meeting #94bis, "Support of NR Sidelink Unicast and Groupcast", R1-1811209, pp. 1-5, Sep. 29, 2018.

Rafael Molina-Masegosa and Javier Gozalvez, "LTE-V for Sidelink 5G V2X Vehicular Communications: A New 5G Technology for Short-Range Vehicle-to-Everything Communications", IEEE Vehicular Technology Magazine, pp. 30-39, vol. 12, No. 4, Dec. 1, 2017.

OPPO, 3GPP TSG-RAN2#99 "Discussion on measurement configuration enhancement in Inactive state", R2-I708367, Aug. 21-25, 2017, in 5 pages.

The Japanese Office Action dated Nov. 19, 2024 in Japanese Application No. 2024-002294 and a computer generated English translation obtained from the JPO, in 8 pages.

Huawei, HiSilicon, 3GPP TSG RAN WG1 Meeting #94bis "UE power consumption reduction in RRM measurements", RI-1810156, Oct. 8-12, 2018, in 4 pages.

European Patent Office, Office Action, Application No. 23 196 356.2, dated Jul. 21, 2025, in 8 pages.

European Patent Office, Office Action, Application No. 23 169 356.2, dated Jul. 21, 2025, in 8 pages.

Japanese Patent Office, Notice of Reasons for Refusal, Application No. 2025-005941, issued Nov. 4, 2025, in 5 pages.

Japanese Patent Office, Office Action, Application No. 2025-005941, issued on Mar. 24, 2026, in 7 pages.

* cited by examiner

F I G. 1
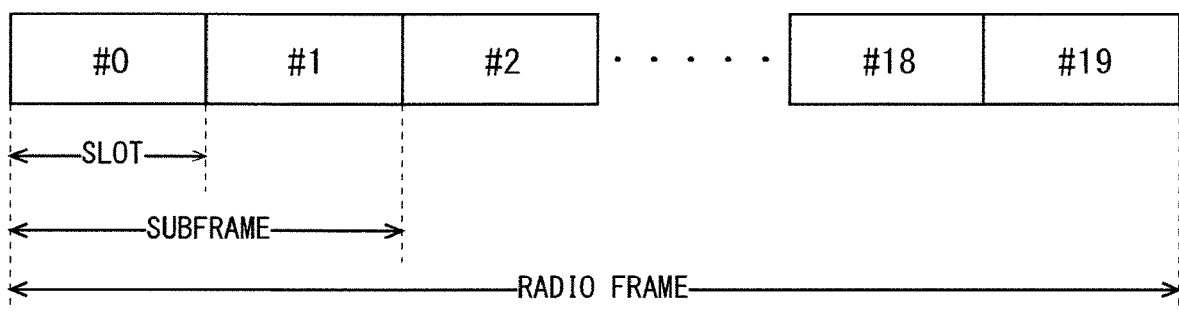

F I G. 2
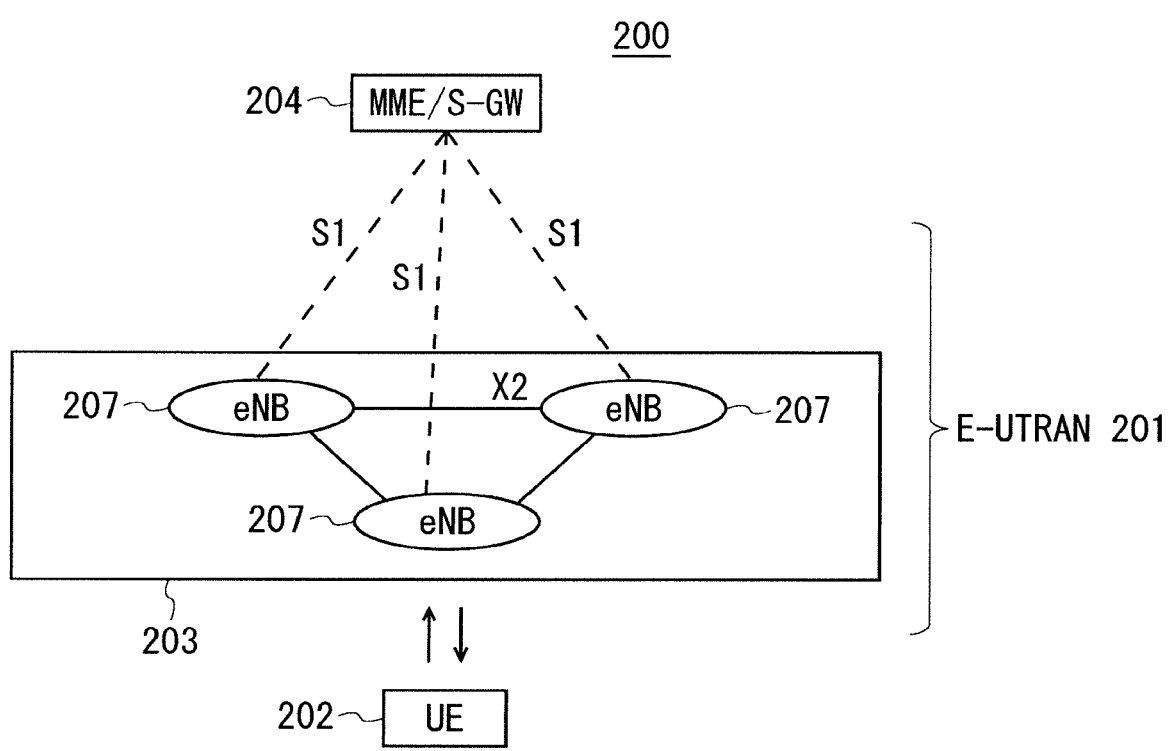

F I G. 3
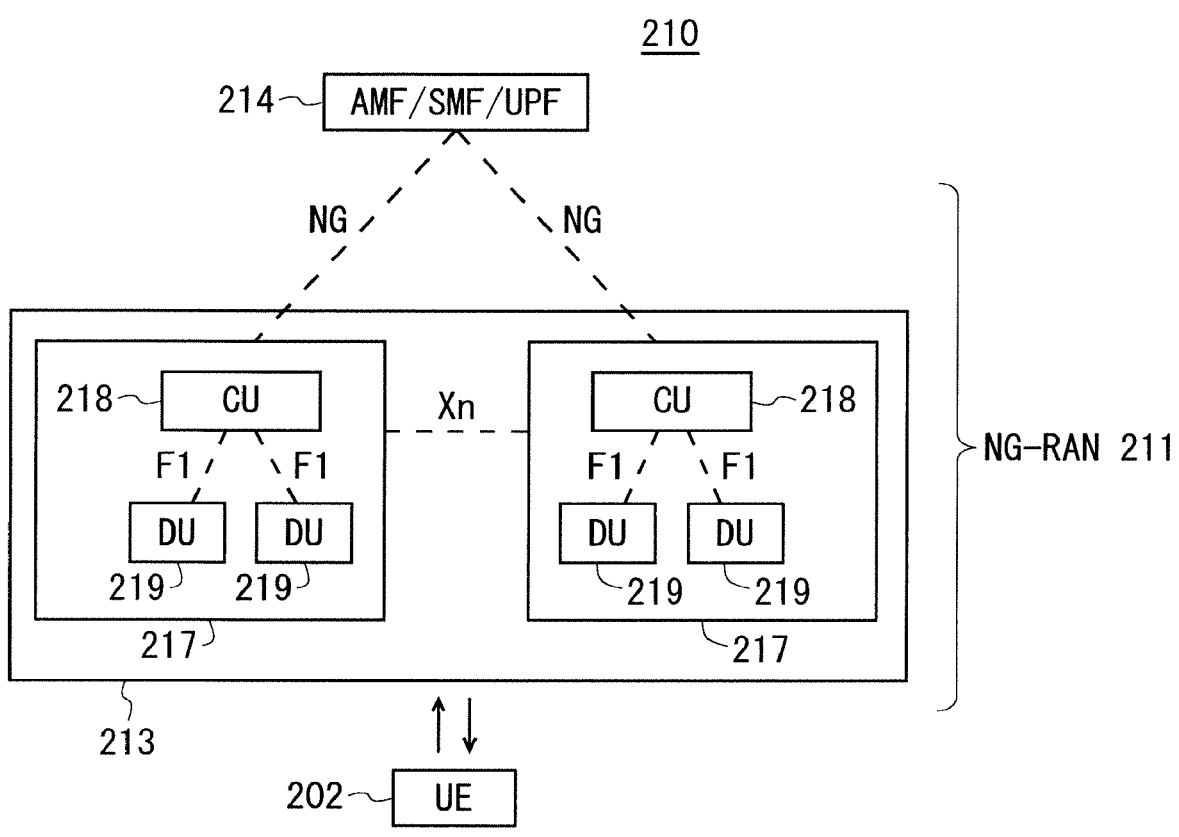

F I G.  4
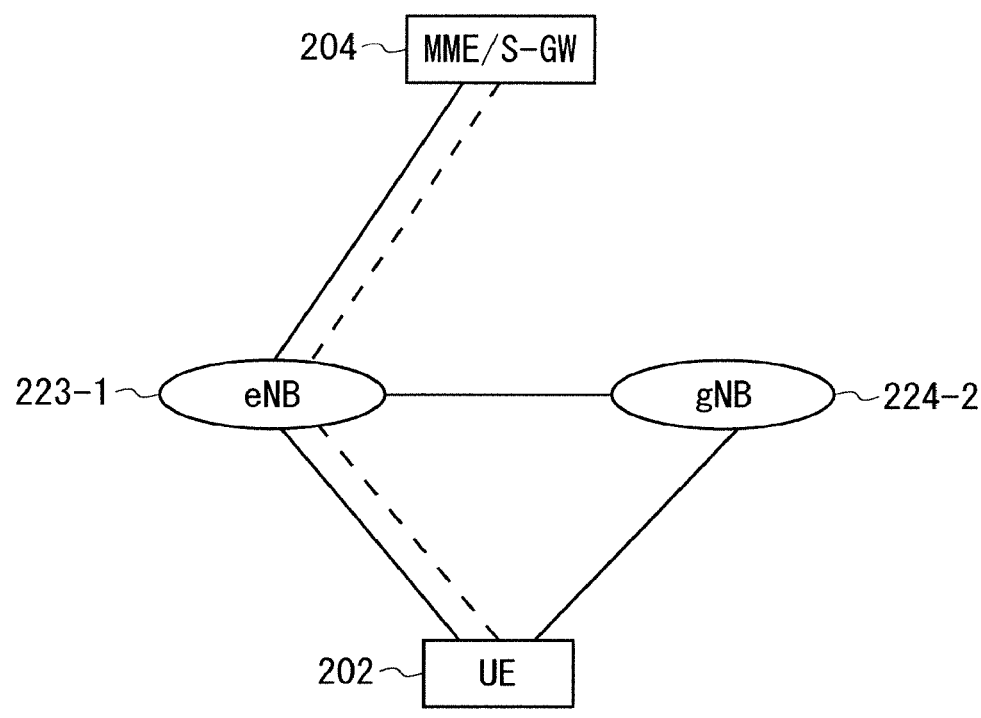

F I G.  5
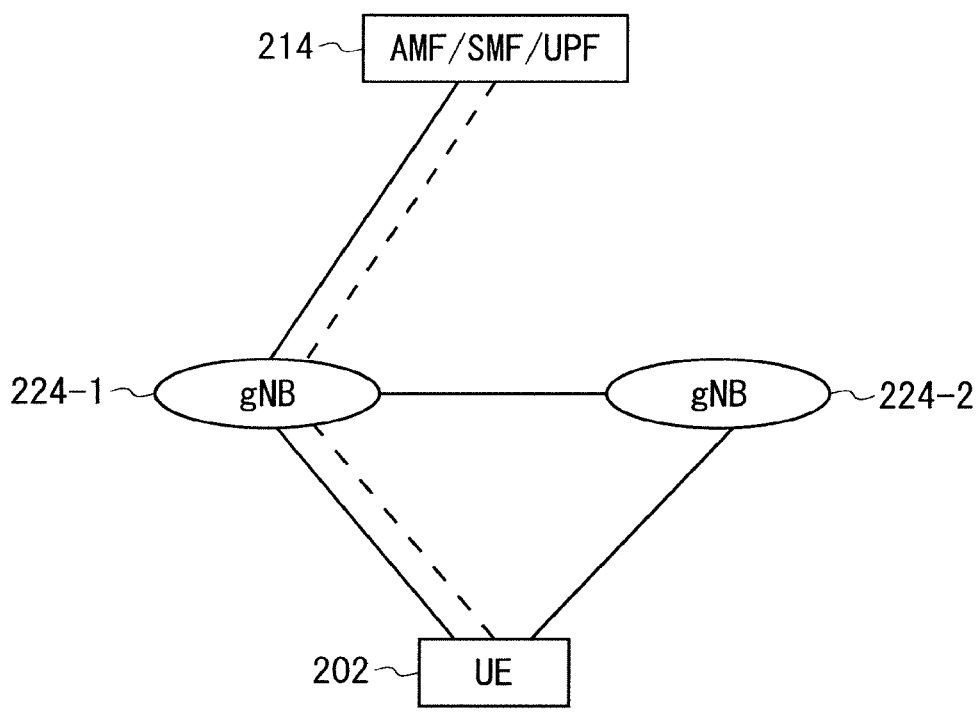

F I G. 6
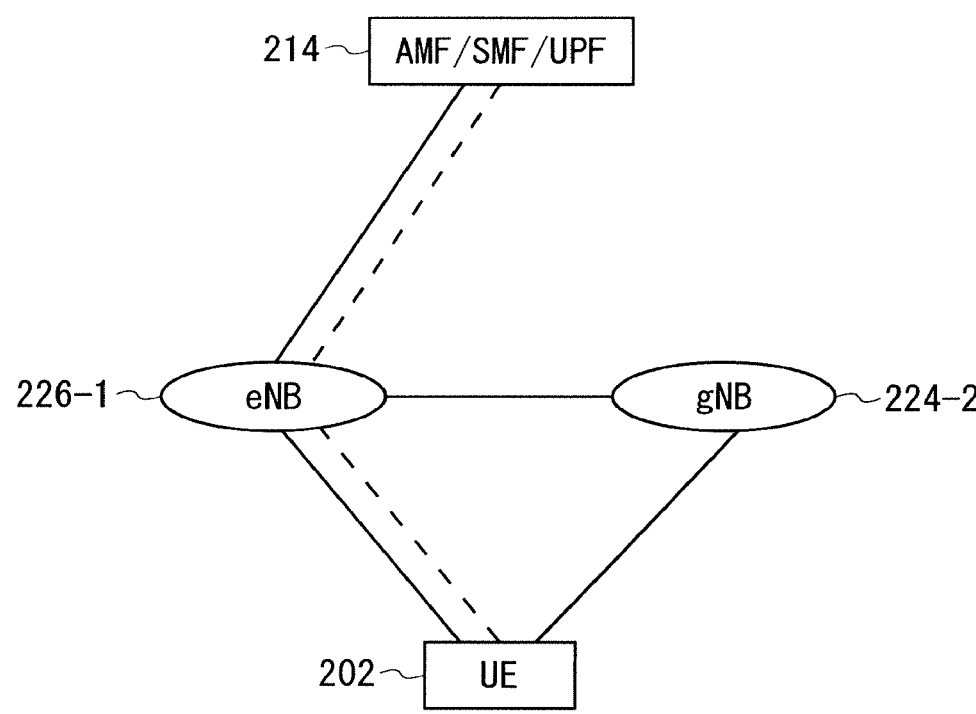

F I G.  7
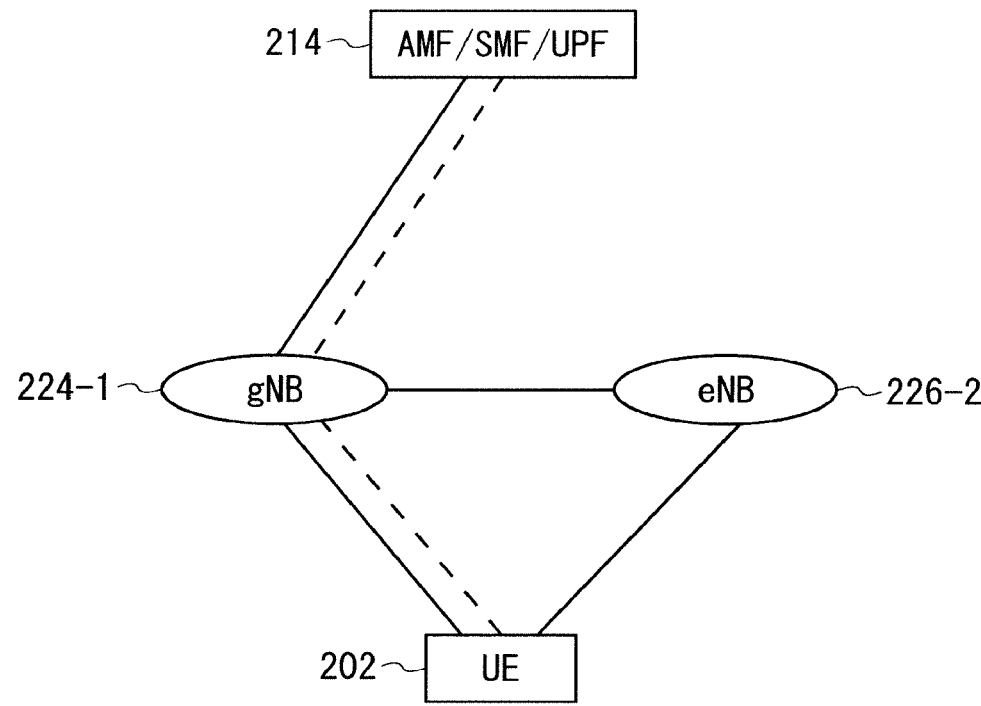

F I G. 8
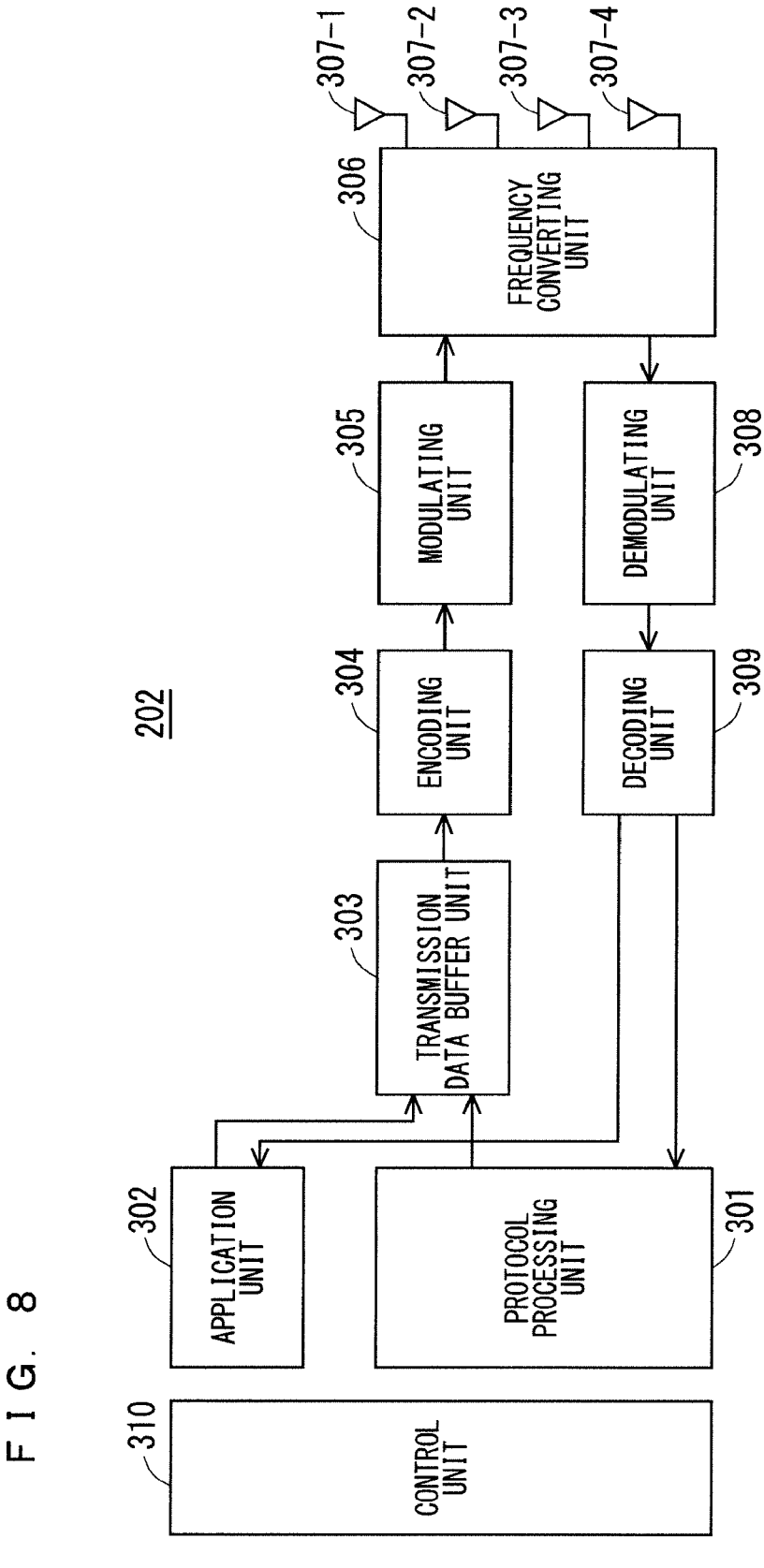

F I G. 9
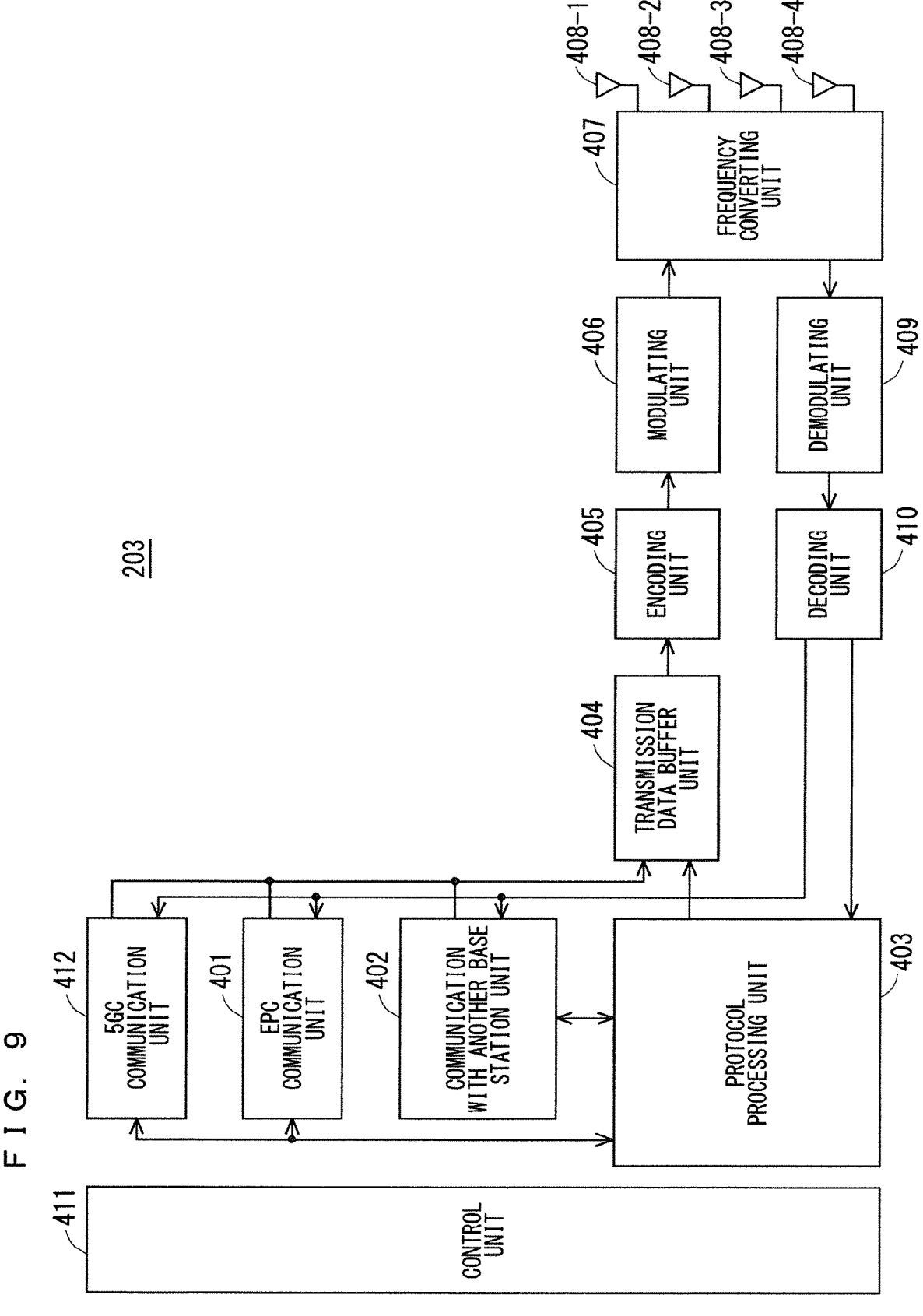

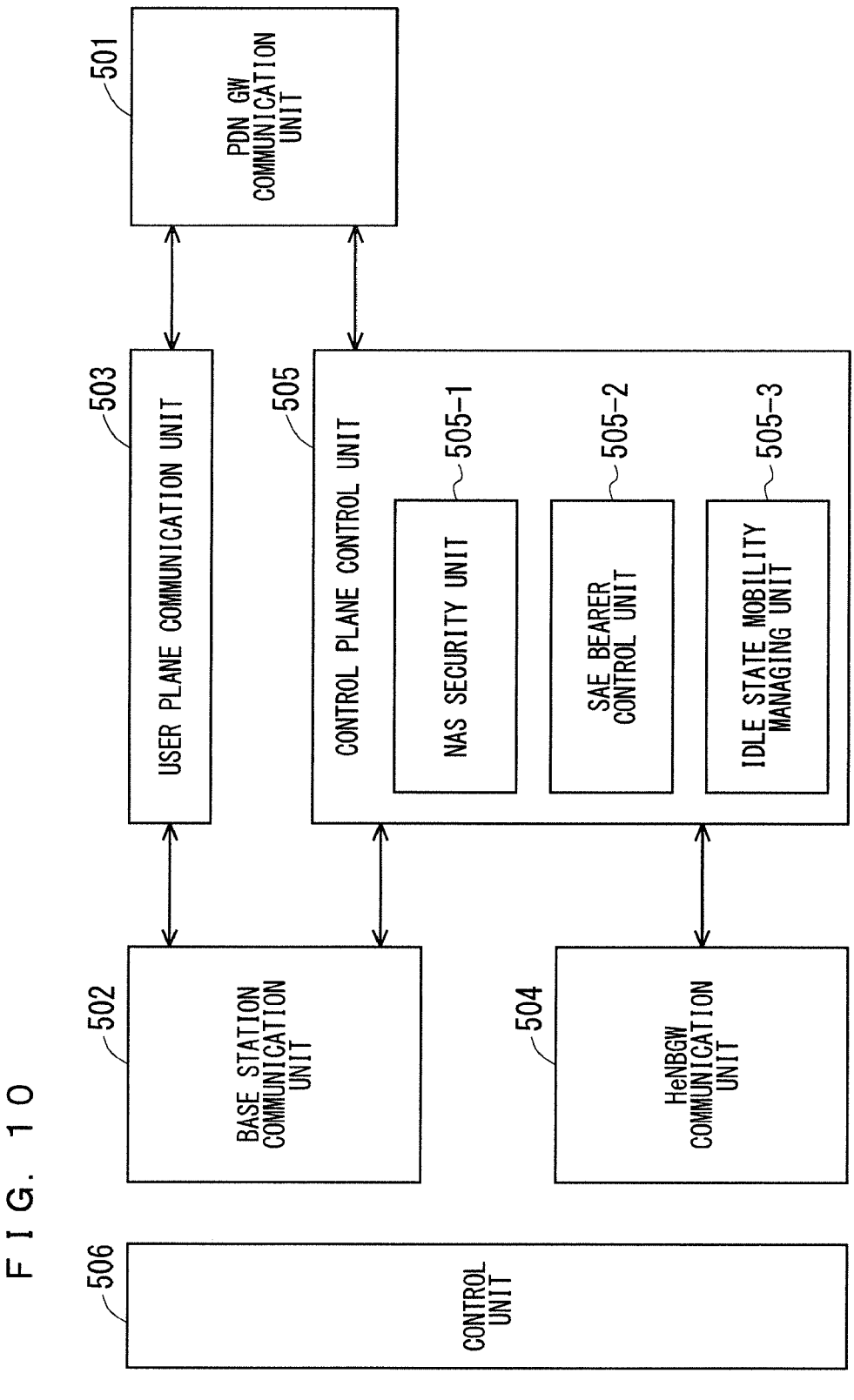
F I G. 1 0

F I G. 1 1
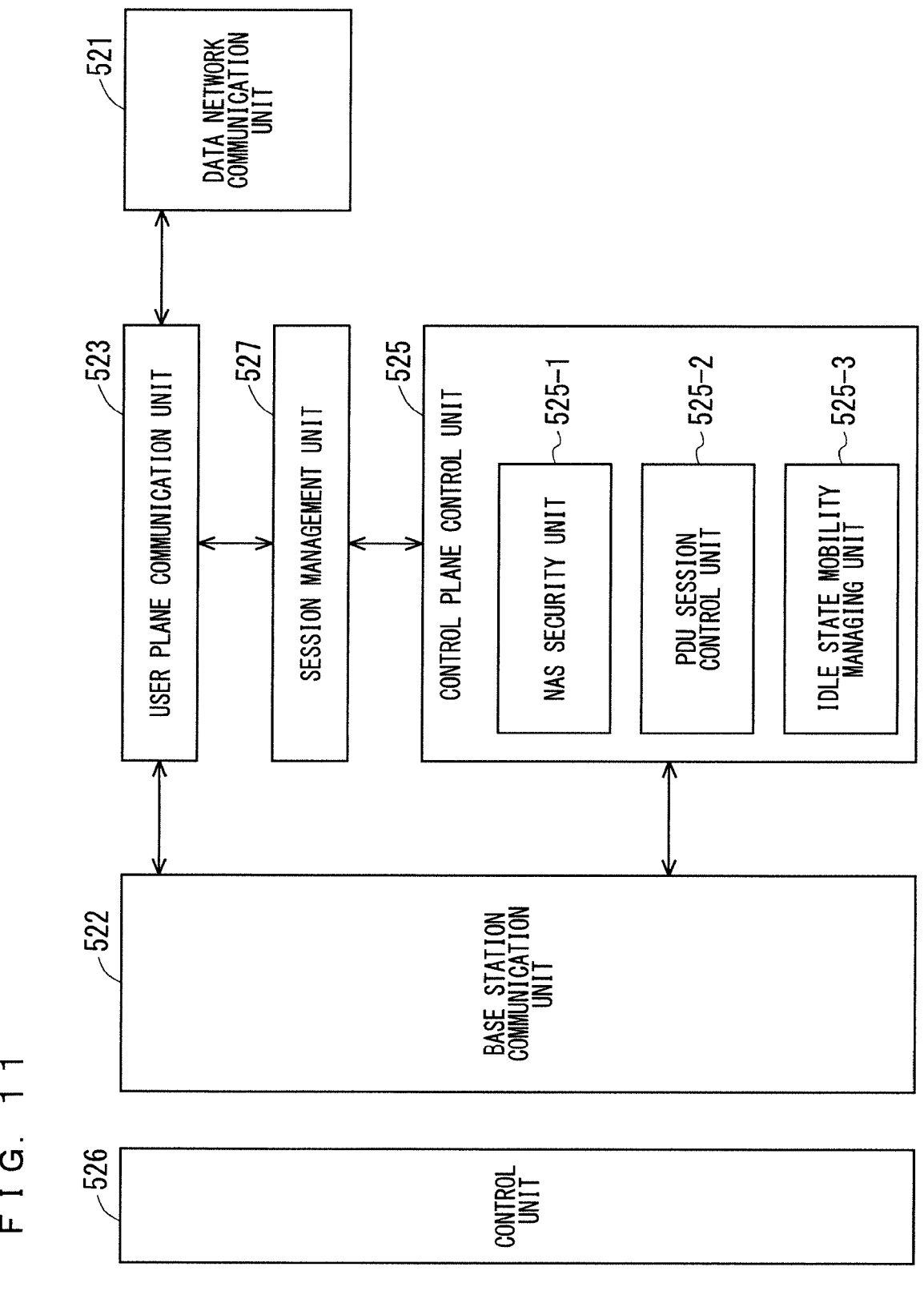

F I G. 1 2
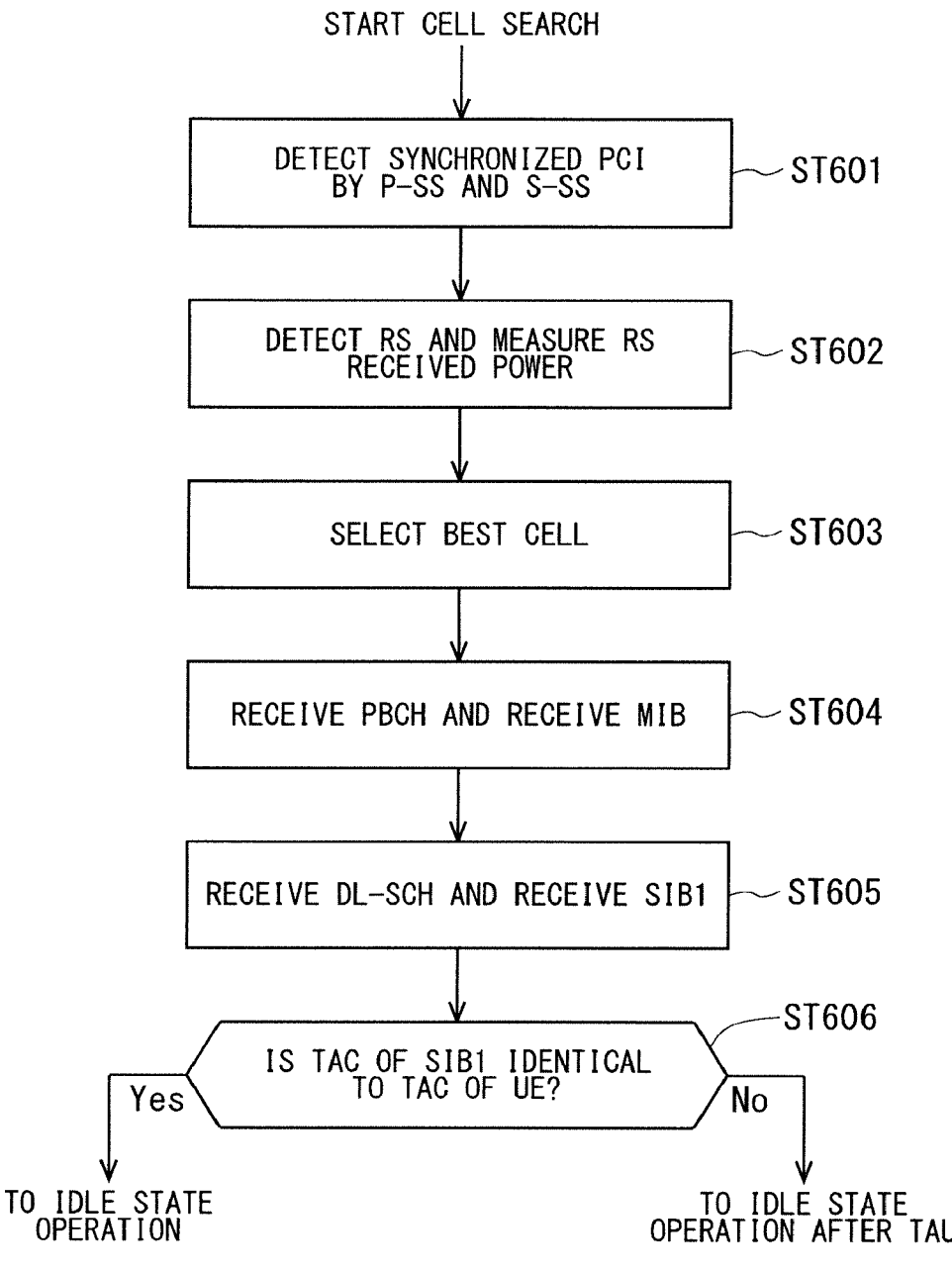
START CELL SEARCH
DETECT SYNCHRONIZED PCI
BY P–SS AND S–SS — ST601
DETECT RS AND MEASURE RS
RECEIVED POWER — ST602
SELECT BEST CELL — ST603
RECEIVE PBCH AND RECEIVE MIB — ST604
RECEIVE DL–SCH AND RECEIVE SIB1 — ST605
IS TAC OF SIB1 IDENTICAL
TO TAC OF UE? — ST606
Yes          No
TO IDLE STATE
OPERATION
TO IDLE STATE
OPERATION AFTER TAU F I G .  1 3
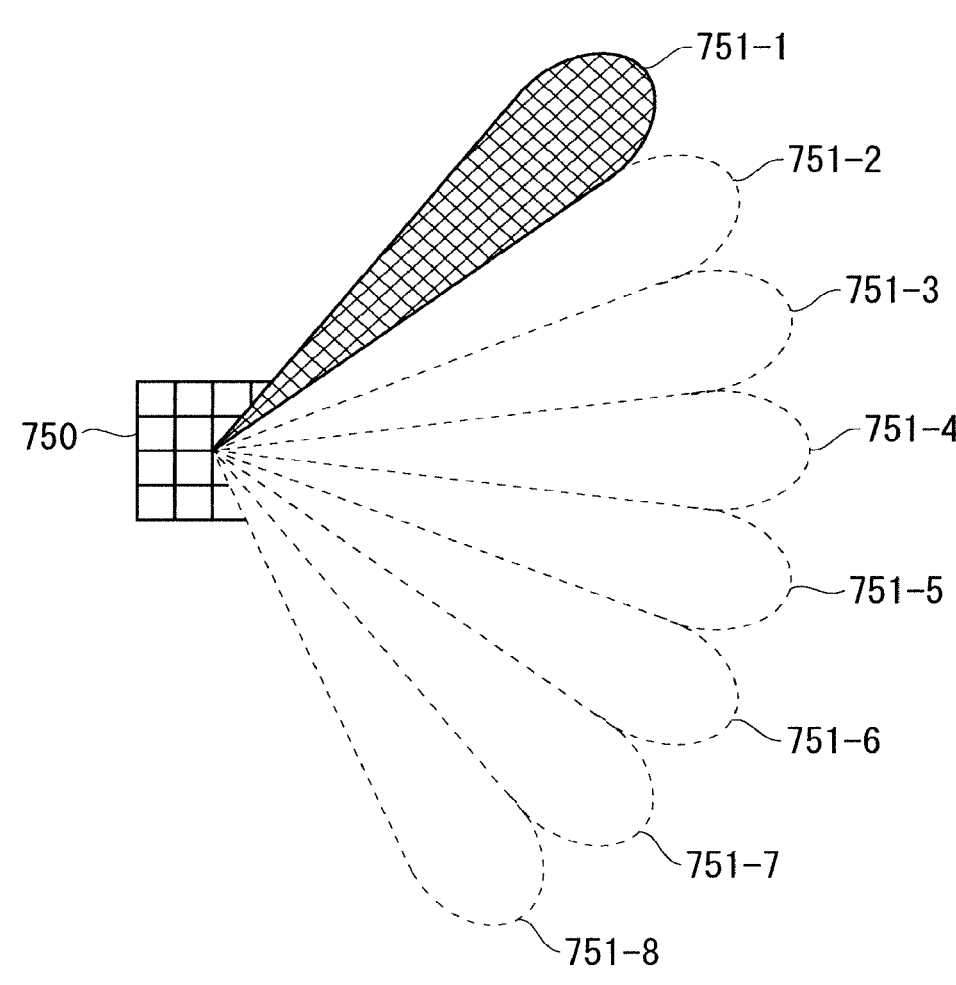

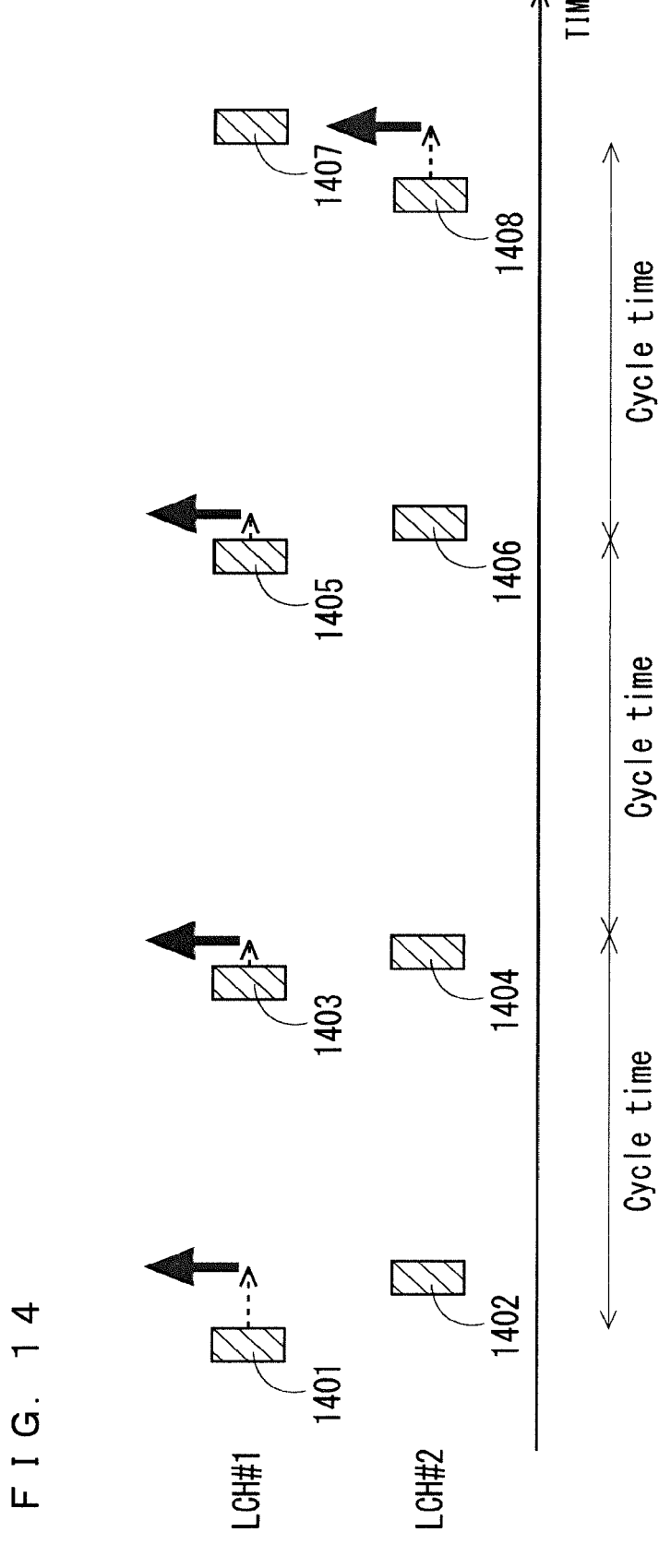
F I G. 1 4

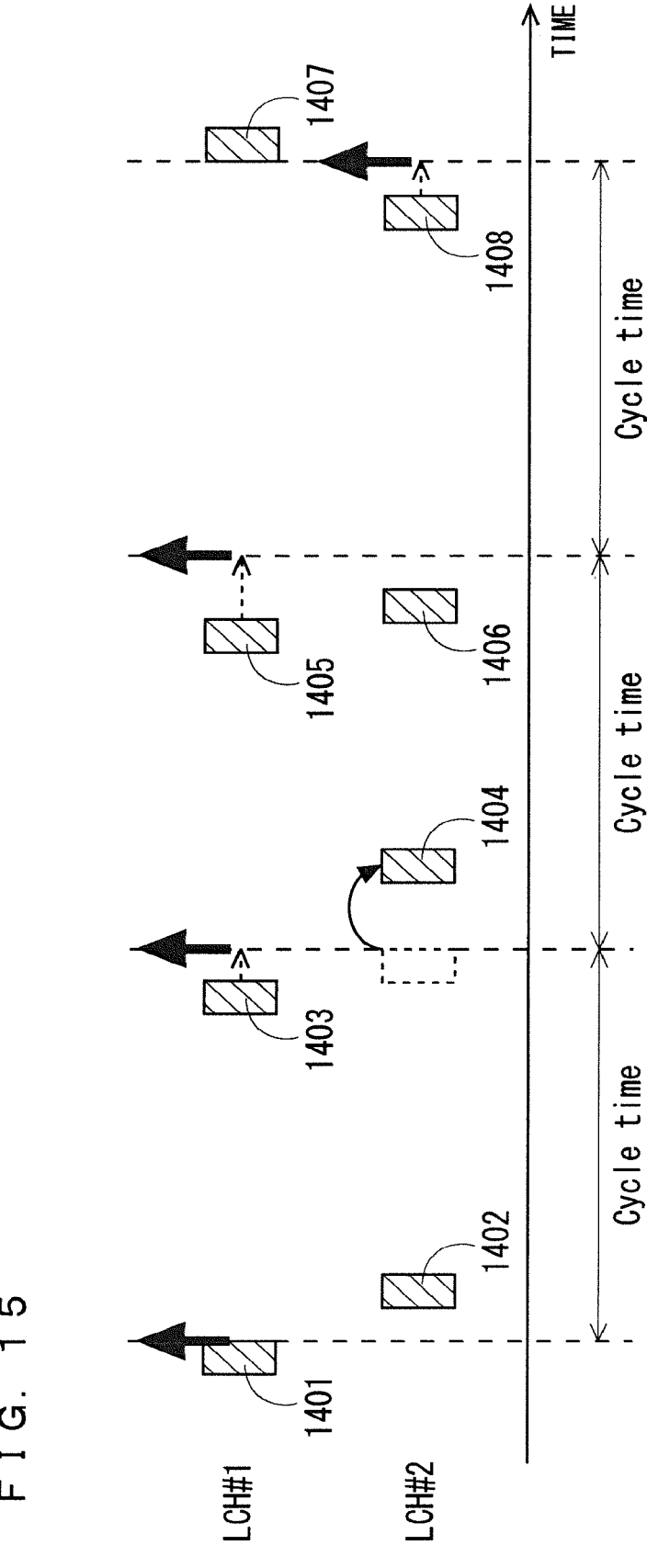
F I G. 1 5

F I G. 1 6

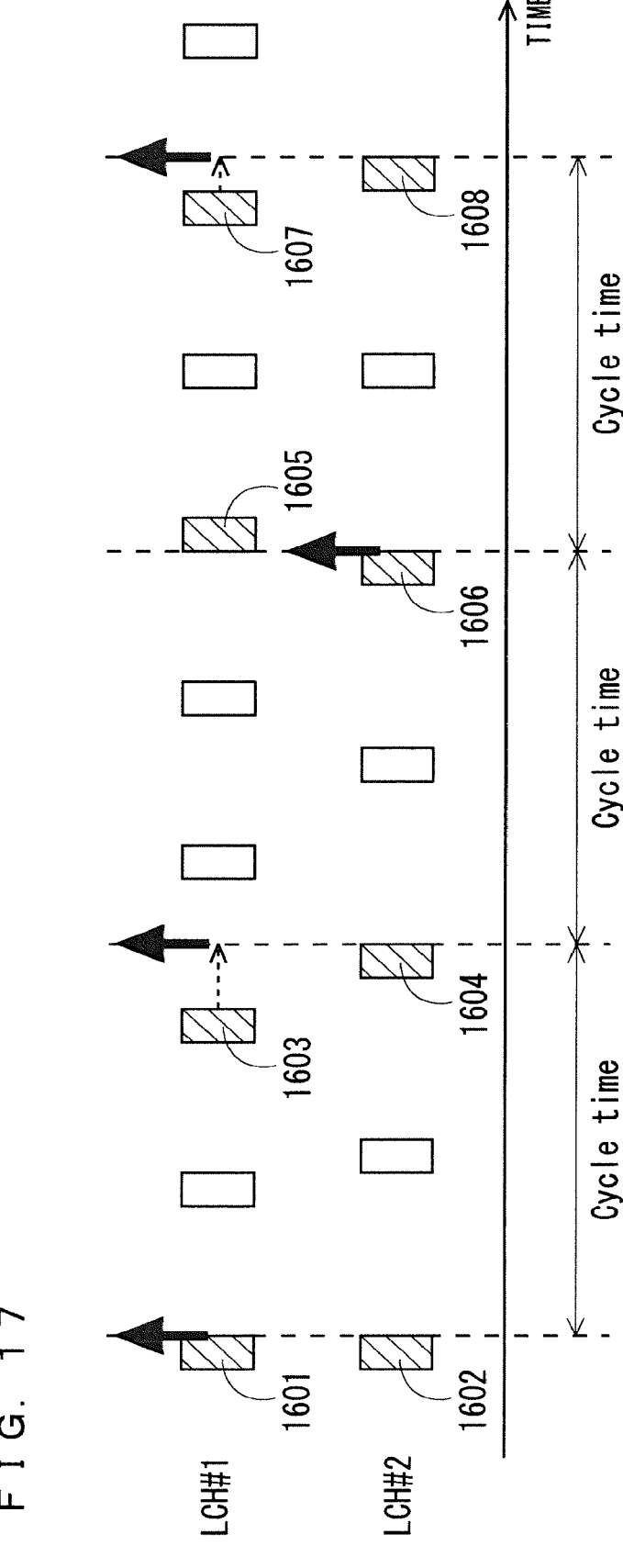
F I G. 17

F I G.   1 8
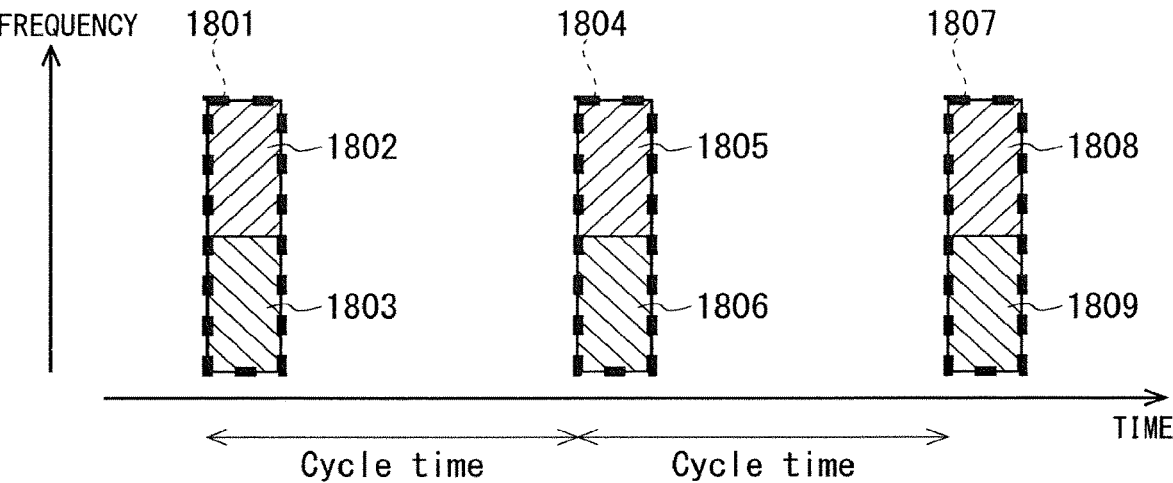

F I G.  1 9
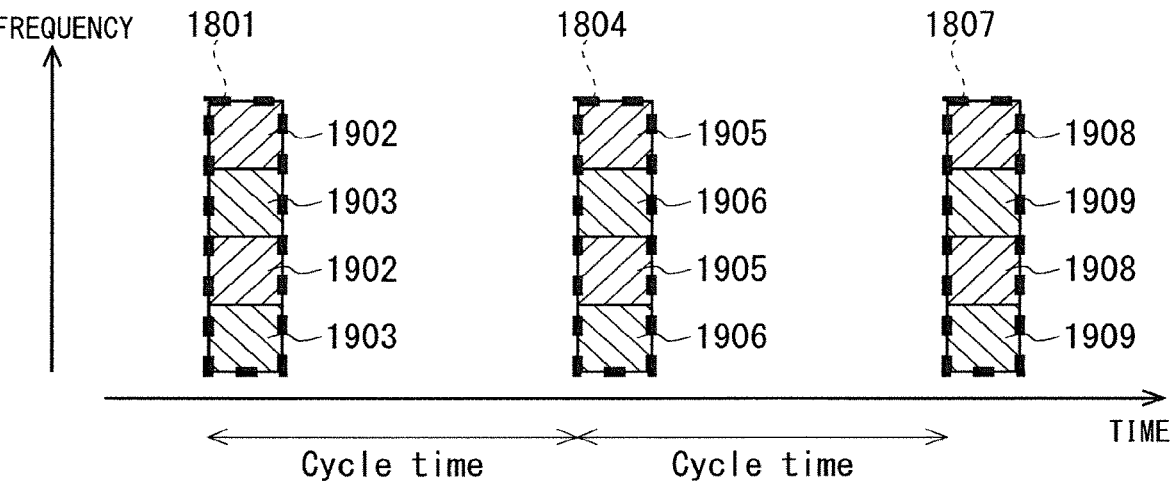

F I G. 2 0
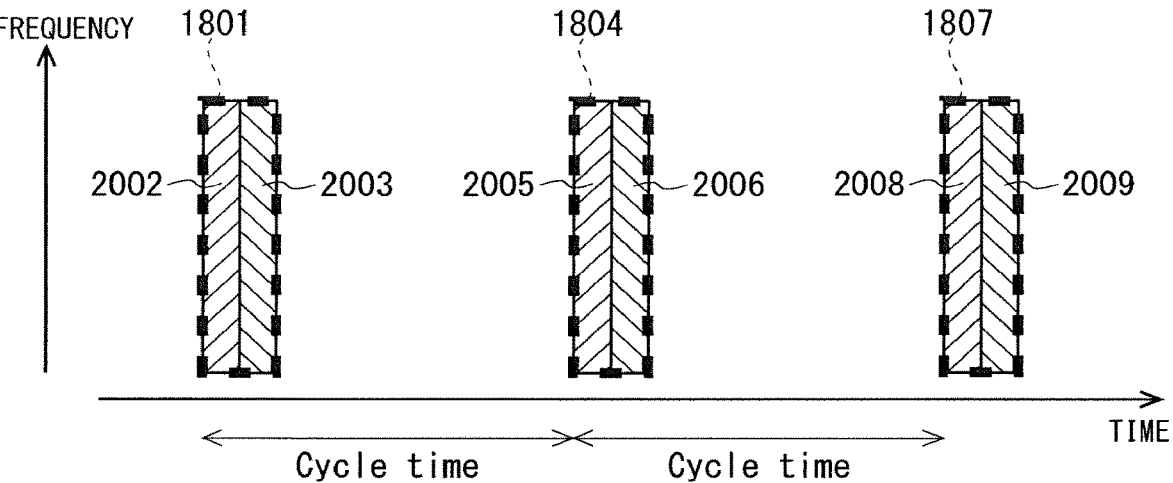

F I G.  2 1
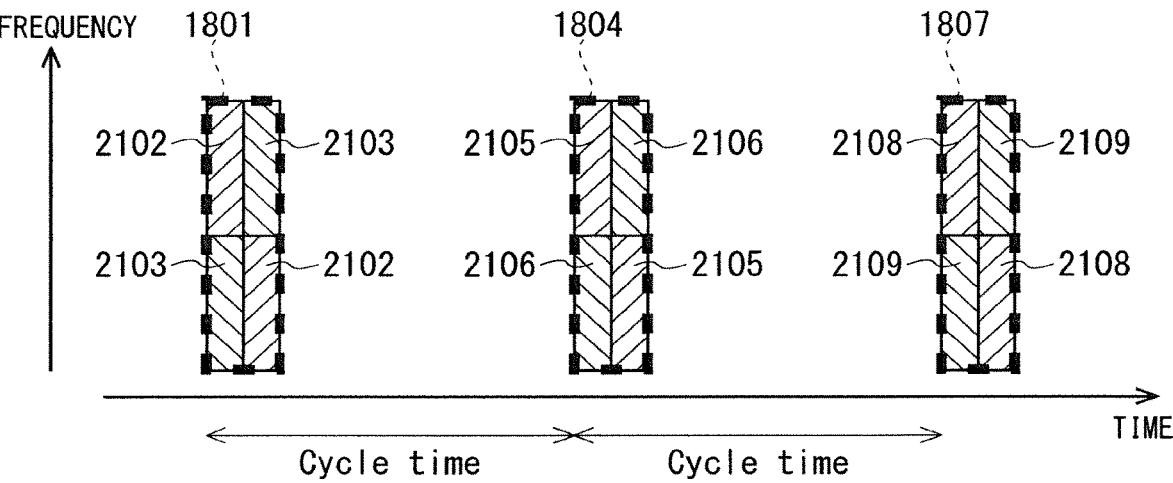

F I G. 2 2

F I G.  2 3
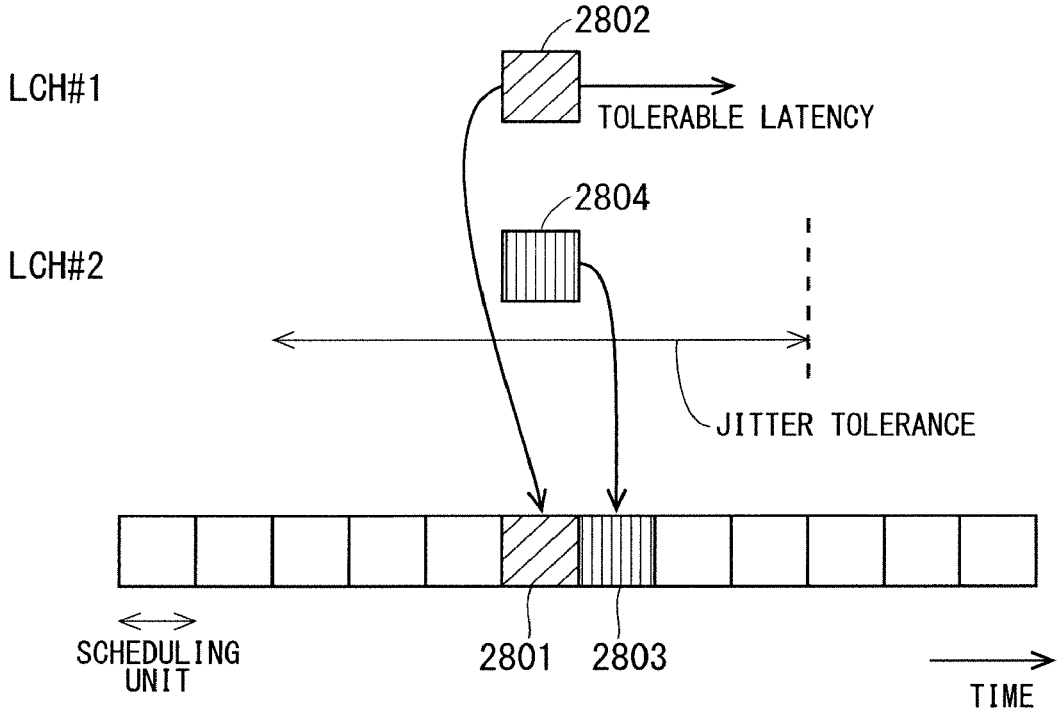

F I G .  2 4
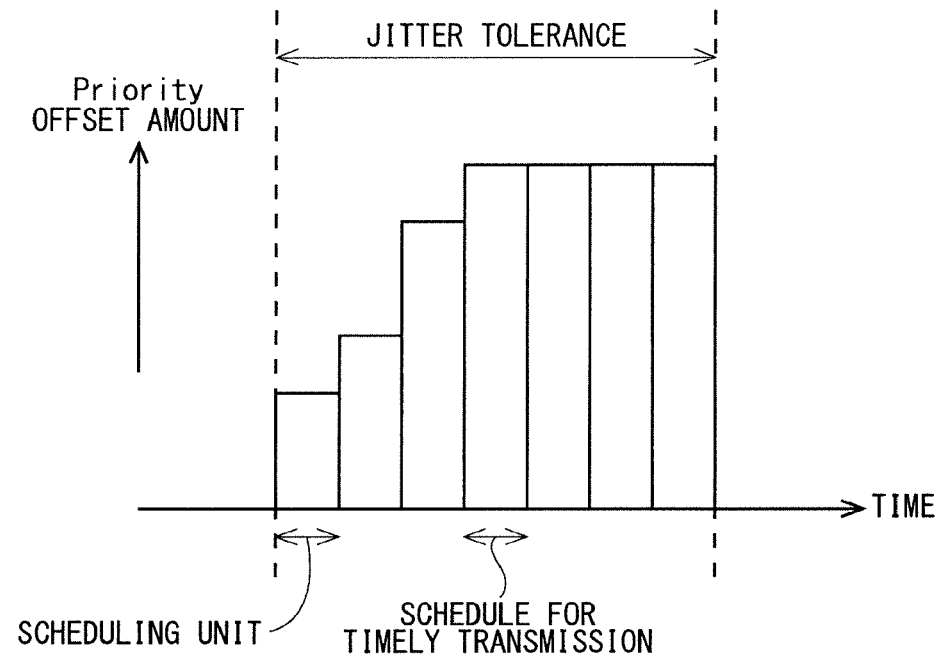

F I G.  2 5
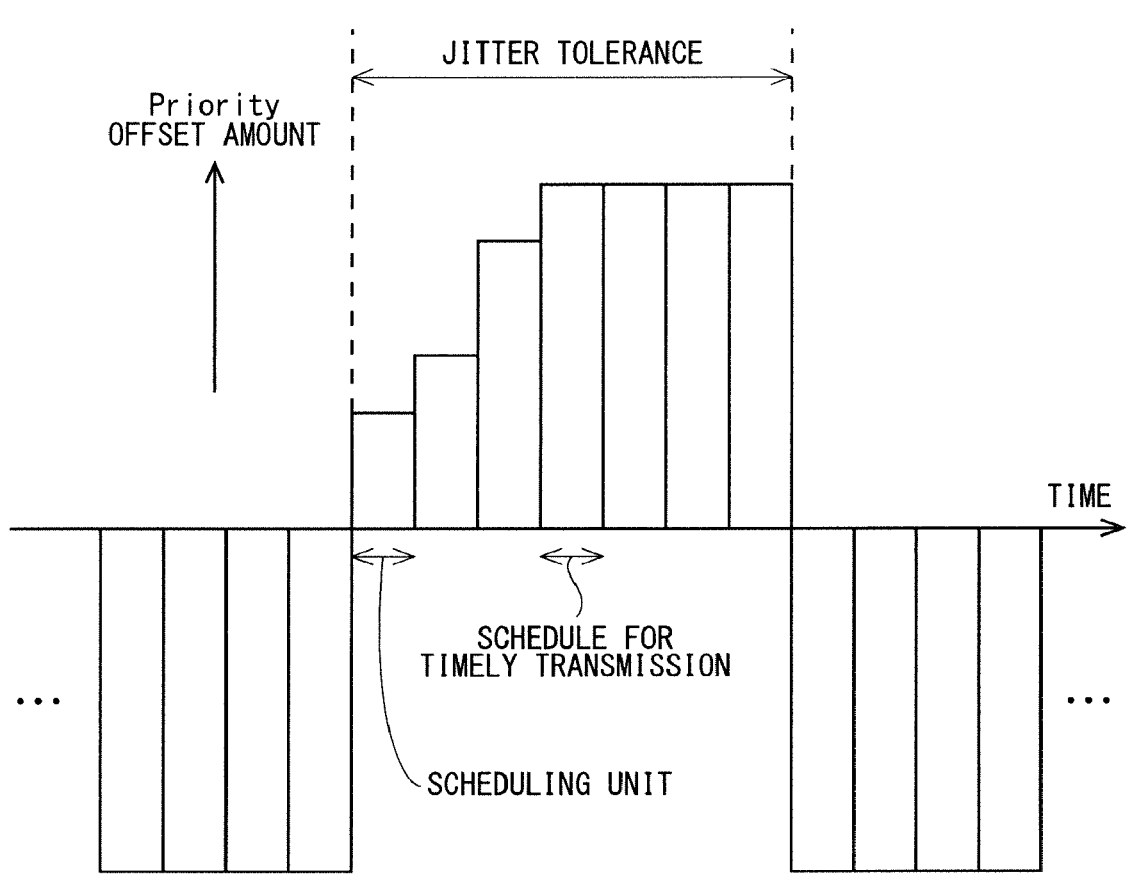

F I G .   2 6
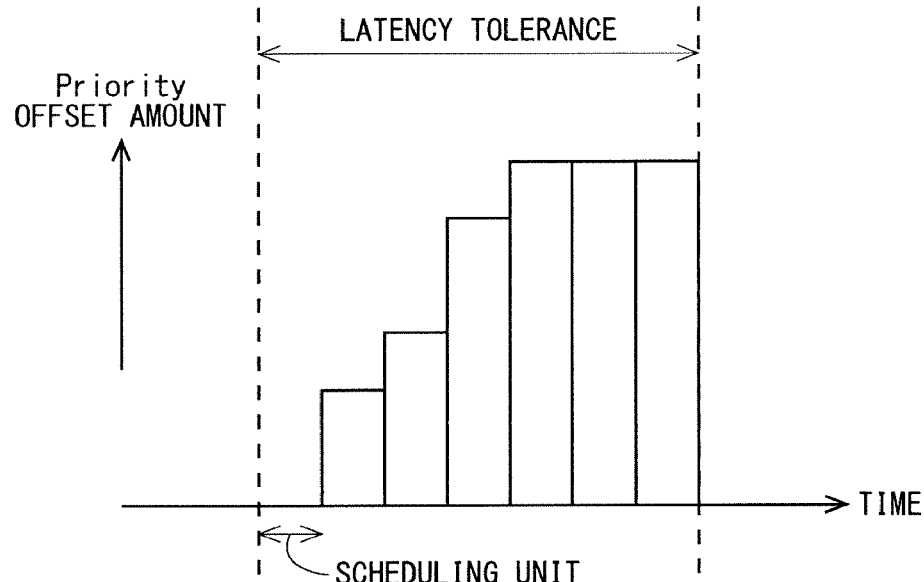

F I G.  2 7
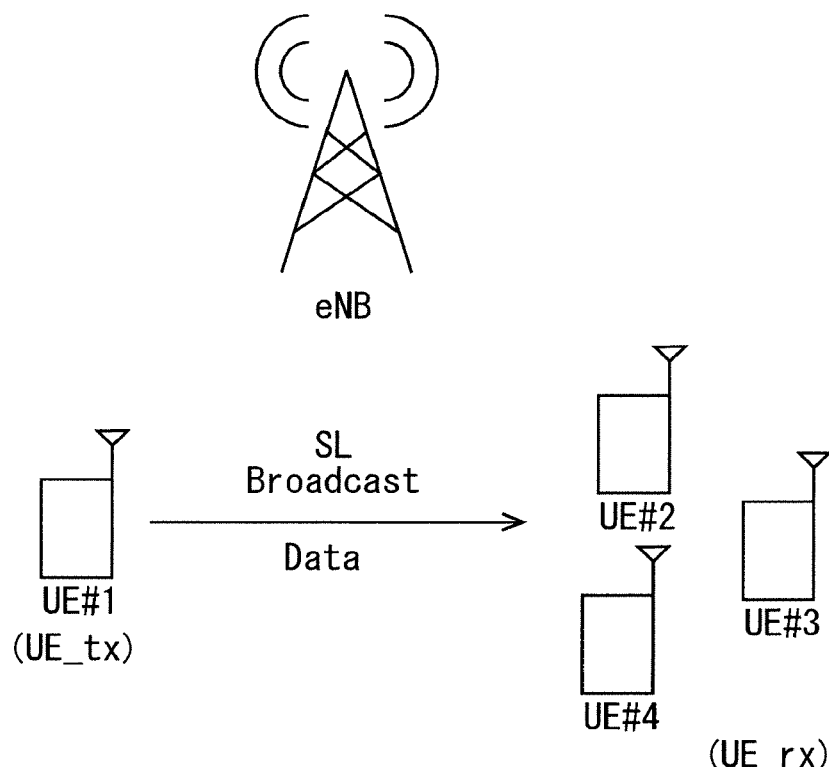

F I G.　2 8
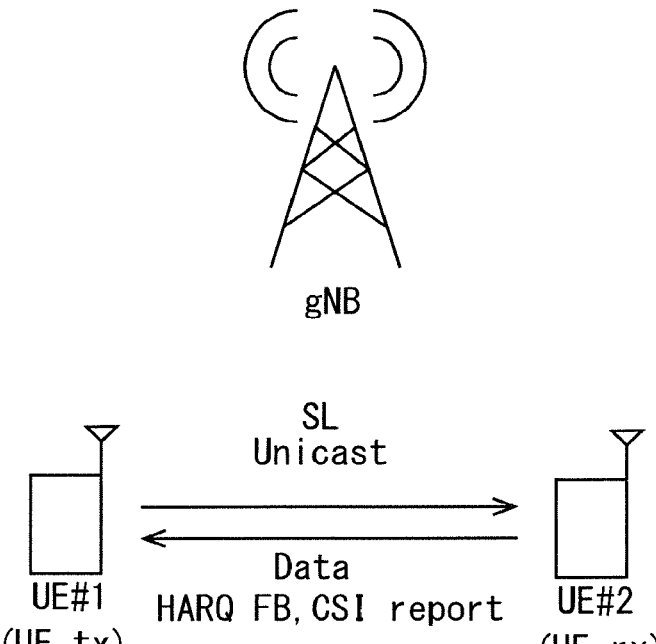

F I G.  2 9
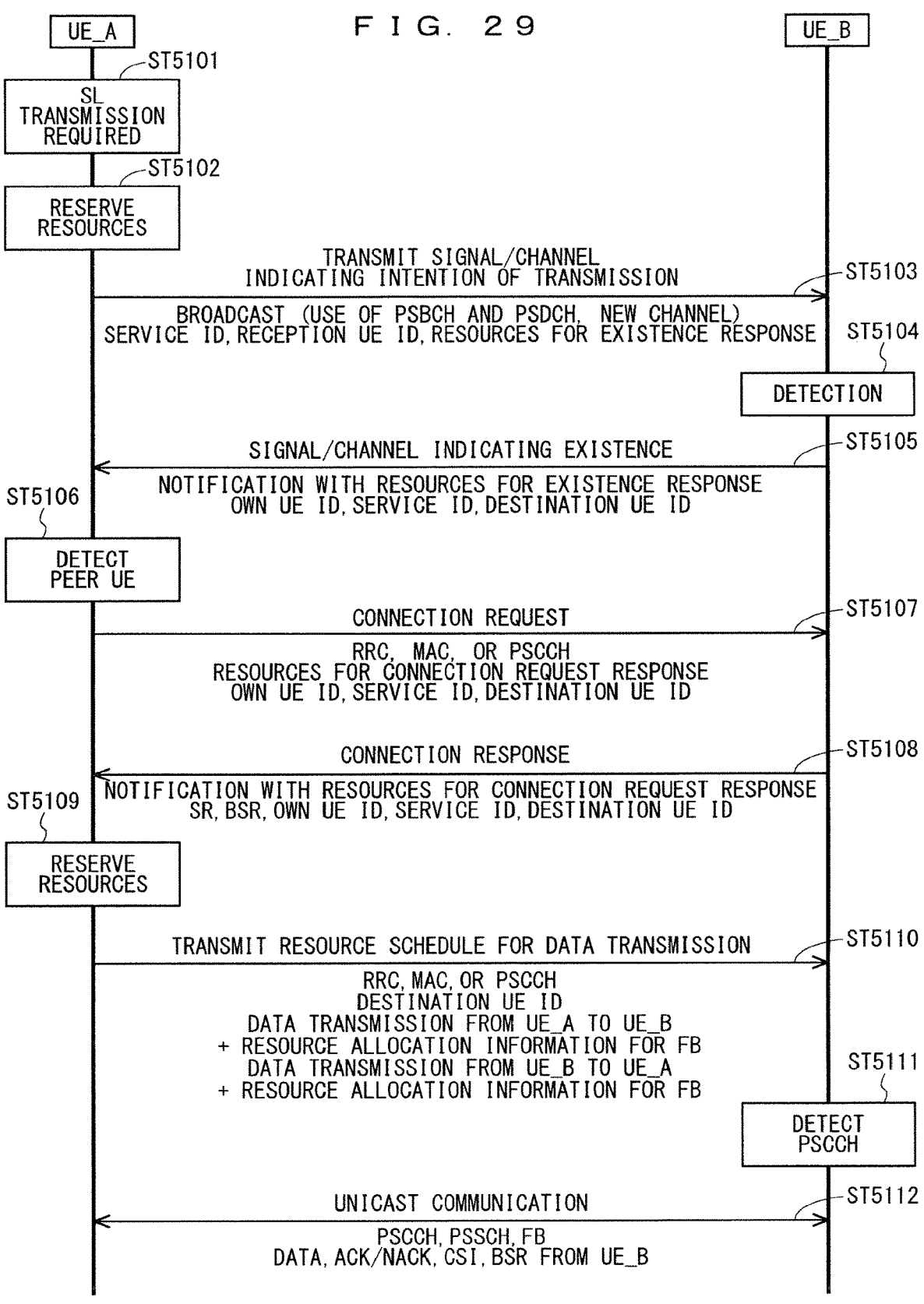

F I G .  3 0
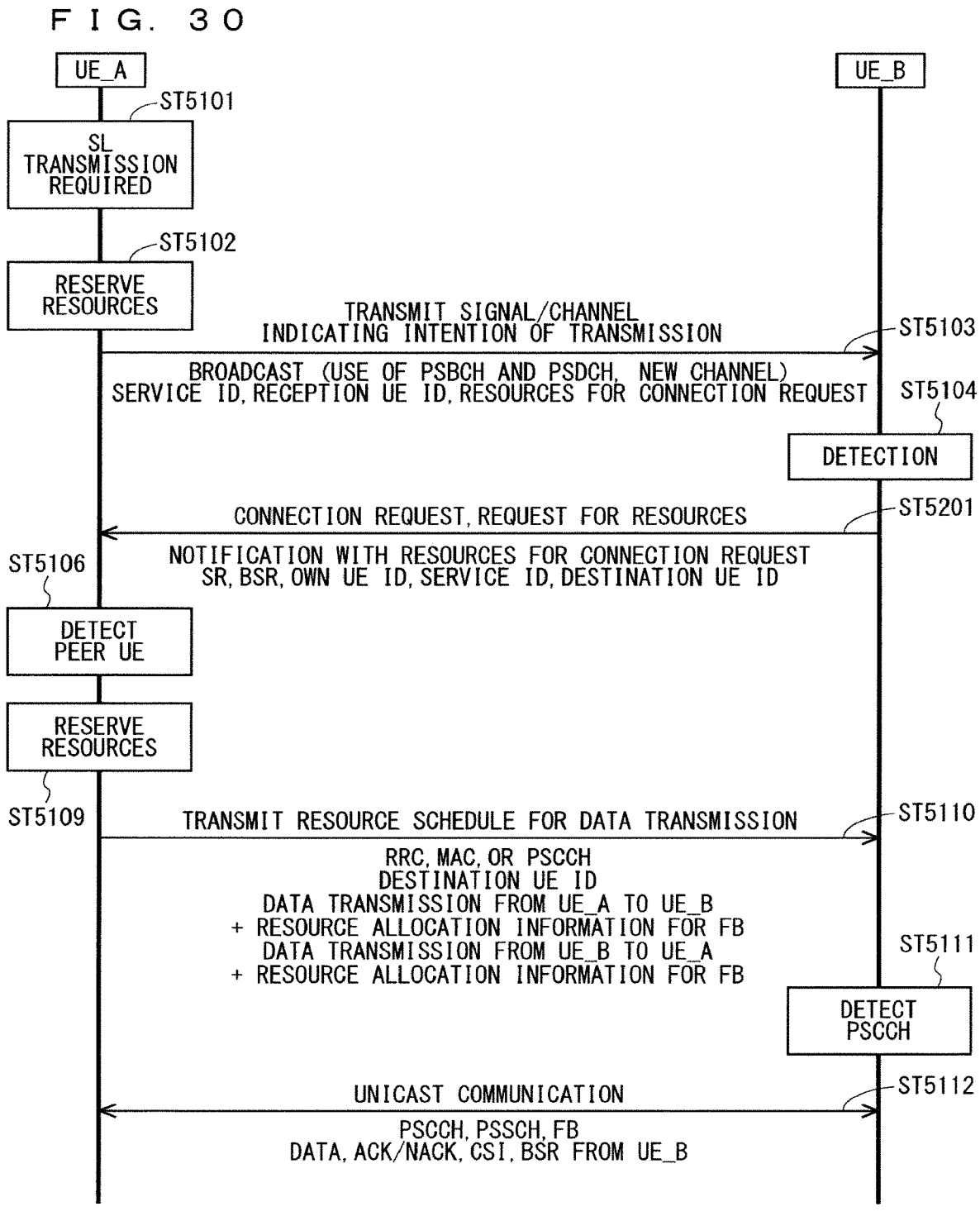

F I G .　3 1

```
    ┌──────┐                                              ┌──────┐
    │ UE_A │                                              │ UE_B │
    └──────┘                                              └──────┘
        │ ┌ST5101
    ┌───────────┐
    │    SL     │
    │TRANSMISSION│
    │ REQUIRED  │
    └───────────┘
        │ ┌ST5301
    ┌──────────┐
    │ RESERVE  │
    │RESOURCES │
    └──────────┘
        │                                                     │ ┌ST5107
        │         CONNECTION REQUEST                          │
        │────────────────────────────────────────────────────▶│
        │       RRC,  MAC,  OR PSCCH                           │
        │  RESOURCES FOR CONNECTION REQUEST RESPONSE           │
        │   OWN UE ID, SERVICE ID, DESTINATION UE ID           │
        │                                                     │ ┌ST5108
        │         CONNECTION RESPONSE                          │
        │◀────────────────────────────────────────────────────│
ST5109  │NOTIFICATION WITH RESOURCES FOR CONNECTION REQUEST RESPONSE│
        │  SR, BSR, OWN UE ID, SERVICE ID, DESTINATION UE ID  │
    ┌──────────┐
    │ RESERVE  │
    │RESOURCES │
    └──────────┘
        │                                                     │ ┌ST5110
        │  TRANSMIT RESOURCE SCHEDULE FOR DATA TRANSMISSION    │
        │────────────────────────────────────────────────────▶│
        │            RRC, MAC, OR PSCCH                        │
        │             DESTINATION UE ID                       │
        │      DATA TRANSMISSION FROM UE_A TO UE_B             │
        │    + RESOURCE ALLOCATION INFORMATION FOR FB          │
        │      DATA TRANSMISSION FROM UE_B TO UE_A             │
        │    + RESOURCE ALLOCATION INFORMATION FOR FB          │     ST5111
                                                         ┌──────────┐
                                                         │  DETECT  │
                                                         │  PSCCH   │
                                                         └──────────┘
        │                                                     │ ┌ST5112
        │            UNICAST COMMUNICATION                    │
        │◀────────────────────────────────────────────────────│
        │             PSCCH, PSSCH, FB                        │
        │     DATA, ACK/NACK, CSI, BSR FROM UE_B              │
        │                                                     │
```

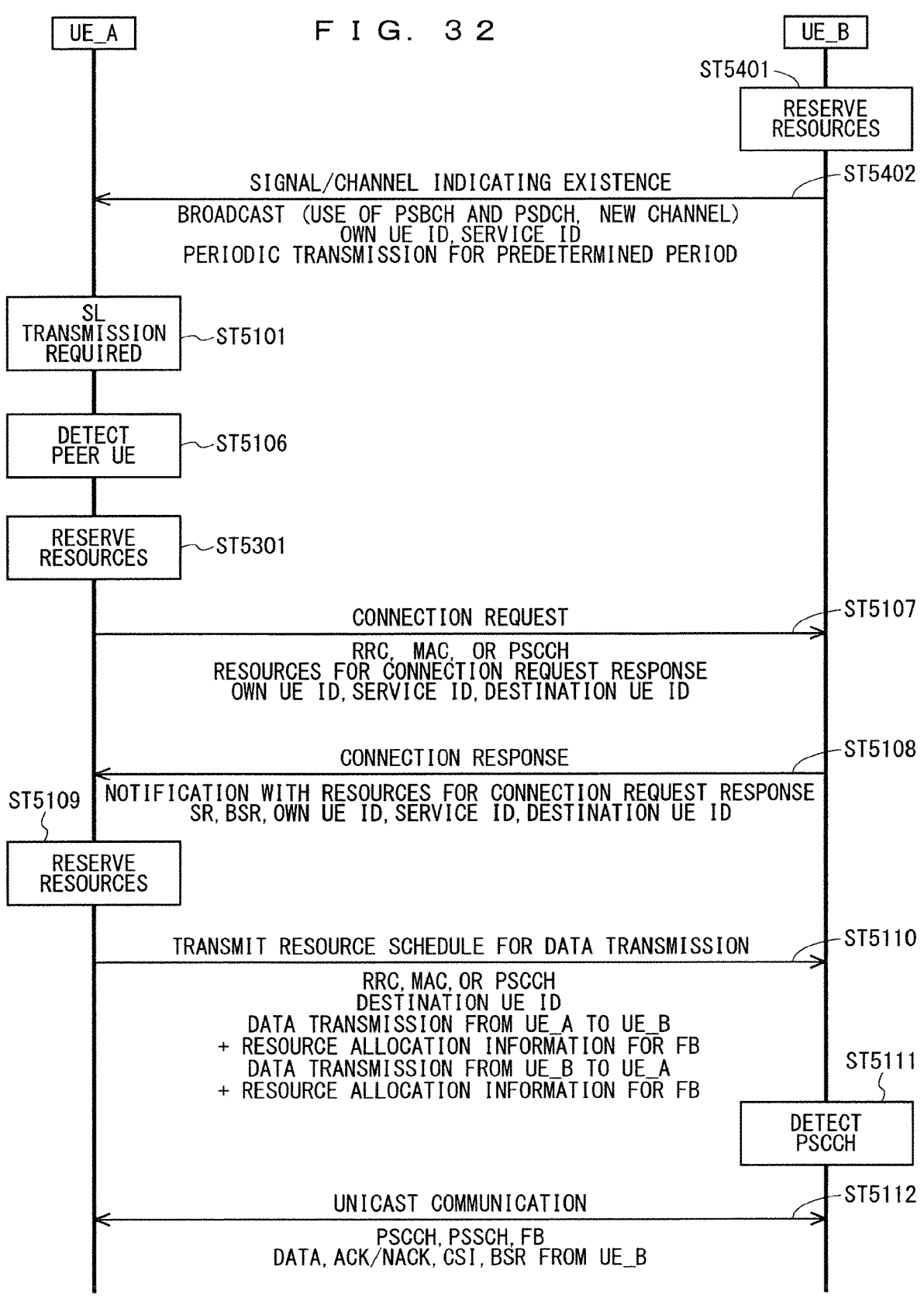
F I G. 3 2

F I G. 3 3
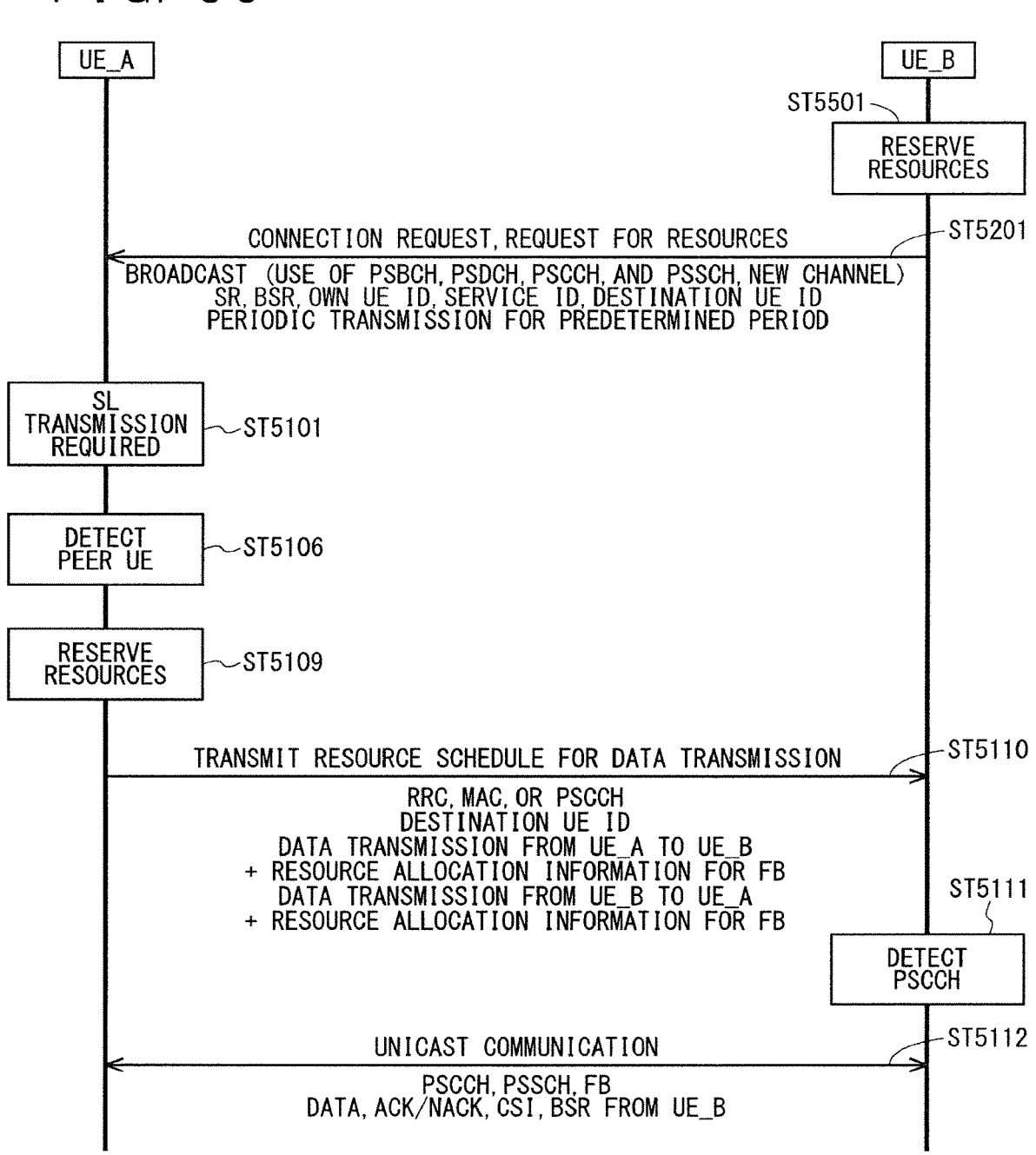

F I G. 3 5
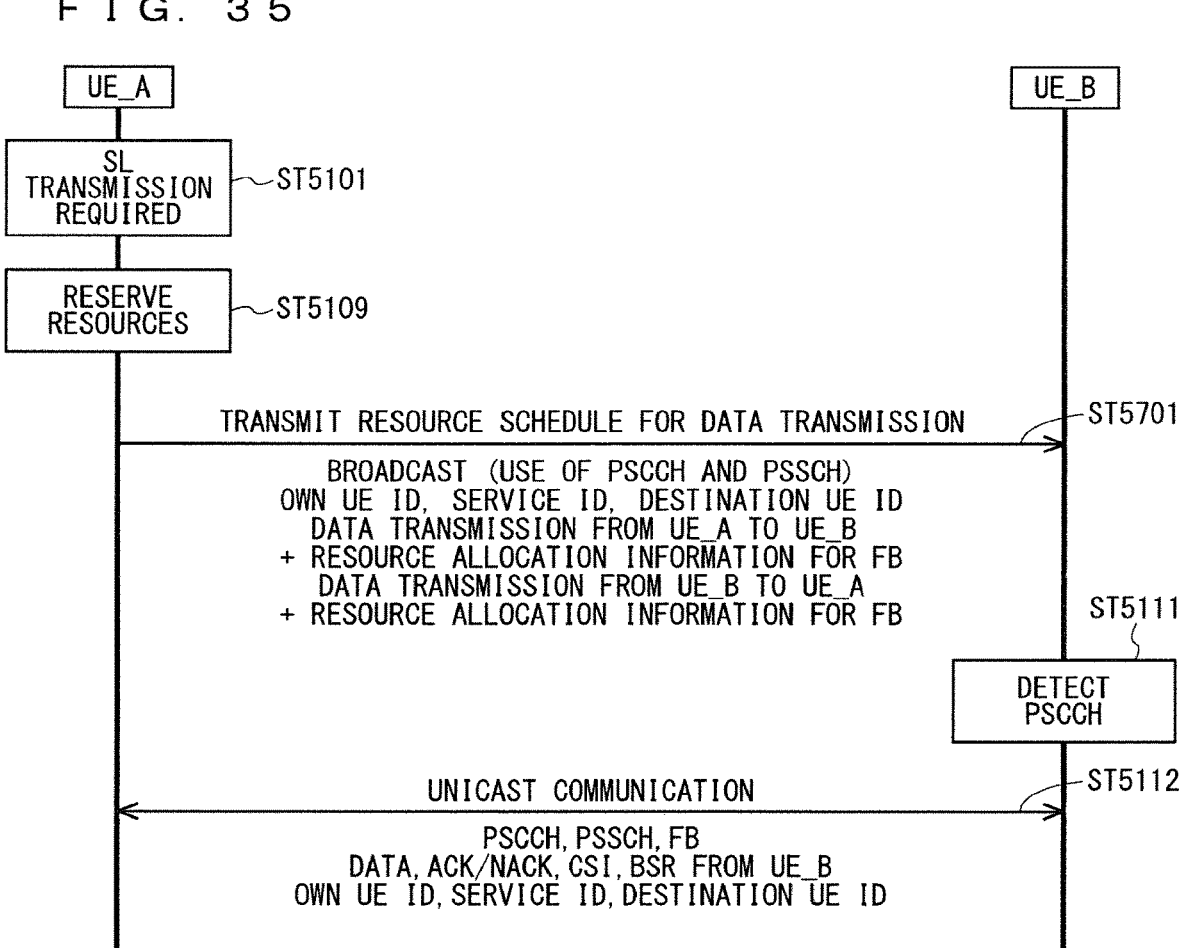

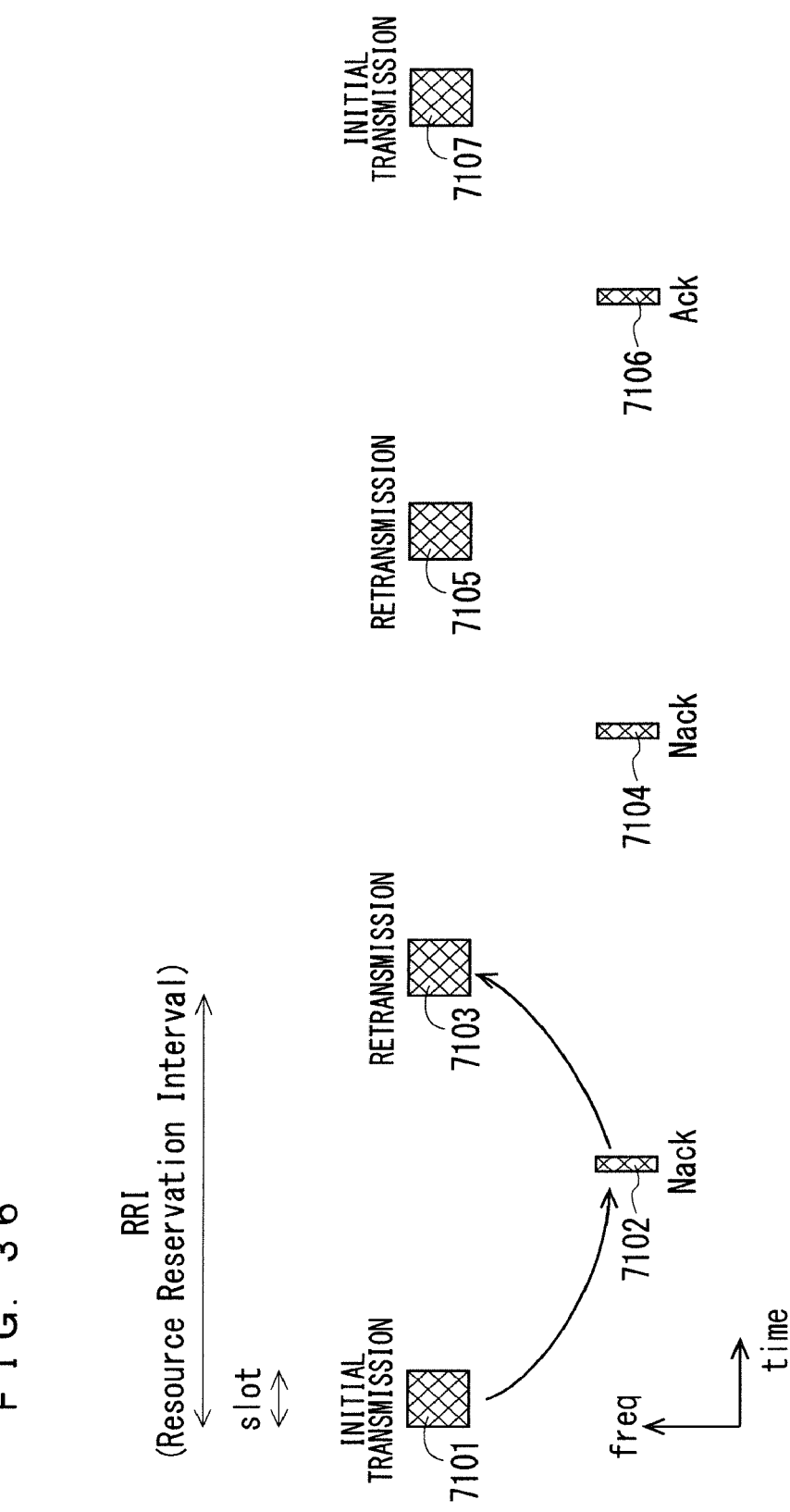
F I G. 36

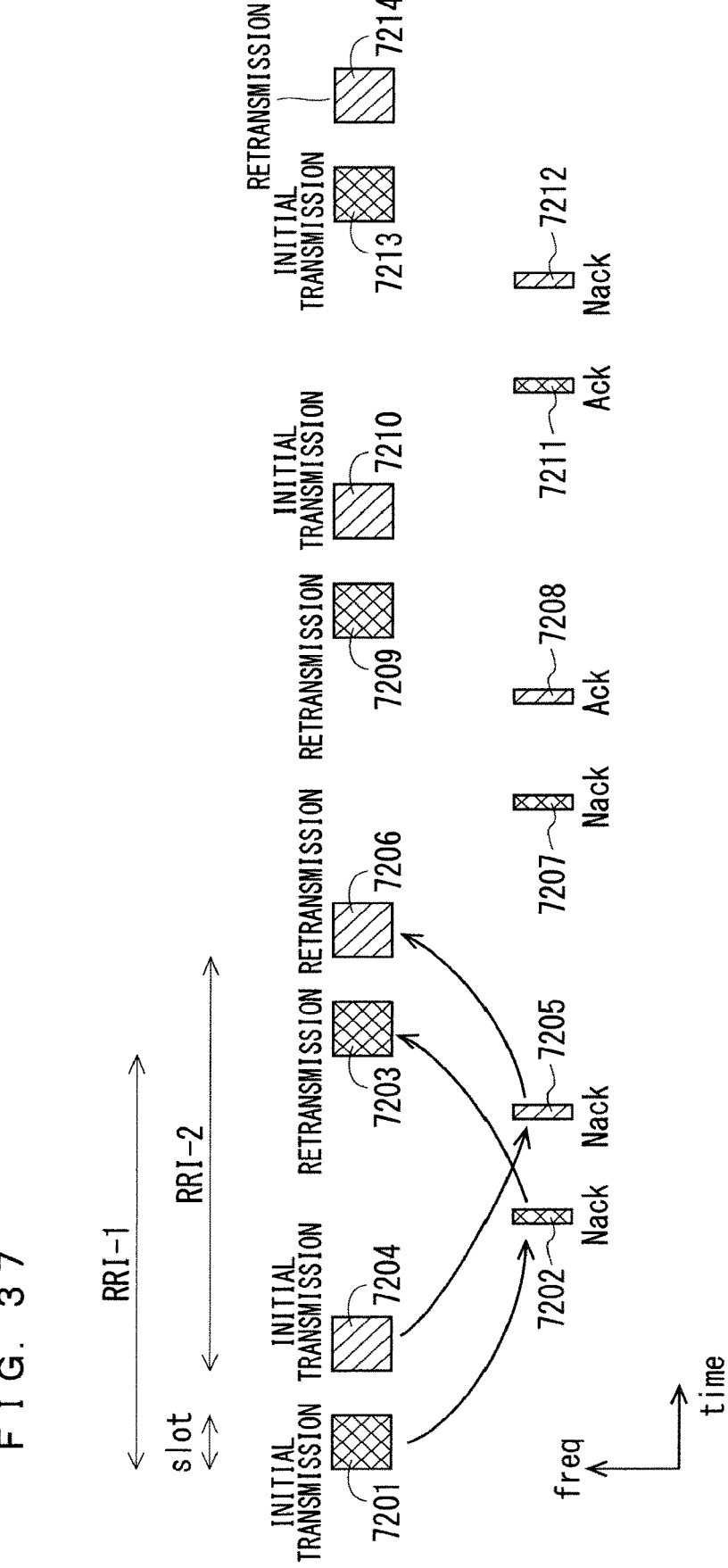
F I G. 3 7

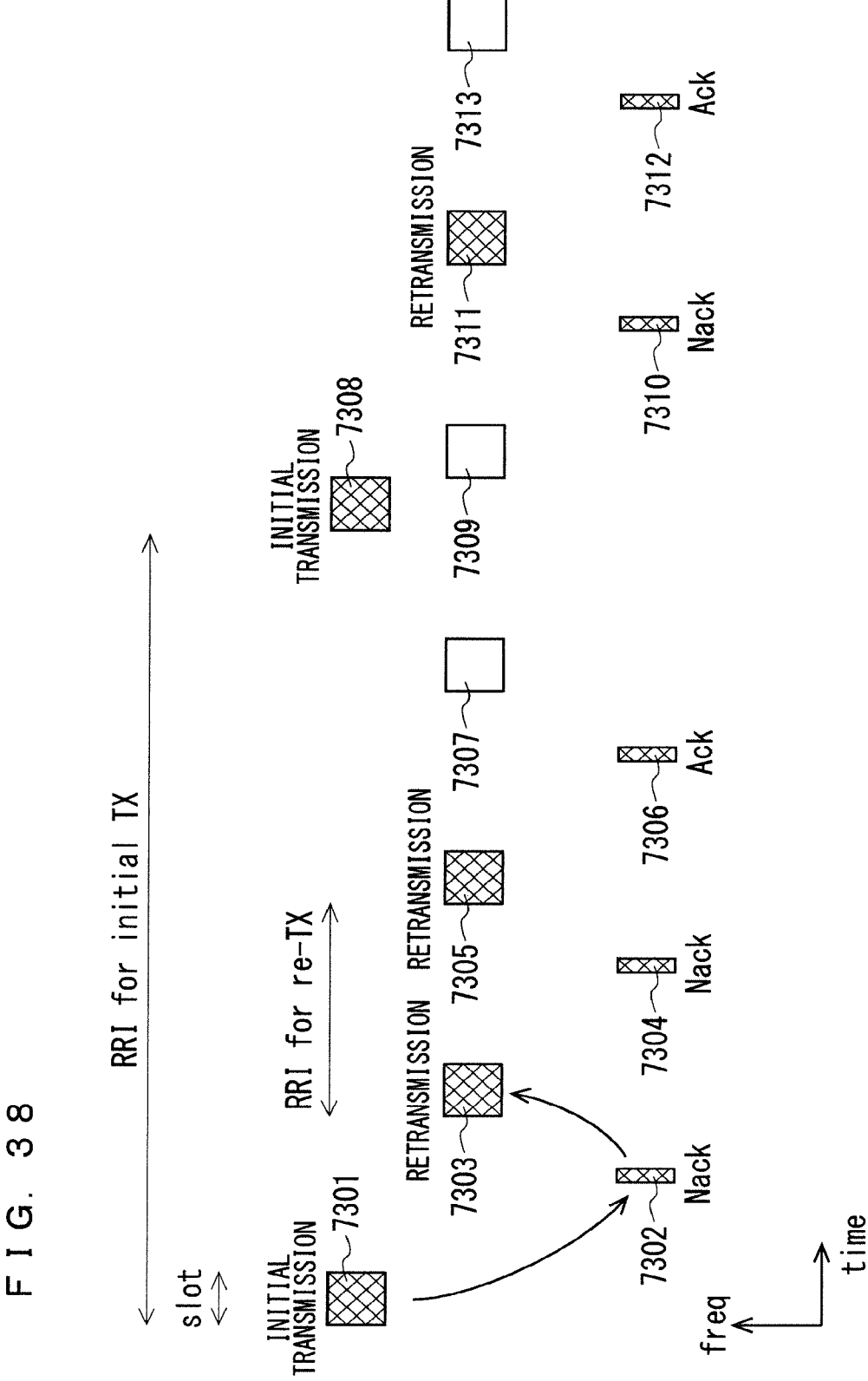
F I G. 3 8

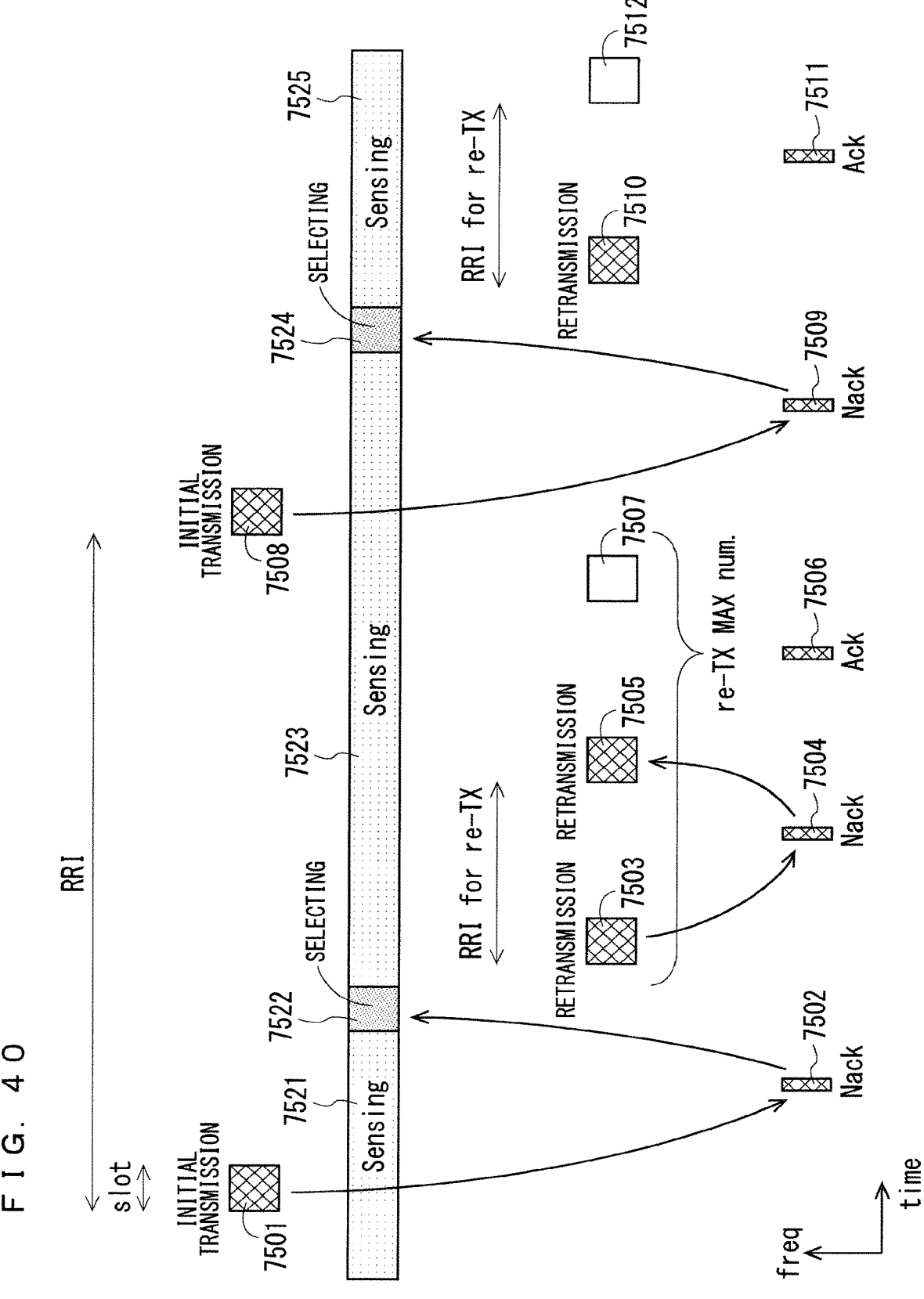
F I G. 4 0

COMMUNICATION SYSTEM AND RECEIVER

CROSS-REFERENCE TO RELATED APPLICATIONS

This application is a continuation of and claims the benefit of priority under 35 U.S.C. § 120 from U.S. application Ser. No. 17/281,510, filed Mar. 30, 2021, which is a National Stage of PCT/JP2019/042644 filed Oct. 30, 2019, which claims the benefit of priority under 35 U.S.C. § 119 from Japanese Application No. 2018-204805 filed Oct. 31, 2018, the entire contents of which are incorporated herein by reference

TECHNICAL FIELD

The present invention relates to a radio communication technology.

BACKGROUND ART

The 3rd generation partnership project (3GPP), the standard organization regarding the mobile communication system, is studying communication systems referred to as long term evolution (LTE) regarding radio sections and system architecture evolution (SAE) regarding the overall system configuration including a core network and a radio access network which is hereinafter collectively referred to as a network as well (for example, see Non-Patent Documents 1 to 5). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The decisions taken in 3GPP regarding the frame configuration in the LTE system described in Non-Patent Document 1 (Chapter 5) are described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal per radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station device (hereinafter may be simply referred to as a "base station") to a communication terminal device (hereinafter may be simply referred to as a "communication terminal") such as a user equipment device (hereinafter may be simply referred to as a "user equipment"). A BCH transport block is mapped to four subframes within a 40 ms interval. There is no explicit signaling indicating 40 ms timing.

A physical control format indicator channel (PCFICH) is a channel for downlink transmission from a base station to a communication terminal. The PCFICH notifies the number of orthogonal frequency division multiplexing (OFDM) symbols used for PDCCHs from the base station to the communication terminal. The PCFICH is transmitted per subframe.

A physical downlink control channel (PDCCH) is a channel for downlink transmission from a base station to a communication terminal. The PDCCH notifies of the resource allocation information for downlink shared channel (DL-SCH) being one of the transport channels described below, resource allocation information for a paging channel (PCH) being one of the transport channels described below, and hybrid automatic repeat request (HARD) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a communication terminal. A downlink shared channel (DL-SCH) that is a transport channel and a PCH that is a transport channel are mapped to the PDSCH.

A physical multicast channel (PMCH) is a channel for downlink transmission from a base station to a communication terminal. A multicast channel (MCH) that is a transport channel is mapped to the PMCH.

A physical uplink control channel (PUCCH) is a channel for uplink transmission from a communication terminal to a base station. The PUCCH carries Ack/Nack that is a response signal to downlink transmission. The PUCCH carries channel state information (CSI). The CSI includes a rank indicator (RI), a precoding matrix indicator (PMI), and a channel quality indicator (CQI) report. The RI is rank information of a channel matrix in the MIMO. The PMI is information of a precoding weight matrix to be used in the MIMO. The CQI is quality information indicating the quality of received data or channel quality. In addition, the PUCCH carries a scheduling request (SR).

A physical uplink shared channel (PUSCH) is a channel for uplink transmission from a communication terminal to a base station. An uplink shared channel (UL-SCH) that is one of the transport channels is mapped to the PUSCH.

A physical hybrid ARQ indicator channel (PHICH) is a channel for downlink transmission from a base station to a communication terminal. The PHICH carries Ack/Nack that is a response signal to uplink transmission. A physical random access channel (PRACH) is a channel for uplink transmission from the communication terminal to the base station. The PRACH carries a random access preamble.

A downlink reference signal (RS) is a known symbol in the LTE communication system. The following five types of downlink reference signals are defined as: a cell-specific reference signal (CRS), an MBSFN reference signal, a data demodulation reference signal (DM-RS) being a UE-specific reference signal, a positioning reference signal (PRS), and a channel state information reference signal (CSI-RS). The physical layer measurement objects of a communication terminal include reference signal received powers (RSRPs).

An uplink reference signal is also a known symbol in the LTE communication system. The following two types of uplink reference signals are defined, that is, a demodulation reference signal (DM-RS) and a sounding reference signal (SRS).

The transport channels described in Non-Patent Document 1 (Chapter 5) are described. A broadcast channel (BCH) among the downlink transport channels is broadcast to the entire coverage of a base station (cell). The BCH is mapped to the physical broadcast channel (PBCH).

Retransmission control according to a hybrid ARQ (HARD) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a communication terminal for enabling the communication terminal to save power. The DL-SCH is mapped to the physical downlink shared channel (PDSCH).

The paging channel (PCH) supports DRX of the communication terminal for enabling the communication terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcasting the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "Ack" to the transmitter. The transmitter that has received "Ack" transmits the next data.

The logical channels described in Non-Patent Document 1 (Chapter 6) are described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a communication terminal. The PCCH that is a logical channel is mapped to the paging channel (PCH) that is a transport channel.

A common control channel (CCCH) is a channel for transmission control information between communication terminals and a base station. The CCCH is used in a case where the communication terminals have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a communication terminal. The MCCH is used only by a communication terminal during reception of the MBMS. The MCCH is mapped to the multicast channel (MCH) that is a transport channel.

A dedicated control channel (DCCH) is a channel that transmits dedicated control information between a communication terminal and a network on a point-to-point basis. The DCCH is used when the communication terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated communication terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a communication terminal. The MTCH is a channel used only by a communication terminal during reception of the MBMS. The MTCH is mapped to the multicast channel (MCH).

CGI represents a cell global identifier. ECGI represents an E-UTRAN cell global identifier. A closed subscriber group (CSG) cell is introduced into the LTE, and the long term evolution advanced (LTE-A) and universal mobile telecommunication system (UMTS) described below.

The locations of communication terminals are tracked based on an area composed of one or more cells. The locations are tracked for enabling tracking the locations of communication terminals and calling communication terminals, in other words, incoming calling to communication terminals even in an idle state. An area for tracking locations of communication terminals is referred to as a tracking area.

Further, specifications of long term evolution advanced (LTE-A) are pursued as Release 10 in 3GPP (see Non-Patent Documents 3 and 4). The LTE-A is based on the LTE radio communication system and is configured by adding several new techniques to the system.

Carrier aggregation (CA) is studied for the LTE-A system in which two or more component carriers (CCs) are aggregated to support wider transmission bandwidths up to 100 MHz. Non-Patent Document 1 describes the CA.

In a case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 1.

Furthermore, the use of small eNBs (hereinafter also referred to as "small-scale base station devices") configuring small cells is studied in 3GPP to satisfy tremendous traffic in the future. In an example technique under study, a large number of small eNBs is installed to configure a large number of small cells, which increases spectral efficiency and communication capacity. The specific techniques include dual connectivity (abbreviated as DC) with which a UE communicates with two eNBs through connection thereto. Non-Patent Document 1 describes the DC.

For eNBs that perform dual connectivity (DC), one may be referred to as a master eNB (abbreviated as MeNB), and the other may be referred to as a secondary eNB (abbreviated as SeNB).

The traffic flow of a mobile network is on the rise, and the communication rate is also increasing. It is expected that the communication rate is further increased when the operations of the LTE and the LTE-A are fully initiated.

For increasingly enhanced mobile communications, the fifth generation (hereinafter also referred to as "5G") radio access system is studied whose service is aimed to be launched in 2020 and afterward. For example, in the Europe, an organization named METIS summarizes the requirements for 5G (see Non-Patent Document 5).

The requirements in the 5G radio access system show that a system capacity shall be 1000 times as high as, a data transmission rate shall be 100 times as high as, a data latency shall be one tenth ($\frac{1}{10}$) as low as, and simultaneously connected communication terminals 100 times as many as those of the LTE system, to further reduce the power consumption and device cost.

To satisfy such requirements, the study of 5G standards is pursued as Release 15 in 3GPP (see Non-Patent Documents 6 to 18). The techniques on 5G radio sections are referred to as "New Radio Access Technology" ("New Radio" is abbreviated as NR).

The NR system has been studied based on the LTE system and the LTE-A system. The NR system includes additions and changes from the LTE system and the LTE-A system in the following points.

As the access schemes of the NR, the orthogonal frequency division multiplexing (OFDM) is used in the downlink direction, and the OFDM and the DFT-spread-OFDM (DFT-s-OFDM) are used in the uplink direction.

In NR, frequencies higher than those in the LTE are available for increasing the transmission rate and reducing the latency.

In NR, a cell coverage is maintained by forming a transmission/reception range shaped like a narrow beam (beamforming) and also changing the orientation of the beam (beam sweeping).

In NR, various subcarrier spacings, that is, various numerologies are supported. Regardless of the numerologies, 1 subframe is 1 millisecond long, and 1 slot consists of 14 symbols in NR. Furthermore, the number of slots in 1 subframe is one in a numerology at a subcarrier spacing of 15 kHz. The number of slots increases in proportion to the subcarrier spacing in the other numerologies (see Non-Patent Document 13 (TS38.211 v15.0.0)).

The base station transmits a downlink synchronization signal in NR as synchronization signal burst (may be hereinafter referred to as SS burst) with a predetermined period for a predetermined duration. The SS burst includes synchronization signal blocks (may be hereinafter referred to as SS blocks) for each beam of the base station. The base station transmits the SS blocks for each beam during the duration of the SS burst with the beam changed. The SS blocks include the P-SS, the S-SS, and the PBCH.

In NR, addition of a phase tracking reference signal (PTRS) as a downlink reference signal has reduced the influence of phase noise. The PTRS has also been added as an uplink reference signal similarly to the downlink.

In NR, a slot format indication (SFI) has been added to information included in the PDCCH for flexibly switching between the DL and the UL in a slot.

Also in NR, the base station preconfigures, for the UE, a part of a carrier frequency band (may be hereinafter referred to as a Bandwidth Part (BWP)). Then, the UE performs transmission and reception with the base station in the BWP. Consequently, the power consumption in the UE is reduced.

The DC patterns studied in 3GPP include the DC to be performed between an LTE base station and an NR base station that are connected to the EPC, the DC to be performed by the NR base stations that are connected to the 5G core system, and the DC to be performed between the LTE base station and the NR base station that are connected to the 5G core system (see Non-Patent Documents 12, 16, and 19).

Furthermore, several new technologies have been studied in 3GPP. The example studies include enhancing jitter characteristics (see Non-Patent Document 20 (3GPP RP-180974)), rapid start-up of a cell (Non-Patent Document 21 (3GPP RP-181469)), and unicast communication in the sidelink (see Non-Patent Document 22 (3GPP RP-182111)).

PRIOR-ART DOCUMENTS

Non-Patent Documents

Non-Patent Document 1: 3GPP TS 36.300 V15.2.0
Non-Patent Document 2: 3GPP S1-083461
Non-Patent Document 3: 3GPP TR 36.814 V9.2.0
Non-Patent Document 4: 3GPP TR 36.912 V15.0.0
Non-Patent Document 5: "Scenarios, requirements and KPIs for 5G mobile and wireless system", ICT-317669-METIS/D1.1
Non-Patent Document 6: 3GPP TR 23.799 V14.0.0
Non-Patent Document 7: 3GPP TR 38.801 V14.0.0
Non-Patent Document 8: 3GPP TR 38.802 V14.2.0
Non-Patent Document 9: 3GPP TR 38.804 V14.0.0
Non-Patent Document 10: 3GPP TR 38.912 V14.1.0
Non-Patent Document 11: 3GPP RP-172115
Non-Patent Document 12: 3GPP TS 37.340 V15.2.0
Non-Patent Document 13: 3GPP TS 38.211 V15.2.0
Non-Patent Document 14: 3GPP TS 38.213 V15.2.0
Non-Patent Document 15: 3GPP TS 38.214 V15.2.0
Non-Patent Document 16: 3GPP TS 38.300 V15.2.0
Non-Patent Document 17: 3GPP TS 38.321 V15.2.0
Non-Patent Document 18: 3GPP TS 38.212 V15.2.0
Non-Patent Document 19: 3GPP RP-161266
Non-Patent Document 20: 3GPP RP-180974
Non-Patent Document 21: 3GPP RP-181469
Non-Patent Document 22: 3GPP RP-182111
Non-Patent Document 23: 3GPP TR22.804 V16.1.0
Non-Patent Document 24: 3GPP TS36.321 V15.2.0

Non-Patent Document 25: 3GPP RP-161788
Non-Patent Document 26: 3GPP TS38.331 V15.2.1
Non-Patent Document 27: 3GPP TS36.213 V15.3.0

SUMMARY

Problems to be Solved by the Invention

In 3GPP, not only the requirements of Ultra Reliability, Low Latency Communication (URLLC) but also low jitter characteristics are sought (see Non-Patent Document 20 (3GPP RP-180974) and Non-Patent Document 23 (3GPP TR22.804 V16.1.0)). To satisfy the URLLC requirements, packet duplication is used (see Non-Patent Document 16). However, none defines the timing to transfer a received packet to an upper layer in the packet duplication. Consequently, a receiver transfers packets to the upper layer with different timings, depending on a decoding result of the packet whose reception timing is earlier (e.g., a result of the CRC). This causes problems such as variations in latency (hereinafter may be referred to as jitter) and worsening of the jitter characteristics.

Furthermore, in the sidelink (SL) supported for vehicle-to-vehicle (V2V) communication, application of the unicast communication has been studied. Although communication from one UE to another UE is possible, none discloses a method for configuring transmission resources in the communication in the opposite direction, that is, the communication from the other UE to the one UE. This disables the communication in the opposite direction, and causes a problem of failing to establish bidirectional communication in the unicast communication.

In view of the problems, one of the objects of the present invention is to provide a radio communication technology that can achieve low latency, high reliability, and low jitter characteristics in at least one of the uplink communication, the downlink communication, and the sidelink communication.

Means to Solve the Problems

The present invention provides a communication system including: a transmitter configured to duplicate a packet and transmit the duplicated packets; and a receiver configured to receive the duplicated packets, wherein the receiver is configured to transfer, to an upper layer in the receiver, a first packet that is a packet received earlier out of the duplicated packets, and a transfer timing that is a timing with which the first packet is transferred to the upper layer includes at least one of: a reception timing of a second packet that is a packet received later than the first packet out of the duplicated packets; and a cyclical timing corresponding to a transmission cycle of the duplicated packets.

The present invention also provides a receiver configured to receive packets duplicated by a transmitter, wherein the receiver is configured to transfer, to an upper layer in the receiver, a first packet that is a packet received earlier out of the duplicated packets, and a transfer timing that is a timing with which the first packet is transferred to the upper layer includes at least one of: a reception timing of a second packet that is a packet received later than the first packet out of the duplicated packets; and a cyclical timing corresponding to a transmission cycle of the duplicated packets.

Effects of the Invention

The present invention can achieve low latency, high reliability, and low jitter characteristics.

The objects, features, aspects and advantages of the present invention will become more apparent from the following detailed description of the present invention when taken in conjunction with the accompanying drawings.

BRIEF DESCRIPTION OF DRAWINGS

Figure 1:
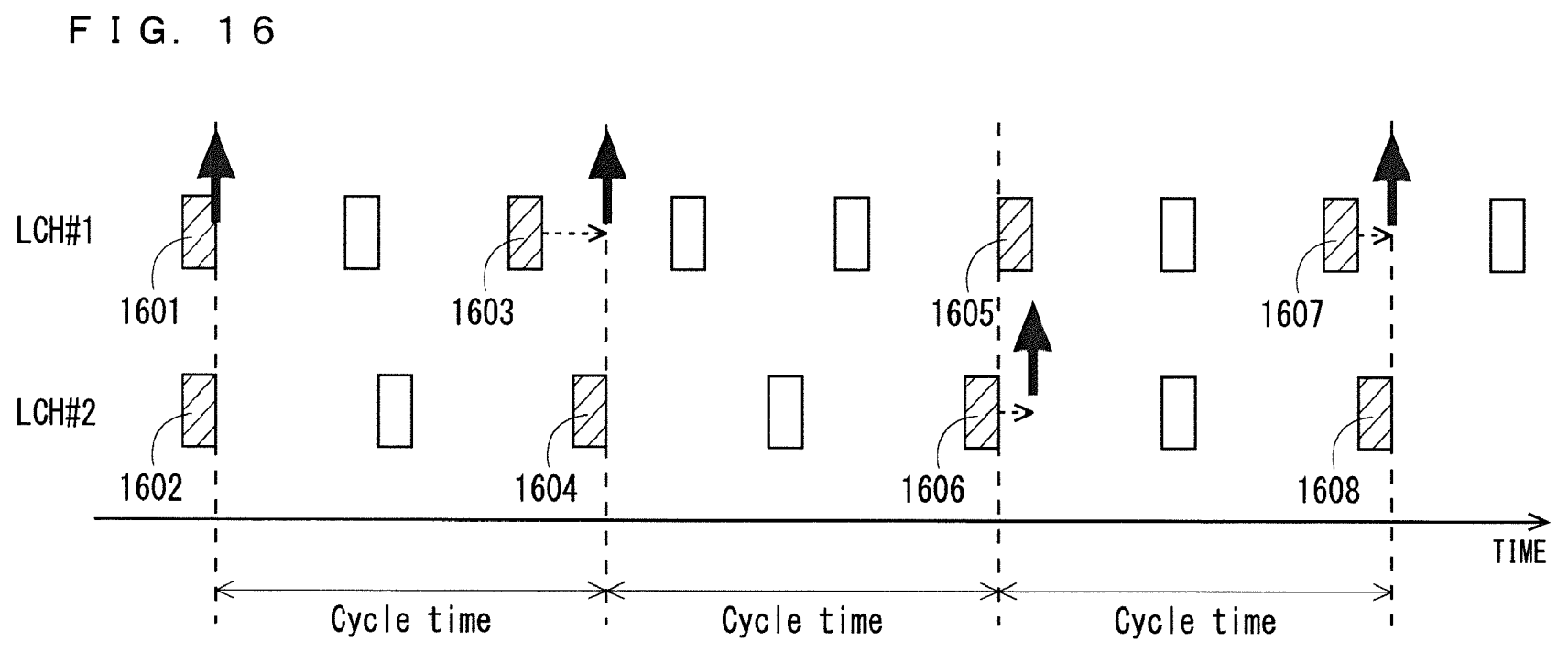

FIG. 1 is a diagram illustrating the configuration of a radio frame for use in an LTE communication system.

FIG. 2 is a block diagram showing the overall configuration of an LTE communication system 200 under discussion of 3GPP.

FIG. 3 is a block diagram illustrating an overall configuration of a NR communication system 210 that has been discussed in 3GPP.

FIG. 4 illustrates a structure of the DC to be performed by an eNB and a gNB that are connected to the EPC.

FIG. 5 illustrates a structure of the DC to be performed by gNBs that are connected to the NG core.

FIG. 6 illustrates a structure of the DC to be performed by the eNB and the gNB that are connected to the NG core.

FIG. 7 illustrates a structure of the DC to be performed by the eNB and the gNB that are connected to the NG core.

FIG. 8 is a block diagram showing the configuration of a user equipment 202 shown in FIG. 2.

FIG. 9 is a block diagram showing the configuration of a base station 203 shown in FIG. 2.

FIG. 10 is a block diagram showing the configuration of an MME.

FIG. 11 is a block diagram illustrating a configuration of the 5GC.

FIG. 12 is a flowchart showing an outline from a cell search to an idle state operation performed by a communication terminal (UE) in LTE communication system.

FIG. 13 illustrates an example structure of a cell in an NR system.

FIG. 14 illustrates operations of the receiver for transferring packets to the upper layer with the reception timing of packets to be transmitted later out of duplicated packets according to the first embodiment.

FIG. 15 illustrates operations of the receiver for transferring received packets to the upper layer with the predetermined timing according to the first embodiment.

FIG. 16 illustrates another example of operations of the receiver for transferring packets to the upper layer with the reception timing of packets to be transmitted later out of duplicated packets according to the first embodiment.

FIG. 17 illustrates another example of operations of the receiver for transferring received packets to the upper layer with the predetermined timing according to the first embodiment.

FIG. 18 illustrates operations of transmitting and receiving duplicated packets over the same carrier according to the first modification of the first embodiment.

FIG. 19 illustrates another example of operations of transmitting and receiving duplicated packets over the same carrier according to the first modification of the first embodiment.

FIG. 20 illustrates another example of operations of transmitting and receiving duplicated packets over the same carrier according to the first modification of the first embodiment.

FIG. 21 illustrates another example of operations of transmitting and receiving duplicated packets over the same carrier according to the first modification of the first embodiment.

FIG. 22 illustrates operations of the receiver for performing HARQ feedback and performing a transfer to the upper layer during the predetermined number of iterations in the repetitions according to the second modification of the first embodiment.

FIG. 23 illustrates operations of the LCP when the jitter-critical logical channel and the logical channel with latency requirements coexist according to the third modification of the first embodiment.

FIG. 24 illustrates giving an offset of a priority in the jitter-critical logical channel according to the third modification of the first embodiment.

FIG. 25 illustrates another example of giving an offset of a priority in the jitter-critical logical channel according to the third modification of the first embodiment.

FIG. 26 illustrates giving an offset of a priority in the logical channel with latency requirements according to the third modification of the first embodiment.

FIG. 27 is a conceptual diagram of the SL communication (broadcast communication) according to the third embodiment.

FIG. 28 is a conceptual diagram of the SL communication (unicast communication) according to the third embodiment.

FIG. 29 illustrates a first example sequence until the unicast communication between two UEs for the SL unicast according to the first modification of the third embodiment.

FIG. 30 illustrates a second example sequence until the unicast communication between two UEs for the SL unicast according to the first modification of the third embodiment.

FIG. 31 illustrates a third example sequence until the unicast communication between two UEs for the SL unicast according to the first modification of the third embodiment.

FIG. 32 illustrates a fourth example sequence until the unicast communication between two UEs for the SL unicast according to the first modification of the third embodiment.

FIG. 33 illustrates a fifth example sequence until the unicast communication between two UEs for the SL unicast according to the first modification of the third embodiment.

FIG. 35 illustrates a seventh example sequence until the unicast communication between two UEs for the SL unicast according to the first modification of the third embodiment.

FIG. 36 is a conceptual diagram illustrating an example method for reserving resources for initial transmission and/or retransmission in the SL according to the fifth embodiment.

FIG. 37 is a conceptual diagram illustrating an example method for reserving a plurality of sets of cyclical resources for initial transmission and/or retransmission in the SL according to the fifth embodiment.

FIG. 38 is a conceptual diagram illustrating an example method for dedicatedly reserving the resources to be used for initial transmission and the resources to be used for retransmission in the SL according to the fifth embodiment.

FIG. 40 is a conceptual diagram illustrating an example method for reserving, in retransmission, resources to be used for the retransmission in the SL according to the fifth embodiment.

DESCRIPTION OF EMBODIMENTS

The First Embodiment

Figure 2:
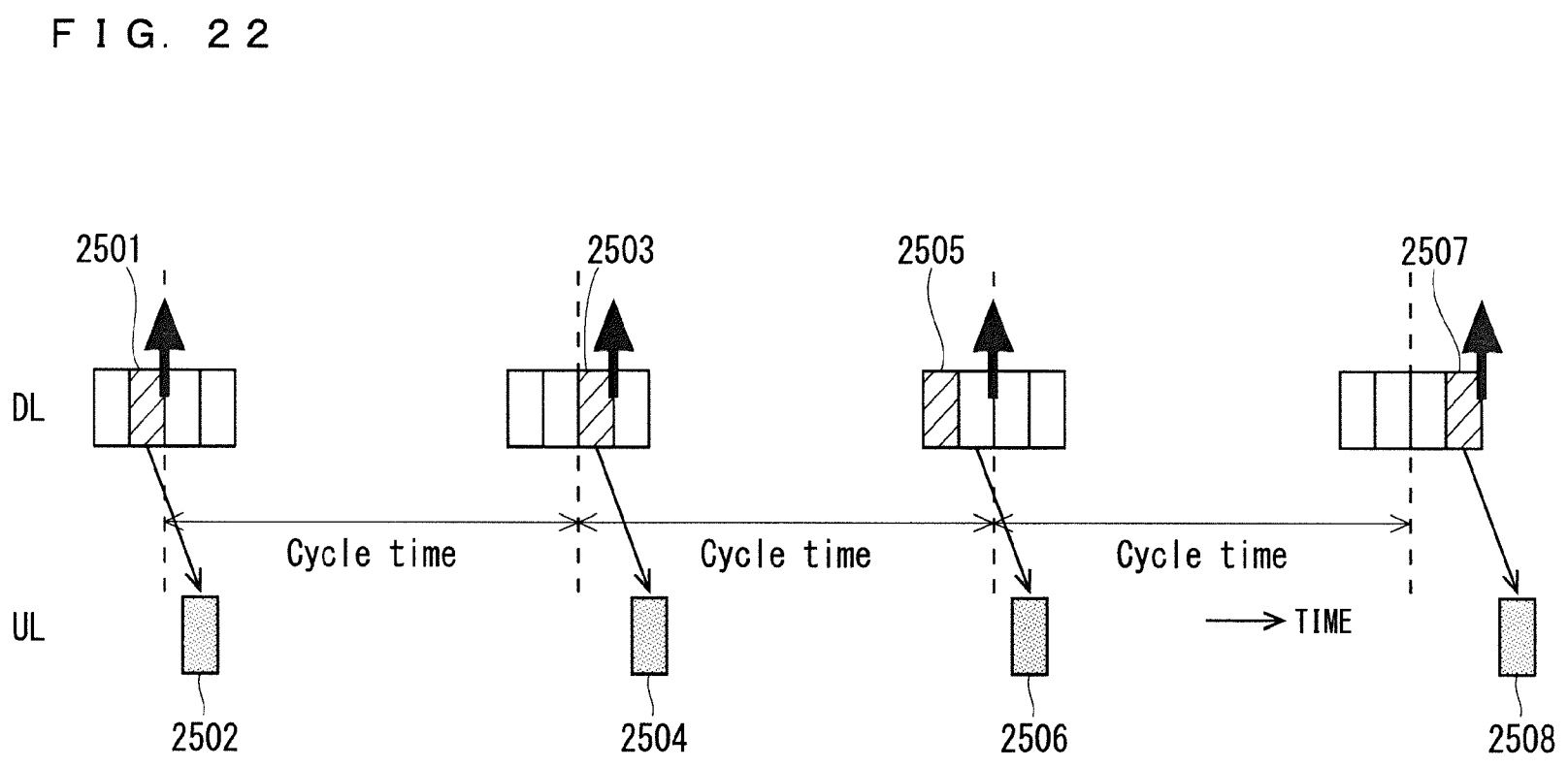
Figure 34:
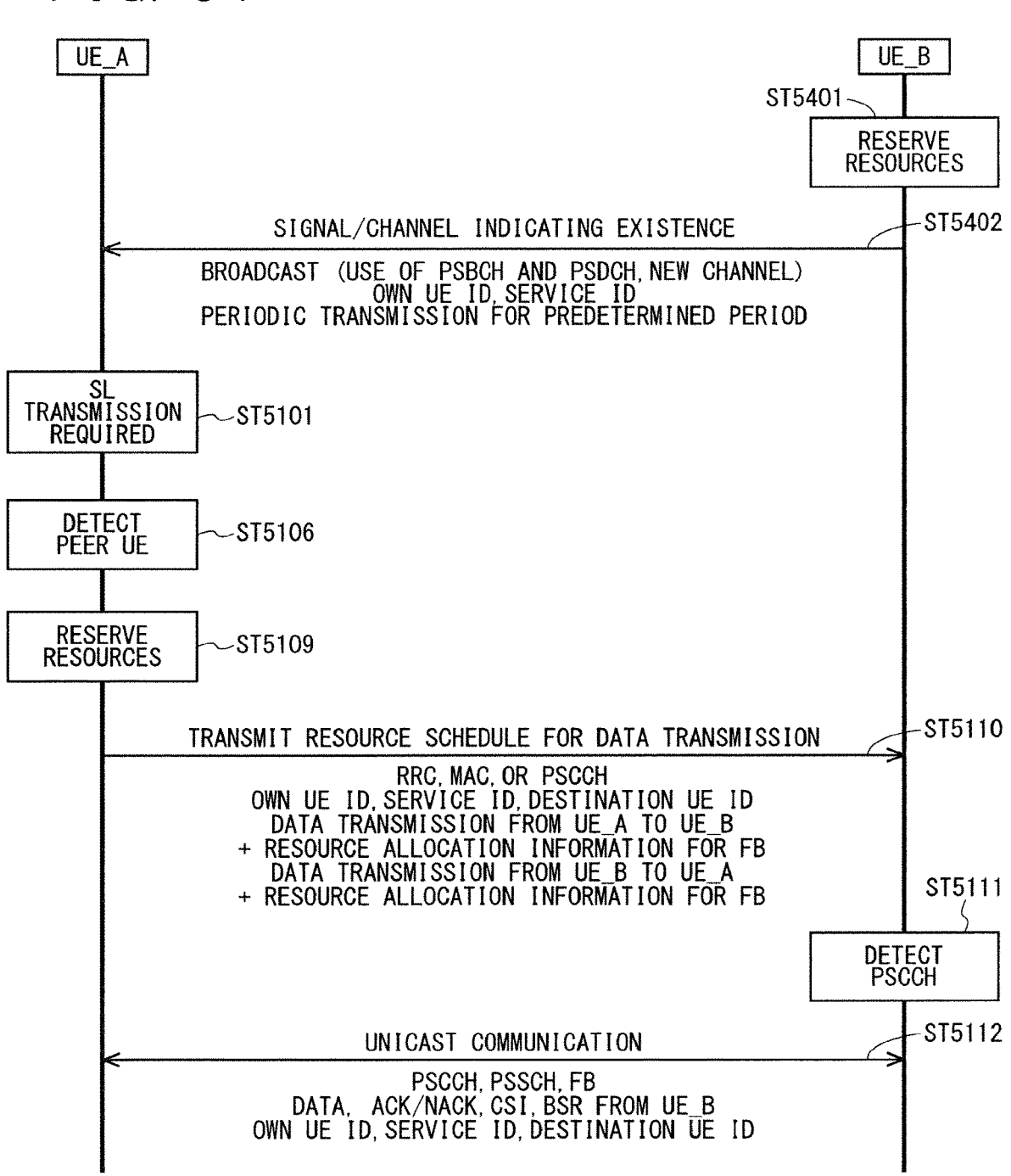
FIG. 34 illustrates a sixth example sequence until the unicast communication between two UEs for the SL unicast according to the first modification of the third embodiment.

FIG. 2 is a block diagram showing an overall configuration of an LTE communication system 200 which is under discussion of 3GPP. FIG. 2 is described here. A radio access network is referred to as an evolved universal terrestrial radio access network (E-UTRAN) 201. A user equipment device (hereinafter, referred to as a "user equipment (UE)") 202 that is a communication terminal device is capable of radio communication with a base station device (hereinafter, referred to as a "base station (E-UTRAN Node B: eNB)") 203 and transmits and receives signals through radio communication.

Here, the "communication terminal device" covers not only a user equipment device such as a mobile phone terminal device, but also an unmovable device such as a sensor. In the following description, the "communication terminal device" may be simply referred to as a "communication terminal".

The E-UTRAN is composed of one or a plurality of base stations 203, provided that a control protocol for the user equipment 202 such as a radio resource control (RRC), and user planes (hereinafter also referred to as "U-planes") such as a packet data convergence protocol (PDCP), radio link control (RLC), medium access control (MAC), or physical layer (PHY) are terminated in the base station 203.

The control protocol radio resource control (RRC) between the user equipment 202 and the base station 203 performs, for example, broadcast, paging, and RRC connection management. The states of the base station 203 and the user equipment 202 in RRC are classified into RRC_IDLE and RRC_CONNECTED.

In RRC_IDLE, public land mobile network (PLMN) selection, system information (SI) broadcast, paging, cell reselection, mobility, and the like are performed. In RRC_CONNECTED, the user equipment has RRC connection and is capable of transmitting and receiving data to and from a network. In RRC_CONNECTED, for example, handover (HO) and measurement of a neighbor cell are performed.

The base stations 203 includes one or more eNBs 207. A system, composed of an evolved packet core (EPC) being a core network and an E-UTRAN 201 being a radio access network, is referred to as an evolved packet system (EPS). The EPC being a core network and the E-UTRAN 201 being a radio access network may be collectively referred to as a "network".

The eNB 207 is connected to an MME/S-GW unit (hereinafter, also referred to as an "MME unit") 204 including a mobility management entity (MME), a serving gateway (S-GW) or an MME and an S-GW by means of an S1 interface, and control information is communicated between the eNB 207 and the MME unit 204. A plurality of MME units 204 may be connected to one eNB 207. The eNBs 207 are connected to each other by means of an X2 interface, and control information is communicated between the eNBs 207.

The MME unit 204 is a high-level device, specifically, a high-level node, and controls connection between the user equipment (UE) 202 and the eNBs 207 comprising a base station. The MME unit 204 configures the EPC that is a core network. The base station 203 configures the E-UTRAN 201.

The base station 203 may configure one or more cells. Each of the cells has a predefined range as a coverage that is a range in which communication with the user equipment 202 is possible, and performs radio communication with the user equipment 202 within the coverage. When the one base station 203 configures a plurality of cells, each of the cells is configured to communicate with the user equipment 202.

FIG. 3 is a block diagram illustrating an overall configuration of a 5G communication system 210 that has been discussed in 3GPP. FIG. 3 is described. A radio access network is referred to as a next generation radio access network (NG-RAN) 211. The UE 202 can perform radio communication with an NR base station device (hereinafter referred to as a "NG-RAN NodeB (gNB)") 213, and transmits and receives signals to and from the NR base station device 213 via radio communication. Furthermore, the core network is referred to as a 5G Core (5GC).

When control protocols for the UE 202, for example, Radio Resource Control (RRC) and user planes (may be hereinafter referred to as U-Planes), e.g., Service Data Adaptation Protocol (SDAP), Packet Data Convergence Protocol (PDCP), Radio Link Control (RLC), Medium Access Control (MAC), and Physical Layer (PHY) are terminated in the NR base station 213, one or more NR base stations 213 configure the NG-RAN.

The functions of the control protocol of the Radio Resource Control (RRC) between the UE 202 and the NR base station 213 are identical to those in LTE. The states of the NR base station 213 and the UE 202 in RRC include RRC_IDLE, RRC_CONNECTED, and RRC_INACTIVE.

RRC_IDLE and RRC_CONNECTED are identical to those in LTE. In RRC_INACTIVE, for example, broadcast of system information (SI), paging, cell reselection, and mobility are performed while the connection between the 5G Core and the NR base station 213 is maintained.

Through an NG interface, gNBs 217 are connected to the Access and Mobility Management Function (AMF), the Session Management Function (SMF), the User Plane Function (UPF), or an AMF/SMF/UPF unit (may be hereinafter referred to as a 5GC unit) 214 including the AMF, the SMF, and the UPF. The control information and/or user data are communicated between each of the gNBs 217 and the 5GC unit 214. The NG interface is a generic name for an N2 interface between the gNBs 217 and the AMF, an N3 interface between the gNBs 217 and the UPF, an N11 interface between the AMF and the SMF, and an N4 interface between the UPF and the SMF. A plurality of the 5GC units 214 may be connected to one of the gNBs 217. The gNBs 217 are connected through an Xn interface, and the control information and/or user data are communicated between the gNBs 217.

The NR base station 213 may configure one or more cells in the same manner as the base station 203. When the one NR base station 213 configures a plurality of cells, each of the cells is configured to communicate with the UE 202.

Each of the gNBs 217 may be divided into a Central Unit (may be hereinafter referred to as a CU) 218 and Distributed Units (may be hereinafter referred to as DUs) 219. The one CU 218 is configured in the gNB 217. The number of the DUs 219 configured in the gNB 217 is one or more. The CU 218 is connected to the DUs 219 via an F1 interface, and the control information and/or user data are communicated between the CU 218 and each of the DUs 219.

FIG. 4 illustrates a structure of the DC to be performed by an eNB and a gNB that are connected to the EPC. In FIG. 4, solid lines represent connection to the U-planes, and dashed lines represent connection to the C-planes. In FIG. 4, an eNB 223-1 becomes a master base station, and a gNB 224-2 becomes a secondary base station (this DC structure may be referred to as EN-DC). Although FIG. 4 illustrates an example U-Plane connection between the MME unit 204 and the gNB 224-2 through the eNB 223-1, the U-Plane connection may be established directly between the MME unit 204 and the gNB 224-2.

FIG. 5 illustrates a structure of the DC to be performed by gNBs that are connected to the NG core. In FIG. 5, solid lines represent connection to the U-planes, and dashed lines represent connection to the C-planes. In FIG. 5, a gNB 224-1 becomes a master base station, and the gNB 224-2 becomes a secondary base station (this DC structure may be referred to as NR-DC). Although FIG. 5 illustrates an example U-Plane connection between the 5GC unit 214 and the gNB 224-2 through the gNB 224-1, the U-Plane connection may be established directly between the 5GC unit 214 and the gNB 224-2.

FIG. 6 illustrates a structure of the DC to be performed by an eNB and a gNB that are connected to the NG core. In FIG. 6, solid lines represent connection to the U-planes, and dashed lines represent connection to the C-planes. In FIG. 6, an eNB 226-1 becomes a master base station, and the gNB 224-2 becomes a secondary base station (this DC structure may be referred to as NG-EN-DC). Although FIG. 6 illustrates an example U-Plane connection between the 5GC unit 214 and the gNB 224-2 through the eNB 226-1, the U-Plane connection may be established directly between the 5GC unit 214 and the gNB 224-2.

FIG. 7 illustrates another structure of the DC to be performed by an eNB and a gNB that are connected to the NG core. In FIG. 7, solid lines represent connection to the U-planes, and dashed lines represent connection to the C-planes. In FIG. 7, the gNB 224-1 becomes a master base station, and an eNB 226-2 becomes a secondary base station (this DC structure may be referred to as NE-DC). Although FIG. 7 illustrates an example U-Plane connection between the 5GC unit 214 and the eNB 226-2 through the gNB 224-1, the U-Plane connection may be established directly between the 5GC unit 214 and the eNB 226-2.

FIG. 8 is a block diagram showing the configuration of the user equipment 202 of FIG. 2. The transmission process of the user equipment 202 shown in FIG. 8 is described. First, a transmission data buffer unit 303 stores the control data from a protocol processing unit 301 and the user data from an application unit 302. The data stored in the transmission data buffer unit 303 is passed to an encoding unit 304, and is subjected to an encoding process such as error correction. There may exist the data output from the transmission data buffer unit 303 directly to a modulating unit 305 without the encoding process. The data encoded by the encoding unit 304 is modulated by the modulating unit 305. The modulating unit 305 may perform precoding in the MIMO. The modulated data is converted into a baseband signal, and the baseband signal is output to a frequency converting unit 306 and is then converted into a radio transmission frequency. After that, transmission signals are transmitted from antennas 307-1 to 307-4 to the base station 203. Although FIG. 8 exemplifies a case where the number of antennas is four, the number of antennas is not limited to four.

The user equipment 202 executes the reception process as follows. The radio signal from the base station 203 is received through each of the antennas 307-1 to 307-4. The received signal is converted from a radio reception frequency into a baseband signal by the frequency converting unit 306 and is then demodulated by a demodulating unit 308. The demodulating unit 308 may calculate a weight and perform a multiplication operation. The demodulated data is passed to a decoding unit 309, and is subjected to a decoding process such as error correction. Among the pieces of decoded data, the control data is passed to the protocol processing unit 301, and the user data is passed to the application unit 302. A series of processes by the user equipment 202 is controlled by a control unit 310. This means that, though not shown in FIG. 8, the control unit 310 is connected to the individual units 301 to 309. In FIG. 8, the number of antennas for transmission of the user equipment 202 may be identical to or different from that for its reception.

FIG. 9 is a block diagram showing the configuration of the base station 203 of FIG. 2. The transmission process of the base station 203 shown in FIG. 9 is described. An EPC communication unit 401 performs data transmission and reception between the base station 203 and the EPC (such as the MME unit 204). A 5GC communication unit 412 transmits and receives data between the base station 203 and the 5GC (e.g., the 5GC unit 214). A communication with another base station unit 402 performs data transmission and reception to and from another base station. The EPC communication unit 401, the 5GC communication unit 412, and the communication with another base station unit 402 each transmit and receive information to and from a protocol processing unit 403. The control data from the protocol processing unit 403, and the user data and the control data from the EPC communication unit 401, the 5GC communication unit 412, and the communication with another base station unit 402 are stored in a transmission data buffer unit 404.

The data stored in the transmission data buffer unit 404 is passed to an encoding unit 405, and then an encoding process such as error correction is performed for the data. There may exist the data output from the transmission data buffer unit 404 directly to a modulating unit 406 without the encoding process. The encoded data is modulated by the modulating unit 406. The modulating unit 406 may perform precoding in the MIMO. The modulated data is converted into a baseband signal, and the baseband signal is output to a frequency converting unit 407 and is then converted into a radio transmission frequency. After that, transmission signals are transmitted from antennas 408-1 to 408-4 to one or a plurality of user equipments 202. Although FIG. 9 exemplifies a case where the number of antennas is four, the number of antennas is not limited to four.

The reception process of the base station 203 is executed as follows. A radio signal from one or a plurality of user equipments 202 is received through the antenna 408. The received signal is converted from a radio reception frequency into a baseband signal by the frequency converting unit 407, and is then demodulated by a demodulating unit 409. The demodulated data is passed to a decoding unit 410 and then subject to a decoding process such as error correction. Among the pieces of decoded data, the control data is passed to the protocol processing unit 403, the 5GC communication unit 412, the EPC communication unit 401, or the communication with another base station unit 402, and the user data is passed to the 5GC communication unit 412, the EPC communication unit 401, and the communication with another base station unit 402. A series of processes by the base station 203 is controlled by a control unit 411. This means that, though not shown in FIG. 9, the control unit 411 is connected to the individual units 401 to 410. In FIG. 9, the number of antennas for transmission of the base station 203 may be identical to or different from that for its reception.

Although FIG. 9 is the block diagram illustrating the configuration of the base station 203, the base station 213 may have the same configuration. Furthermore, in FIGS. 8 and 9, the number of antennas of the user equipment 202 may be identical to or different from that of the base station 203.

FIG. 10 is a block diagram showing the configuration of the MME. FIG. 10 shows the configuration of an MME 204a included in the MME unit 204 shown in FIG. 2 described above. A PDN GW communication unit 501 performs data transmission and reception between the MME 204a and the PDN GW. A base station communication unit 502 performs data transmission and reception between the MME 204a and the base station 203 by means of the S1 interface. In a case where the data received from the PDN GW is user data, the user data is passed from the PDN GW communication unit 501 to the base station communication unit 502 via a user plane communication unit 503 and is then transmitted to one or a plurality of base stations 203. In a case where the data received from the base station 203 is user data, the user data is passed from the base station communication unit 502 to the PDN GW communication unit 501 via the user plane communication unit 503 and is then transmitted to the PDN GW.

In a case where the data received from the PDN GW is control data, the control data is passed from the PDN GW communication unit 501 to a control plane control unit 505. In a case where the data received from the base station 203 is control data, the control data is passed from the base station communication unit 502 to the control plane control unit 505.

The control plane control unit 505 includes a NAS security unit 505-1, an SAE bearer control unit 505-2, and an idle state mobility managing unit 505-3, and performs an overall process for the control plane (hereinafter also referred to as a "C-plane"). The NAS security unit 505-1 provides, for example, security of a non-access stratum (NAS) message. The SAE bearer control unit 505-2 manages, for example, a system architecture evolution (SAE) bearer. The idle state mobility managing unit 505-3 performs, for example, mobility management of an idle state (LTE-IDLE state which is merely referred to as idle as well), generation and control of a paging signal in the idle state, addition, deletion, update, and search of a tracking area of one or a plurality of user equipments 202 being served thereby, and tracking area list management.

The MME 204a distributes a paging signal to one or a plurality of base stations 203. In addition, the MME 204a performs mobility control of an idle state. When the user equipment is in the idle state and an active state, the MME 204a manages a list of tracking areas. The MME 204a begins a paging protocol by transmitting a paging message to the cell belonging to a tracking area in which the UE is registered. The idle state mobility managing unit 505-3 may manage the CSG of the eNBs 207 to be connected to the MME 204a, CSG IDs, and a whitelist.

FIG. 11 is a block diagram illustrating a configuration of the 5GC. FIG. 11 illustrates a configuration of the 5GC unit 214 in FIG. 3. FIG. 11 illustrates a case where the 5GC unit 214 in FIG. 5 includes configurations of the AMF, the SMF, and the UPF. A data network communication unit 521 transmits and receives data between the 5GC unit 214 and a data network. A base station communication unit 522 transmits and receives data via the S1 interface between the 5GC unit 214 and the base station 203 and/or via the NG interface between the 5GC unit 214 and the base station 213. When the data received through the data network is user data, the data network communication unit 521 passes the user data to the base station communication unit 522 through a user plane communication unit 523 to transmit the user data to one or more base stations, specifically, the base station 203 and/or the base station 213. When the data received from the base station 203 and/or the base station 213 is user data, the base station communication unit 522 passes the user data to the data network communication unit 521 through the user plane communication unit 523 to transmit the user data to the data network.

When the data received from the data network is control data, the data network communication unit 521 passes the control data to a session management unit 527 through the user plane control unit 523. The session management unit 527 passes the control data to a control plane control unit 525. When the data received from the base station 203 and/or the base station 213 is control data, the base station communication unit 522 passes the control data to the control plane control unit 525. The control plane control unit 525 passes the control data to the session management unit 527.

The control plane control unit 525 includes, for example, a NAS security unit 525-1, a PDU session control unit 525-2, and an idle state mobility managing unit 525-3, and performs overall processes on the control planes (may be hereinafter referred to as C-Planes). The NAS security unit 525-1, for example, provides security for a Non-Access Stratum (NAS) message. The PDU session control unit 525-2, for example, manages a PDU session between the user equipment 202 and the 5GC unit 214. The idle state mobility managing unit 525-3, for example, manages mobility of an idle state (an RRC_IDLE state or simply referred to as idle), generates and controls paging signals in the idle state, and adds, deletes, updates, and searches for tracking areas of one or more user equipments 202 being served thereby, and manages a tracking area list.

The 5GC unit 214 distributes the paging signals to one or more base stations, specifically, the base station 203 and/or the base station 213. Furthermore, the 5GC unit 214 controls mobility of the idle state. The 5GC unit 214 manages tracking area list when a user equipment is in an idle state, an inactive state, and an active state. The 5GC unit 214 starts a paging protocol by transmitting a paging message to a cell belonging to a tracking area in which the UE is registered.

An example of a cell search method in a mobile communication system is described next. FIG. 12 is a flowchart showing an outline from a cell search to an idle state operation performed by a communication terminal (UE) in the LTE communication system. When starting a cell search, in Step ST601, the communication terminal synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signals (SSs). The number of PCIs is currently studied in 504 ways. The 504 ways of PCIs are used for synchronization, and the PCIs of the synchronized cells are detected (specified).

In Step ST602, next, the user equipment detects a cell-specific reference signal (CRS) being a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is calculated from the PCI specified in Step ST601, so that the RS can be detected and the RS received power can be measured.

In Step ST603, next, the user equipment selects the cell having the best RS received quality, for example, the cell having the highest RS received power, that is, the best cell, from one or more cells that have been detected up to Step ST602.

In Step ST604, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as a transmission bandwidth configuration (dl-bandwidth)), the number of transmission antennas, and a system frame number (SFN).

In Step ST605, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST606, next, the communication terminal compares the TAC of the SIB1 received in Step ST605 with the TAC portion of a tracking area identity (TAI) in the tracking area list that has already been possessed by the communication terminal. The tracking area list is also referred to as a TAI list. TAI is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST606 shows that the TAC received in Step ST605 is identical to the TAC included in the tracking area list, the user equipment enters an idle state operation in the cell. If the comparison shows that the TAC received in Step ST605 is not included in the tracking area list, the communication terminal requires a core network (EPC) including MME to change a tracking area through the cell for performing tracking area update (TAU).

Although FIG. 12 exemplifies the operations from the cell search to the idle state in LTE, the best beam may be selected in NR in addition to the best cell in Step ST603. In NR, information on a beam, for example, an identifier of the beam may be obtained in Step ST604. Furthermore, scheduling information on the Remaining Minimum SI (RMSI) in NR may be obtained in Step ST604. The RMSI in NR may be obtained in Step ST605.

The device configuring a core network (hereinafter, also referred to as a "core-network-side device") updates the tracking area list based on an identification number (such as UE-ID) of a communication terminal transmitted from the communication terminal together with a TAU request signal. The core-network-side device transmits the updated tracking area list to the communication terminal. The communication terminal rewrites (updates) the TAC list of the communication terminal based on the received tracking area list. After that, the communication terminal enters the idle state operation in the cell.

Widespread use of smartphones and tablet terminal devices explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of macro eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell having a relatively wide coverage, such as a cell configured by a conventional eNB, and a "macro eNB" refers to an eNB configuring a macro cell. A "small cell" refers to a cell having a relatively narrow coverage, such as a downsized cell, and a "small eNB" refers to an eNB configuring a small cell.

The macro eNB may be, for example, a "wide area base station" described in Non-Patent Document 7.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 7.

FIG. 13 illustrates an example structure of a cell in NR. In the cell in NR, a narrow beam is formed and transmitted in a changed direction. In the example of FIG. 13, a base station 750 performs transmission and reception with a user equipment via a beam 751-1 at a certain time. The base station 750 performs transmission and reception with the user equipment via a beam 751-2 at another time. Similarly, the base station 750 performs transmission and reception with the user equipment via one or more of beams 751-3 to 751-8. As such, the base station 750 configures a cell with a wide range.

Although FIG. 13 exemplifies that the number of beams to be used by the base station 750 is eight, the number of beams may be different from eight. Although FIG. 13 also exemplifies that the number of beams to be simultaneously used by the base station 750 is one, the number of such beams may be two or more.

The packet duplication may be used as an example method for satisfying the requirements of Ultra Reliability, Low Latency Communication (URLLC). A transmitter may duplicate a PDCP PDU in the PDCP layer, and transmit the PDCP PDUs to a receiver. The packet duplication may be, for example, packet duplication using the DC or the CA. The transmitter may be a base station or a UE. Furthermore, the receiver may be the UE or the base station.

However, none defines the timing to transfer a received packet to the upper layer in the packet duplication. This causes variations in latency (hereinafter may be referred to as jitter) in data transmission from the transmitter to the receiver. For example, when the timings to receive the duplicated packets are different, the receiver transfers the packets to the upper layer with different timings, depending on a decoding result of the packet whose reception timing is earlier (e.g., a result of the CRC). This causes variations in latency in the data transmission. Consequently, a problem of worsening of the jitter characteristics occurs.

A solution to the problem is hereinafter disclosed.

The base station schedules the same time resource for a plurality of carriers for the UE. Examples of the plurality of carriers may include a carrier to be used in the packet duplication with the CA. The base station may schedule the same time resource for the carriers to be used in the packet duplication. For example, intra-carrier scheduling may be used.

Whether scheduling the same time resource for the plurality of carriers is necessary may be predetermined in a standard. For example, whether scheduling the same time resource is necessary may be determined using a QoS parameter. Information on network slicing (e.g., Network Slice Selection Assistance Information (NSSAI)) may be used. Whether the scheduling is necessary may be determined per PDU session, per QoS flow, or per bearer.

The QoS parameter may include, for example, information on a transmission cycle of user data (hereinafter may be referred to as cycle time) or information on a jitter tolerance. The information on the jitter tolerance may be given, for example, as a percentage for the cycle time or per particular time unit (e.g., per millisecond or per microsecond).

The QoS parameter may include information on an offset for the transmission cycle in the transmission timing of the user data. The information on the offset may be given as, for example, information on a particular time or information using a slot number. A subframe number or a symbol number may be used as the information on the offset.

The QoS parameter may include only the information on the jitter tolerance. The information on the jitter tolerance may be given, for example, per particular time unit (e.g., per millisecond or per microsecond). This can enhance the jitter characteristics, for example, even when data is not cyclically transmitted in the communication requiring the jitter characteristics.

As another example, the high-level NW device may determine whether scheduling the same time resource for the plurality of carriers is necessary. The high-level NW device may be, for example, the AMF or the SMF. The high-level NW device may determine whether the scheduling is necessary, using the QoS parameter or the information on network slicing. The high-level NW device may determine whether the scheduling is necessary, per PDU session, per QoS flow, or per bearer. The high-level NW device may notify the base station of information on whether scheduling the same time resource for the plurality of carriers is necessary. The interface between the high-level NW device and the base station may be used for the notification. This can, for example, enhance the jitter characteristics and reduce the processing time in the base station.

As another example, the base station may determine whether scheduling the same time resource for the plurality of carriers is necessary. The base station may determine whether the scheduling is necessary, using the QoS parameter or the information on network slicing. The base station may determine whether the scheduling is necessary, per PDU session, per QoS flow, or per bearer.

Another solution is disclosed. The receiver transfers the received packet to the upper layer with the reception timing of the packet received later in the packet duplication. The receiver may be the base station or the UE. Specifically, the method may be applied to the uplink communication or the downlink communication.

The receiver may hold the packet received earlier. The receiver may hold the packet received earlier, for example, until receiving the packet arriving later. This enables, for example, the UE to transfer the received packet to the upper layer with the reception timing of the packet transmitted later, irrespective of a decoding result of the packet received earlier. Consequently, jitter can be reduced.

Holding of the packet by the receiver may be applied to a bearer in which the packet duplication has been configured. This can, for example, prevent increase in the latency of another data while enhancing the jitter characteristics of the packet. As another example, holding of the packet by the receiver may be applied to a bearer in which the packet duplication is activated. This enables, for example, the receiver to promptly transfer the received data to the upper layer in a bearer in which the packet duplication has been configured but is deactivated.

The packet may be held, for example, in the PDCP layer of the receiver. Upon receipt of both of the packets duplicated in the PDCP layer of the transmitter, the PDCP layer in the receiver may transfer one of the packets to the upper layer. One of the packets may be the packet received earlier or later. The receiver may discard the other packet that is not transferred to the upper layer.

As another example, the packet may be held in the RLC layer of the receiver. For example, data of a logical channel to be used in the packet duplication may be held.

As another example, the packet may be held in the MAC layer of the receiver. For example, data of a transport block to be used for transmitting and receiving the packet may be held. The data of the transport block may be held, for example, when a logical channel different from the logical channel to be used for transmitting and receiving the packet is not mapped to the transport block. This facilitates, for example, the processing in the receiver.

As another example of holding the packet in the MAC layer, data of the logical channel to be used for transmitting and receiving the packet may be held. Logical channel data multiplexed into the transport block received in the receiver may be held. The receiver may transfer, to the upper layer, data of a logical channel different from the logical channel in the logical channel data multiplexed into the transport block, without holding the data. This can, for example, prevent increase in the latency in the logical channel different from the logical channel to be used for transmitting and receiving the packet.

As another example, the packet may be held in the Service Data Adaptation Protocol (SDAP) layer or the upper layer, for example, an application layer in the receiver. For example, the receiver may notify the SDAP layer or the upper layer of information on the packet received later.

As another example of holding of the packet in the receiver, the receiver may hold only information for identifying the packet. The receiver may hold, for example, only the PDCP sequence number of the packet. The receiver may check information on the packet received later against the held information. The receiver may transfer the packet received later to the upper layer. The receiver may transfer the packet when information for identifying the packet received later is identical to the information held by the receiver. This can, for example, reduce the amount of memory to be used for holding the packet in the receiver.

The base station may configure, for the UE, whether the receiver performs the transfer to the upper layer with the reception timing of the packet received later. The base station may perform the configuration, for example, via the RRC signaling, the MAC signaling, or the L1/L2 signaling. As another example of the configuration, the high-level NW device may perform the configuration for the UE through the base station. The high-level NW device may be, for example, the AMF or the SMF. The high-level NW device may perform the configuration, for example, via the NAS signaling.

The configuration may include information on whether the receiver performs the transfer to the upper layer with the reception timing of the packet received later, information on the bearer to be used for transmitting and receiving the packet, information on the logical channel to be used for transmitting and receiving the packet, or information on the QoS flow with which the packet is transmitted and received.

The base station may perform the configuration using the QoS parameter or the information on network slicing. For example, when the jitter tolerance included in the QoS parameter is small, the receiver may perform the transfer to the upper layer with the reception timing of the packet received later. As another example, the high-level NW device may perform the configuration using the QoS parameter or the information on network slicing. The QoS parameter may be identical to the QoS parameter disclosed as a solution for scheduling the same time resource for a plurality of carriers.

The UE may switch the timing to transfer the received packet to the upper layer, using the configuration. For example, the UE may switch the timing to transfer a downlink packet to the upper layer from the reception timing of the packet received earlier to the reception timing of the packet received later. The UE may perform the switching in reverse. This enables, for example, flexible switching between communication requiring the jitter characteristics and communication that does not require the jitter characteristics in the communication system.

The receiver may transfer the received packet to the upper layer, irrespective of the configuration. The receiver may perform the transfer, for example, when receiving the MAC signaling including an instruction for deactivating the packet duplication. When receiving the MAC signaling from the base station, the receiver (e.g., the UE) may transfer, to the upper layer, the received packet held in its own UE. The received packet may be, for example, the packet received earlier in the packet duplication. This can, for example, reduce the amount of stored memory after terminating the packet duplication.

FIG. 14 illustrates operations of the receiver for transferring a packet to the upper layer with the reception timing of a packet to be transmitted later out of duplicated packets according to the first embodiment. FIG. 14 illustrates a case where the duplicated packets are mapped to Logical CHannels (LCH) #1 and #2. FIG. 14 also illustrates a case where the CA is used for the packet duplication. In FIG. 14, "Cycle time" represents a cycle on which data is transmitted from the transmitter.

In FIG. 14, the receiver receives a packet 1401 from the LCH #1 and a packet 1402 from the LCH #2. The packets 1401 and 1402 are identical packets duplicated in the packet duplication. In FIG. 14, the receiver receives the packet 1401 earlier. The receiver holds the packet 1401 until receiving the packet 1402 from the LCH #2 (see the dashed arrow in FIG. 14). With the timing to receive the packet 1402, the receiver transfers the packet 1401 to the upper layer (see the thick arrow in FIG. 14). The receiver discards the packet 1402 received later.

After a lapse of time corresponding to Cycle time since the receipt of the packets 1401 and 1402, the receiver receives a packet 1403 from the LCH #1 and a packet 1404 from the LCH #2. The packets 1403 and 1404 are identical packets duplicated in the packet duplication. The operations of the receiver are identical to those upon receipt of the packets 1401 and 1402.

After a lapse of time corresponding to Cycle time since the receipt of the packets 1403 and 1404, the receiver receives a packet 1405 from the LCH #1 and a packet 1406 from the LCH #2. The packets 1405 and 1406 are identical packets duplicated in the packet duplication. The operations of the receiver are identical to those upon receipt of the packets 1401 and 1402.

After a lapse of time corresponding to Cycle time since the receipt of the packets 1405 and 1406, the receiver receives a packet 1407 from the LCH #1 and a packet 1408 from the LCH #2. The packets 1407 and 1408 are identical packets duplicated in the packet duplication. In the example of FIG. 14, the receiver receives the packet 1408 earlier. The receiver holds the packet 1408 until receiving the packet 1407 from the LCH #1. The receiver transfers the packet 1408 to the upper layer with the timing to receive the packet 1407. The receiver discards the packet 1407 received later.

Although FIG. 14 illustrates the example using the CA in the packet duplication, the DC may be used in the packet duplication. In the packet duplication using the DC, the master base station and the secondary base station may use the LCH #1 and the LCH #2 in FIG. 14, respectively. The secondary base station and the master base station may use the LCH #1 and the LCH #2, respectively. Even when a communication path between the UE and one of the base stations is interrupted (for example, blocked), the communication can be maintained between the UE and the other base station. This can enhance the reliability in the communication.

FIG. 14 illustrates the operation of the receiver for holding the packet received earlier. However, the receiver may hold only an identifier of the packet received earlier. The identifier may be, for example, a PDCP sequence number. The receiver may hold, for example, a PDCP sequence number of the packet 1401 received earlier. The receiver may discard information other than the PDCP sequence number of the packet 1401. The receiver may check the PDCP sequence number of the packet 1402 received later against the held PDCP sequence number. The receiver may transfer the packet 1402 to the upper layer, for example, when the PDCP sequence number is identical to the held PDCP sequence number. These operations for the packets 1401 and 1402 may be applied to the packets 1403 and 1404. The operations for the packets 1401 and 1402 may also be applied to the packets 1405 and 1406. The operations for the packets 1401 and 1402 may also be applied to the packets 1408 and 1407. The operations of the receiver for the packet 1401 may be applied to the packet 1408, and the operations for the packet 1402 may be applied to the packet 1407. This can, for example, reduce the memory usage in the receiver.

The application of the operations in the receiver causes the following problem. Specifically, when the receiver cannot receive the packet whose reception timing is later, for example, when a decoding error occurs upon reception of the packet, the receiver cannot transfer the received packet to the upper layer without waiting for retransmission of the packet (for example, HARQ retransmission). This causes problems of increase in the latency and worsening of the jitter characteristics.

A method for solving the problems is disclosed.

The receiver transfers the received packet to the upper layer with predetermined timing. The receiver may hold the packet received earlier until the timing. The receiver may hold the packet received later until the timing, or discard the packet. The receiver may transfer the packet received earlier to the upper layer, for example, after the predetermined timing has passed. The receiver may transfer the packet to the upper layer immediately after receiving the packet, when the predetermined timing has passed.

Holding of the packet by the receiver may be applied to a bearer in which the packet duplication has been configured. This can, for example, prevent increase in the latency of another data while enhancing the jitter characteristics of the packet. As another example, holding of the packet by the receiver may be applied to a bearer in which the packet duplication is activated. This enables, for example, the receiver to promptly transfer the received data to the upper layer in a bearer in which the packet duplication has been configured but is deactivated.

The receiver may hold the packet in the PDCP layer or the RLC layer. The receiver may hold, for example, data of a logical channel to be used in the packet duplication.

As another example, the receiver may hold the packet in the MAC layer. The receiver may hold, for example, data of the transport block to be used for transmitting and receiving the packet. The receiver may hold the data of the transport block, for example, when a logical channel different from the logical channel to be used for transmitting and receiving the packet is not mapped to the transport block. This facilitates, for example, the processing in the receiver.

As another example of holding the packet in the MAC layer, the receiver may hold data of the logical channel to be used for transmitting and receiving the packet. The receiver may hold logical channel data multiplexed into the received transport block. The receiver may transfer, to the upper layer, data of a logical channel different from the logical channel in the logical channel data multiplexed into the transport block, without holding the data. This can, for example, prevent increase in the latency in the logical channel different from the logical channel to be used for transmitting and receiving the packet.

As another example, the receiver may hold the packet in the Service Data Adaptation Protocol (SDAP) layer or the upper layer, for example, an application layer. For example, the receiver may notify the SDAP layer or the upper layer of information on the packet received later.

The receiver may transfer the packet to the upper layer with the timing arriving earlier, out of the predetermined timing and the reception timing of the packet received later. This can, for example, reduce the memory consumption in the receiver. The upper layer may hold the packet until the predetermined timing. For example, when the reception timing of the packet received later arrives earlier than the predetermined timing, the upper layer may hold the packet until the predetermined timing. This can, for example, enhance the jitter characteristics in transmitting and receiving the packet.

The base station may determine the timing. The base station may notify the UE of information on the timing. The base station may notify the UE of the timing, for example, via the RRC signaling, the MAC signaling, or the L1/L2 signaling. The UE may transfer the received packet to the upper layer using the information. As another example of the operations in the UE, the UE may transmit the duplicated packets to the base station using the information. The UE may transmit the duplicated packets to the base station, for example, so that the base station transfers the received packets to the upper layer in time for the timing.

As another example, the high-level NW device may determine the timing. The high-level NW device may be, for example, the AMF or the SMF. The high-level NW device may notify the UE of information on the timing through the base station. The high-level NW device may give the notification, for example, via the NAS signaling.

As another example, the UE may determine the timing. The UE may notify the base station of information on the timing. The base station may approve or disapprove the timing determined by the UE. As another example, the base station may notify the high-level NW device of the timing determined by the UE. The high-level NW device may approve or disapprove the timing determined by the UE. The UE may notify the base station and/or the high-level NW device of the information, for example, via the NAS signaling, the RRC signaling, the MAC signaling, or the L1/L2 signaling. Consequently, the UE that is a transmission source can determine the timing, for example, when transmitting the uplink data. This can increase the efficiency in the communication system.

Information on the predetermined timing may be given, for example, using a slot number. The receiver may transfer the received packet to the upper layer in a slot corresponding to the given number. As another example, the information may be given using information for identifying a non-slot (may be referred to as a mini-slot), e.g., the number of the non-slot. The receiver may transfer the received packet to the upper layer in the non-slot corresponding to the given number. The information may be given per symbol. The receiver may transfer the received packet to the upper layer in a symbol corresponding to the given number. This can enhance the jitter characteristics, for example, even when transmission and reception of data are scheduled per unit shorter than one slot. Information on the predetermined timing may be given, for example, using a combination of the numbers. The information may be given, for example, using a combination of a slot number and a symbol number. This can enhance the jitter characteristics, for example, even when communication requiring the jitter characteristics is not performed on one slot cycle.

The information on the predetermined timing may include information on a cycle. The information may be, for example, the cycle time described in Non-Patent Document 23 (3GPP TR22.804 V16.1.0). The information may be given per absolute time, for example, per millisecond, per subframe, per slot, per symbol, or per non-slot. The receiver may derive the timing to transfer the received packet to the upper layer, using the information. The receiver may transfer the received packet to the upper layer with the derived timing. Consequently, for example, the high-level NW device or the base station need not notify, per packet, the UE of the timing to transfer the received packet to the upper layer. This can reduce the amount of signaling between the high-level NW device or the base station and the UE.

The information on the predetermined timing may include the information on the cycle and information on an offset. The information on the offset may be given, for example, per subframe, per slot, per symbol, or per non-slot. The receiver may derive the timing to transfer the received packet to the upper layer, using the information. The receiver may transfer the received packet to the upper layer with the derived timing. In addition to the aforementioned advantages, for example, the complexity in a process of deriving the timing by the receiver can be avoided.

The base station may configure, for the UE, whether the receiver performs the transfer to the upper layer with the predetermined timing. The base station may perform the configuration, for example, via the RRC signaling, the MAC signaling, or the L1/L2 signaling. As another example of the configuration, the high-level NW device may perform the configuration for the UE through the base station. The high-level NW device may be, for example, the AMF or the SMF. The high-level NW device may perform the configuration, for example, via the NAS signaling.

The QoS parameter may include the information on the predetermined timing. For example, the information on the predetermined timing may be associated with an identifier of the QoS parameter. The QoS parameter may be identical to the QoS parameter disclosed as a solution for scheduling the same time resource for a plurality of carriers.

The base station may perform the configuration using the QoS parameter for the UE. Alternatively, the high-level NW device may perform the configuration using the QoS parameter for the UE through the base station. As another example, the high-level NW device may notify the base station of the QoS parameter. The base station may extract the information on the predetermined timing from the QoS parameter. The base station may notify the UE of the information on the predetermined timing.

The UE may switch the timing to transfer the received packet to the upper layer, using the configuration. For example, the UE may switch the timing to transfer a downlink packet to the upper layer from the reception timing of the packet received earlier to the predetermined timing. The UE may perform the switching in reverse. As another example, the UE may switch the timing to transfer the downlink packet to the upper layer from the reception timing of the packet received later to the predetermined timing. The UE may perform the switching in reverse. As another example, the UE may change the predetermined timing to be used for transferring the downlink packet to the upper layer. This enables, for example, flexible switching between communication requiring the jitter characteristics and communication that does not require the jitter characteristics in the communication system.

The receiver may discard the received data falling out of the jitter tolerance. The receiver may, for example, determine whether the received data falls within the jitter tolerance, using the QoS parameter. This can, for example, prevent a malfunction caused by the data falling out of the jitter tolerance, in a service using the communication system.

The base station may change the predetermined timing. The base station may change, for example, a transmission cycle or an offset for the transmission cycle. The base station may determine the changed predetermined timing, and notify the UE of the timing. As another example, the UE may determine the changed predetermined timing, and notify the base station of the timing. The base station may determine the timing notified from the UE. This can, for example, increase the flexibility in the scheduling while securing the jitter characteristics in the communication system.

The changed timing may be determined using the reception timing in the receiver. The changed timing may be determined, for example, using a moving average of the reception timings in the receiver. The changed timing may be calculated cyclically or using an instruction from the base station or the high-level NW device. The cycle on which the changed timing is calculated may be defined in a standard, notified from the high-level NW device to the base station and/or the UE, or determined and notified to the UE by the base station. This can, for example, determine the predetermined timing using the actual reception timing in the communication system. Consequently, the jitter characteristics can be enhanced.

As another example on notification of the predetermined timing, the transmitter may notify information on the transmission time of transmission data or information on the reception due time at which the receiver should perform reception. The reception due time may be, for example, the time at which the receiver should transfer data to the upper layer. The time may be, for example, the time per millisecond, the time using a subframe number, the time using a slot number, the time using a mini-slot number, the time using a symbol number, or the time using a combination of some of these. The transmitter may, for example, attach a timestamp to the transmission data. The timestamp may represent information identical to the aforementioned time. The upper layer, the SDAP, the PDCP, the RLC, or the MAC may attach the timestamp. As another example, the information on the transmission time and/or the information on the reception due time may be notified via the RRC signaling, the MAC signaling, or the L1/L2 signaling. The receiver may derive the predetermined timing using the information on the transmission time and/or the reception due time. The receiver may remove the timestamp from the received data. The method for notifying the predetermined timing may be used, for example, in transmitting and receiving non-cyclical data. Consequently, for example, the latency in transmitting and receiving the non-cyclical data can be held constant. Specifically, jitter can be reduced.

The receiver may transfer the received packet to the upper layer, irrespective of the configuration. The receiver may perform the transfer, for example, when receiving the MAC signaling including an instruction for deactivating the packet duplication. When receiving the MAC signaling from the base station, the receiver (e.g., the UE) may transfer, to the upper layer, the received packet held in its own UE. The transfer operation may, for example, precede the aforementioned timing. This can, for example, reduce the amount of stored memory after terminating the packet duplication.

The receiver need not request the transmitter to retransmit a packet whose reception result is not normal (e.g., a decoding error), in the packet duplication. The retransmission may be, for example, HARQ retransmission or RLC retransmission. The operation should be performed when one of decoding results of duplicated packets is normal. This can increase the efficiency in the communication system. The HARQ entity of the receiver may regard, as OK, the decoding result of a packet whose reception result is not normal. The RLC layer of the receiver may regard the Ack for the packet. The RLC layer of the receiver may, for example, advance a reception window.

FIG. 15 illustrates operations of the receiver for transferring received packets to the upper layer with the predetermined timing according to the first embodiment. FIG. illustrates a case where the duplicated packets are mapped to the Logical CHannels (LCH) #1 and #2. FIG. 15 also illustrates a case where the CA is used for the packet duplication. In FIG. 15, "Cycle time" represents a cycle on which data is transmitted from the transmitter. In FIG. 15, the same numbers are applied to the elements common to those in FIG. 14, and the common description thereof is omitted.

In FIG. 15, the receiver receives the packet 1401 earlier. The receiver transfers the packet 1401 to the upper layer with the predetermined timing (see the timing represented by the broken line in FIG. 15) immediately after receiving the packet 1401. The receiver receives the packet 1402. The receiver discards the packet 1402 received later.

After a lapse of time corresponding to Cycle time since the receipt of the packets 1401 and 1402, the receiver receives the packets 1403 and 1404 in FIG. 15. The receiver receives the packet 1403 earlier. The receiver holds the packet 1403, and attempts to receive the packet 1404 transmitted later. The example of FIG. 15 illustrates a case where the reception result of the packet 1404 in the receiver is a decoding error. The receiver transfers the packet 1403 to the upper layer with the predetermined timing. Then, the receiver receives the HARQ-retransmitted packet 1404. The receiver discards the packet 1404 received later.

After a lapse of time corresponding to Cycle time since the receipt of the packets 1403 and 1404, the receiver receives the packets 1405 and 1406 in FIG. 15. The receiver receives the packet 1405 earlier and holds it. The receiver receives the packet 1406 later. The receiver discards the packet 1406 received later. The example of FIG. illustrates a case where the predetermined timing exists after the reception timings of the packets 1405 and 1406. The receiver transfers the packet 1405 to the upper layer with the predetermined timing.

After a lapse of time corresponding to Cycle time since the receipt of the packets 1405 and 1406, the receiver receives the packet 1407 from the LCH #1 and the packet 1408 from the LCH #2. In the example of FIG. 15, the receiver receives the packet 1408 earlier out of the packets 1407 and 1408. The receiver holds the packet 1408. The receiver transfers the packet 1408 to the upper layer with the predetermined timing. The receiver receives the packet 1407 transmitted later, and discards it.

Although FIG. 15 illustrates the example using the CA in the packet duplication, the DC may be used in the packet duplication similarly to FIG. 14. Even when a communication path between the UE and one of the base stations is interrupted (for example, blocked), the communication can be maintained between the UE and the other base station. This can enhance the reliability in the communication.

The solution disclosed in the first embodiment may be applied to the uplink transmission/reception using a configured grant or to the downlink transmission/reception using a configured scheduling assignment. In the uplink communication, both of the packets duplicated in the packet duplication may be transmitted and received using the configured grant. In the uplink communication, one of the packets may be transmitted and received using the configured grant, and the other packet may be transmitted and received using a dynamic grant. In the downlink communication, both of the packets duplicated in the packet duplication may be transmitted and received using the configured scheduling assignment. Furthermore, one of the packets may be transmitted and received using the configured scheduling assignment, and the other packet may be transmitted and received using a dynamic scheduling assignment. This enables, for example, the base station to perform flexible scheduling in the packet duplication.

In the packet duplication using the configured grant and/or configured scheduling assignment, the receiver may transfer the received packet to the upper layer with the reception timing of the packet received later. The receiver may transfer the received packet to the upper layer, irrespective of a reception result of the packet received later (e.g., a decoding result). The receiver may transfer the packet received earlier to the upper layer, for example, even when a decoding error occurs in the packet received later. The receiver may derive the timing of the packet transmitted later, using information on the configured grant or the configured scheduling assignment to be used in a logical channel in which the packet to be received later is transmitted and received. The operations may be applied to transmission and reception of the packet received later using the configured grant in the uplink communication, or to transmission and reception of the packet received later using the configured scheduling assignment in the downlink communication. The operations should be performed when the reception result of the packet received earlier is normal (e.g., the decoding result is normal). This enables, for example, the receiver to transfer a packet to the upper layer without waiting for the HARQ retransmission, even when a decoding error occurs in the packet received later. Consequently, the jitter characteristics can be enhanced.

The receiver need not request the transmitter to retransmit a packet whose reception result is not normal (e.g., a decoding error), in the packet duplication using the configured grant and/or configured scheduling assignment. The retransmission may be, for example, the HARQ retransmission or the RLC retransmission. The operation should be performed when one of decoding results of duplicated packets is normal. This can increase the efficiency in the communication system. The HARQ entity of the receiver may regard, as OK, the decoding result of a packet whose reception result is not normal. The RLC layer of the receiver may regard the Ack for the packet. The RLC layer of the receiver may, for example, advance a reception window.

FIG. 16 illustrates another example of operations of the receiver for transferring a packet to the upper layer with the reception timing of a packet to be transmitted later out of duplicated packets according to the first embodiment. FIG. 16 illustrates a case where the duplicated packets are mapped to the Logical CHannels (LCH) #1 and #2. FIG. 16 illustrates a case where the configured scheduling is assigned to each of the LCHs #1 and #2. In FIG. 16, rectangle regions represent time resources assigned in the configured scheduling, and among the regions, regions with cross hatching that slants down to the left each represent timing with which the duplicated packet is transmitted. FIG. 16 also illustrates a case where the CA is used for the packet duplication. In FIG. 16, "Cycle time" represents a cycle on which data is transmitted from the transmitter. In FIG. 16, the same numbers are applied to the elements common to those in FIG. 15, and the common description thereof is omitted.

In FIG. 16, the receiver simultaneously receives the packet 1601 transmitted from the LCH #1 and the packet 1602 transmitted from the LCH #2. The packets 1601 and 1602 are identical packets duplicated in the packet duplication. The receiver transfers the packet 1601 to the upper layer. The receiver discards the packet 1602.

After a lapse of time corresponding to Cycle time since the receipt of the packets 1601 and 1602, the receiver receives the packet 1603 from the LCH #1 earlier than the packet 1604 from the LCH #2. The packets 1603 and 1604 are identical packets duplicated in the packet duplication. The receiver holds the packet 1603. The receiver transfers the packet 1603 to the upper layer upon receipt of the packet 1604. The receiver discards the packet 1604.

After a lapse of time corresponding to Cycle time since the receipt of the packets 1603 and 1604, the receiver receives the packet 1606 from the LCH #2 earlier than the packet 1605 from the LCH #1. The packets 1605 and 1606 are identical packets duplicated in the packet duplication. The receiver holds the packet 1606. The receiver transfers the packet 1606 to the upper layer upon receipt of the packet 1605. The receiver discards the packet 1605.

After a lapse of time corresponding to Cycle time since the receipt of the packets 1605 and 1606, the receiver receives the packet 1607 from the LCH #1 earlier than the packet 1608 from the LCH #2. The packets 1607 and 1608 are identical packets duplicated in the packet duplication. The receiver holds the packet 1607. The receiver transfers the packet 1607 to the upper layer upon receipt of the packet 1608. The receiver discards the packet 1608.

Although FIG. 16 illustrates the example using the CA in the packet duplication, the DC may be used in the packet duplication similarly to FIGS. 14 and 15. Even when a communication path between the UE and one of the base stations is interrupted (for example, blocked), the communication can be maintained between the UE and the other base station. This can enhance the reliability in the communication.

FIG. 16 illustrates a case where the configured scheduling is assigned to each of the LCHs #1 and #2. However, the configured scheduling may be assigned to one of the LCHs #1 and #2, and dynamic scheduling may be assigned to the other. Such scheduling assignments may be performed in the downlink communication. As another example, a configured grant may be assigned to each of the LCHs #1 and #2. Alternatively, the configured grant may be assigned to one of the LCHs #1 and #2, and a dynamic grant may be assigned to the other. Such grants may be assigned in the uplink communication. This enables, for example, the base station to perform flexible scheduling in the packet duplication.

FIG. 16 illustrates a case where reception results of the packet 1601 to 1608 (e.g., decoding results) are normal. However, the receiver may transfer the packet received earlier to the upper layer even when a reception error (e.g., a CRC error) occurs in the packet received later. The operation may be applied, for example, when the packet received later is transmitted using the configured scheduling assignment or using the configured grant. In such a case, the receiver need not request the HARQ retransmission or the RLC retransmission from the transmitter. This can, for example, enhance the jitter characteristics and increase the efficiency in the communication system.

The configured grant and/or the configured scheduling to be used for transmitting each duplicated packet may be assigned with the same timing. The timing may be replaced with, for example, the same cycle or the same timing offset. The cycle may be identical to, for example, a transmission cycle of a packet to be duplicated. The timing offset may be identical to, for example, the predetermined timing. For example, jitter can be reduced with less amount of processing in the communication system.

Information on the timing with which the configured grant and/or the configured scheduling are assigned may be notified between base stations. The notification may include, for example, information on the cycle or information on the timing offset. The notification may be given, for example, in the packet duplication using the DC. The master base station may notify the secondary base station of information on the timing. The master base station may determine the timing using the information.

Both of the duplicated packets may be transmitted and received with a part of the timing with which the configured grant and/or the configured scheduling are assigned. Both of the duplicated packets may be transmitted and received with the part of the timing, for example, when the cycle of the configured grant and/or configured scheduling assignment is different from that of the duplicated packets. This enables transmission and reception of the packets using the configured grant and/or configured scheduling assignment, for example, even when the configured grant and/or configured scheduling assignment cannot be secured on the cycle of the duplicated packets in the communication between the base station and the UE.

Information on the part of the timing may be predetermined in a standard. The duplicated packets may be transmitted and received, for example, with the timing to assign the configured grant and/or the configured scheduling which is the closest to the predetermined timing in transmitting and receiving the duplicated packets. Alternatively, the transmission and reception may be performed with the closest timing before or after the predetermined timing.

The aforementioned methods may be used in combination. For example, when the timing to assign the configured grant and/or the configured scheduling is present at equal intervals before and after the predetermined timing as the immediately closest timings of the predetermined timing, the configured grant and/or configured scheduling assignment before the predetermined timing may be used. As another example, the configured grant and/or configured scheduling assignment after the predetermined timing may be used.

As another example, the base station may determine the information on the part of the timing and notify the UE of the information. The notification from the base station to the UE may include, for example, information on a grant and/or an assignment to be used for transmitting and receiving the duplicated packets, in the configured grant and/or configured scheduling assignment. The information may include, for example, information on a pattern of the grant and/or assignment to be used for transmitting and receiving the packet. The information on the pattern may be, for example, information on a bitmap representing the presence or absence of the use for transmitting and receiving the packet, or information in another format. As another example, the information on the grant and/or assignment to be used for transmitting and receiving the duplicated packets may include information on the cycle of the pattern or information on a validity period of the pattern.

The information on the part of the timing may be notified, for example, via the RRC signaling. This enables, for example, the base station to notify the UE of a large amount of information. Consequently, the flexibility in the communication system can be increased. As another example, the base station may give the notification via the MAC signaling. For example, the multi-level modulation enables the base station to promptly notify the UE of a large amount of information. As another example, the base station may give the notification, for example, via the L1/L2 signaling. This enables, for example, further prompt notification from the base station to the UE.

The operations of the receiver for transferring received packets to the upper layer with the predetermined timing may be applied when the configured grant or the configured scheduling is assigned. The operations of the receiver and notification of the timing from the high-level NW device or the base station to the UE may be performed in the methods disclosed in the first embodiment. The same may be applied to notification of the timing from the UE to the base station or the high-level NW device. This can, for example, further enhance the jitter characteristics.

The receiver may apply the operation of transferring the packet to the upper layer with the timing arriving earlier, out of the predetermined timing and the reception timing of the packet received later when the configured grant or the configured scheduling is assigned. This can, for example, reduce the memory consumption in the receiver. The upper layer may hold the packet until the predetermined timing. For example, when the reception timing of the packet received later arrives earlier than the predetermined timing, the upper layer may hold the packet until the predetermined timing. This can, for example, enhance the jitter characteristics in transmitting and receiving the packet.

FIG. 17 illustrates another example of operations of the receiver for transferring received packets to the upper layer with the predetermined timing according to the first embodiment. FIG. 17 illustrates a case where the duplicated packets are mapped to the Logical CHannels (LCH) #1 and #2. FIG. 17 illustrates a case where the configured scheduling is assigned to each of the LCHs #1 and #2. In FIG. 17, rectangle regions represent time resources assigned in the configured scheduling, and among the regions, regions with cross hatching that slants down to the left each represent timing with which the duplicated packet is transmitted. FIG. 17 also illustrates a case where the CA is used for the packet duplication. In FIG. 17, "Cycle time" represents a cycle on which data is transmitted from the transmitter. In FIG. 17, the same numbers are applied to the elements common to those in FIG. 16, and the common description thereof is omitted.

The operations of the receiver on the packets 1601 and 1602 in FIG. 17 are identical to those in FIG. 16. The operations of the receiver on the packets 1603 and 1604 are also identical to those in FIG. 16. The timing with which the receiver receives the packets 1601 and 1602 coincides with the predetermined timing in FIG. 17. The timing with which the receiver receives the packet 1604 also coincides with the predetermined timing.

After a lapse of time corresponding to Cycle time since the receipt of the packets 1603 and 1604, the receiver receives the packet 1606 from the LCH #2 earlier than the packet 1605 from the LCH #1. The timing with which the receiver receives the packet 1606 coincides with the predetermined timing in FIG. 17. The receiver transfers the packet 1606 to the upper layer simultaneously upon receipt of the packet 1606. The receiver receives the packet 1605 after the timing. The receiver discards the packet 1605.

The operations of the receiver on the packets 1607 and 1608 in FIG. 17 are identical to those in FIG. 16. The timing with which the receiver receives the packet 1608 coincides with the predetermined timing in FIG. 17.

Although FIG. 17 illustrates the example using the CA in the packet duplication, the DC may be used in the packet duplication similarly to FIGS. 14, 15, and 16. Even when a communication path between the UE and one of the base stations is interrupted (for example, blocked), the communication can be maintained between the UE and the other base station. This can enhance the reliability in the communication.

FIG. 17 illustrates a case where the configured scheduling is assigned to each of the LCHs #1 and #2. However, the configured grant may be assigned to both of the LCHs #1 and #2, or the configured scheduling or the configured grant may be assigned to only one of the LCHs #1 and #2 similarly to FIG. 16. This enables, for example, the base station to perform flexible scheduling in the packet duplication.

FIG. 17 illustrates a case where reception results of the packet 1601 to 1608 (e.g., decoding results) are normal. However, the receiver may transfer the packet received earlier to the upper layer even when a reception error (e.g., a CRC error) occurs in the packet received later similarly to FIG. 16. The operation may be applied, for example, when the packet received later is transmitted using the configured scheduling assignment or using the configured grant. In such a case, the receiver need not request the HARQ retransmission or the RLC retransmission from the transmitter. This can, for example, enhance the jitter characteristics and increase the efficiency in the communication system.

FIG. 17 illustrates a case where the reception timing with which the receiver receives each of the packets 1601, 1602,

1604, 1606, and 1608 coincides with the predetermined timing. However, the reception timings of the packets 1601, 1602, 1604, 1606, and 1608 need not coincide with the predetermined timing. For example, when the reception timing of the packet 1604 precedes the predetermined timing, the receiver may hold the packet 1603 until the predetermined timing. The receiver may receive the packet 1604. The receiver may discard the packet 1604. This can, for example, further enhance the jitter characteristics.

The packet duplication to be used in the first embodiment may be, for example, the one using the sidelink. For example, one of the duplicated packets may be transmitted via the Uu interface, or the other packet may be transmitted via an interface between terminals (e.g., the PC5 interface). As another example, both of the duplicated packets may be transmitted via the interface between terminals (e.g., the PC5 interface). This enables reduction of jitter, for example, in the sidelink communication.

The first embodiment can, for example, enhance the jitter characteristics while securing the reliability in the communication between the base station and the UE.

The First Modification of the First Embodiment

Although the first embodiment discloses a method for enhancing the jitter characteristics in the packet duplication using the CA or the DC, the packet duplication using the same carrier may be used. Such packet duplication may be provided as new packet duplication different from the packet duplication using the DC or the CA.

The duplicated packets may be mapped to different transport blocks and transmitted. The transport blocks may be mapped to the same carrier and transmitted. This can, for example, enhance the reliability in the communication using only one carrier.

The transmitter may map the duplicated packets to different transport blocks. The transmitter may be the base station or the UE. The transmitter may place the physical channel data generated by coding the transport blocks at different frequencies and/or in different time resources and transmit the data, or place the physical channel data in different layers in the MIMO and transmit the data.

The receiver may extract physical channel signals generated from both of the duplicated packets, using the received signals. The receiver may be the UE or the base station. The receiver may decode the transport blocks, using the physical channel signals. The receiver may generate the duplicated packets using the physical channel signals. The receiver may, for example, generate the packets using the transport blocks. The receiver may transfer one of the duplicated packets to the upper layer. The receiver may discard packets other than the packet transferred to the upper layer, out of the duplicated packets.

The receiver need not request the HARQ retransmission from only one of the transport blocks. For example, when a decoding result (e.g., a result of the CRC) of one of the transport blocks is normal and decoding of the other transport block is NG in the receiver, the receiver need not transmit the HARQ-Nack to the transmitter. The receiver may regard the HARQ-Ack for the other transport block. The receiver may transmit, to the transmitter, the HARQ-Ack for the other transport block. As another example, the receiver may transmit, to the transmitter, the HARQ-Nack for the other transport block. The transmitter need not perform HARQ retransmission to the other transport block, using the reception of the HARQ-Ack for one of the transport blocks and the reception of the HARQ-Nack for the other transport block. This can, for example, increase the efficiency in the communication system.

The receiver may regard, as OK, the reception result of one of the duplicated packets whose reception result has been NG. The operation may be performed in, for example, the RLC layer.

The base station may configure the packet duplication using the same carrier for the UE. The high-level NW device may perform the configuration for the UE.

The configuration may include information indicating whether to execute the packet duplication using the same carrier, or information on start or termination of the packet duplication using the same carrier. This can, for example, flexibly control the packet duplication using the same carrier.

The configuration may include information on feedback from the receiver to the base station device. The information may be determined using, for example, the QoS parameter or the information on network slicing.

The information may include information on processes in the receiver. Examples of the information may include: information indicating no HARQ response to a transport block in which decoding has been NG; information indicating that the HARQ-Nack is given to the transport block as a response; and information indicating that the HARQ-Ack is given to the transport block as a response. The information may be applied when decoding of one of the transport blocks is OK. As another example, the information on processes in the receiver may include information obtained by replacing the HARQ response with an ARQ response in the RLC. For example, the absence of the HARQ response can increase the efficiency in the communication system.

The information on feedback may include information on processes in the transmitter. Examples of the information may include information indicating no HARQ retransmission to a transport block in which decoding has been NG and information indicating no HARQ retransmission to a transport block having no HARQ response. The information may be applied upon receipt of the HARQ-Ack for one of the transport blocks. As another example, the information on processes in the transmitter may include information obtained by replacing the HARQ retransmission with the RLC retransmission. For example, the absence of the HARQ retransmission can increase the efficiency in the communication system.

The configuration may include information on a method for placing transport blocks. The following (1) to (5) are disclosed as information on the method for placing transport blocks.

(1) Placement for dividing frequency resources
(2) Placement for dividing time resources
(3) Placement for dividing layers in the MIMO
(4) Placement for dividing codes in the code-multiplexing
(5) Combinations of (1) to (4) above Information in (1) may include information on the frequency resource in which one of the duplicated packets is placed. Examples of the information may include information on the first resource block (RB) in which the packet is placed, information on the number of RBs in each of which the packet is placed, and information on the last RB number in which the packet is placed. This can, for example, reduce the magnitude of information on the placement of the packet. Consequently, the efficiency in the communication system can be increased.

As another example, the information in (1) may include information on a placement pattern of the frequency resource in which one of the duplicated packets is placed.

Examples of the information on the placement pattern may include information on a cycle of the placement pattern and information on an offset for the cycle. One of the packets may be transmitted with a frequency resource corresponding to the offset. As another example, information on a bitmap representing a placement pattern may be used. This enables, for example, the duplicated packets to be discretely placed in a frequency direction. Consequently, advantages of the frequency diversity can be obtained.

In (1), information on the frequency resource in which the other duplicated packet is placed may be identical to information on the frequency resource in which one of the packets is placed. For example, the frequency resources can be flexibly placed in both of the duplicated packets in the communication system.

As another example in (1), the information on the frequency resource in which the other duplicated packet is placed may be frequency resources except the frequency resource in which one of the packets is placed, out of the frequency and/or time resources to which the base station assigns a grant and/or scheduling. This can, for example, reduce the amount of signaling from the base station and/or the high-level NW device to the UE. Consequently, the efficiency in the communication system can be increased.

Information in (2) may include information on the time resource in which one of the duplicated packets is placed. Examples of the information may include information on the first symbol number in which the packet is placed, information on the number of symbols in each of which the packet is placed, and information on the last symbol number in which the packet is placed. This can, for example, reduce the magnitude of information on the placement of the packet. Consequently, the efficiency in the communication system can be increased.

As another example, the information in (2) may include information on a placement pattern of the time resource in which one of the duplicated packets is placed. Examples of the information on the placement pattern may include information on a cycle of the placement pattern and information on an offset for the cycle. One of the packets may be transmitted with a time resource corresponding to the offset. As another example, information on a bitmap representing a placement pattern may be used. For example, the duplicated packets can be discretely placed in a time direction. Consequently, advantages of the time diversity can be obtained.

In (2), information on the time resource in which the other duplicated packet is placed may be identical to information on the time resource in which one of the packets is placed. For example, the time resources can be flexibly placed in both of the duplicated packets in the communication system.

As another example in (2), the information on the time resource in which the other duplicated packet is placed may be time resources except the time resource in which one of the packets is placed, out of the frequency and/or time resources to which the base station assigns a grant and/or scheduling. This can, for example, reduce the amount of signaling from the base station and/or the high-level NW device to the UE. Consequently, the efficiency in the communication system can be increased.

Information in (3) may include information on a layer in which one of the duplicated packets is placed or information on a layer in which the other duplicated packet is placed. For example, advantages of space diversity can be obtained in transmitting and receiving the duplicated packets.

Information in (4) may include information on a code to be applied to one of the duplicated packets or information on a code to be applied to the other duplicated packet. The code may be, for example, an orthogonal code (e.g., the Hadamard code, the Zadoff-Chu (ZC) code), or a code different from the orthogonal code. This enables the packet duplication even using, for example, a single carrier or a single layer. This can enhance the reliability.

Examples of information in (5) may include: information on the timing with which placement of the frequency resource in (1) is started (e.g., a symbol number); information on the duration of the placement of the frequency resource (e.g., the number of symbols); and information on the timing with which the placement of the frequency resource ends (e.g., a symbol number). A plurality of the information may be provided. For example, when the frequency resource is placed a plurality of times out of the time resources to which the base station assigns a grant and/or scheduling, the plurality of the information may be provided. This can, for example, increase the flexibility in the scheduling, and produce advantages of time and frequency diversity in transmitting and receiving the duplicated packets.

The information in (1) to (5) may be notified via the NAS signaling or the RRC signaling. This enables, for example, the high-level NW device and/or the base station to notify the UE of a large amount of information. Consequently, the flexibility in the communication system can be increased.

As another example, the notification may be given via the MAC signaling. For example, the multi-level modulation enables transmission of a large amount of information, and enables the base station to promptly give the notification to the UE.

As another example, the notification may be given via the L1/L2 signaling. The information in (1) to (5) may be included in, for example, the DCI for notifying the grant and/or scheduling assignments, or different pieces of DCI. This enables, for example, the base station to promptly give the notification to the UE.

As another example of giving the notification via the L1/L2 signaling, each of the duplicated packets may include the DCI. For example, the grant and/or scheduling may be assigned to each of the duplicated packets. The grant and/or scheduling assigned to each of the duplicated packets may be included in each DCI and notified. This can, for example, increase the flexibility in the scheduling and avoid the complexity in designing the communication system.

The plurality of signalings for the notification may be used in combination. For example, information on start and/or end of the packet duplication using the same carrier may be notified via the MAC signaling, or the information in (1) to (5) may be notified via the L1/L2 signaling. This enables, for example, the prompt notification while securing the amount of information that can be notified from the base station to the UE.

The configured grant and/or configured scheduling assignment may be used in the packet duplication using the same carrier. The configuration from the base station to the UE using the configured grant and/or configured scheduling assignment may be identical to the details disclosed above. The configuration may be, for example, included in the configuration on the configured grant and/or configured scheduling assignment from the base station to the UE, or notified via different signaling. This can, for example, avoid the designing complexity on reserving the frequency and/or time resources in the packet duplication using the same carrier.

The duplicated packets may be mapped to different frequency resources and transmitted. The transport blocks to be used for transmitting and receiving the packet may be mapped to different frequency resources and transmitted. Both of the duplicated packets may be assigned to the same time resource assigned by the scheduling. This can, for example, produce advantages of frequency diversity in the packet duplication. Furthermore, the transmitter can simultaneously transmit both of the duplicated packets. This can reduce, for example, fluctuation in the latency that occurs due to the HARQ retransmission of the packets, that is, jitter.

The frequency resources may be placed in a concentrated manner. The frequency resources to be used for transmitting the packets may be adjacent to or separate from each other. The frequency resource may be configured, for example, per RB or per RBs.

The base station may notify the UE of information on packets to be mapped to the frequency resources. The UE may map the duplicated packet to each of the frequency resources using the information, and transmit the packets to the base station. Alternatively, the UE may extract each of the duplicated packets from a signal received in the frequency resource, using the information.

FIG. 18 illustrates operations of transmitting and receiving the duplicated packets over the same carrier. In an example of FIG. 18, a thick broken line represents a frequency and time resource to be notified from the base station to the UE as a grant. FIG. 18 illustrates an example where one of the duplicated packets is mapped to a transport block #1 and the other packet is mapped to a transport block #2. FIG. 18 illustrates a case where the frequency resources to which the duplicated packets are mapped are placed in a concentrated manner and adjacent to each other. In FIG. 18, "Cycle time" represents a cycle on which data is transmitted from the transmitter. FIG. 18 omits placement of, for example, a control channel and/or a reference signal.

In FIG. 18, a physical channel signal generated from transport block #1 is mapped to a region 1802 that is higher in frequency and is half a time and frequency resource 1801 granted or assigned by the base station. A physical channel signal generated from the transport block #2 is mapped to a region 1803 that is lower in frequency in the resource 1801.

In FIG. 18, a resource 1804, a region 1805, and a region 1806 are identical to the resource 1801, the region 1802, and the region 1803, respectively. In FIG. 18, a resource 1807, a region 1808, and a region 1809 are identical to the resource 1801, the region 1802, and the region 1803, respectively.

FIG. 18 illustrates the example where the physical channel signal generated from the transport block #1 is mapped to each of the regions 1802, 1805, and 1808 and the physical channel signal generated from the transport block #2 is mapped to each of the regions 1803, 1806, and 1809. However, the regions to which the transport block #1 is mapped may be replaced with those to which the transport block #2 is mapped. For example, the transport block #1 may be mapped to each of the regions 1803, 1806, and 1809, and the transport block #2 may be mapped to each of the regions 1802, 1805, and 1808. The mapping may be switched for each time. For example, the transport block #1 may be mapped to each of the regions 1802, 1806, and 1808, and the transport block #2 may be mapped to each of the regions 1803, 1805, and 1809. This enables, for example, the base station to perform flexible scheduling.

FIG. 18 illustrates a case where the region to which the transport block #1 is mapped is adjacent to the region to which the transport block #2 is mapped. However, these regions may be separate from each other. For example, the regions 1802 and 1803 may be separate from each other in the frequency direction. The same may be applied to the regions 1805 and 1806 and the regions 1808 and 1809. In the aforementioned case, the resource 1801 should be discretely assigned. The same should be applied to the resources 1804 and 1807. This enables, for example, the base station to assign another channel between two separate regions. Consequently, the flexibility in the scheduling is increased.

As another example, the frequency resources may be discretely placed. The frequency resource may be placed per RB, per RBs, or per subcarrier. The frequency resources to be used for transmitting the packets may be adjacent to or separate from each other. This can, for example, produce the advantages of frequency diversity in transmitting and receiving the duplicated packets. Consequently, the reliability in the communication can be enhanced.

FIG. 19 illustrates another example of transmitting and receiving the duplicated packets over the same carrier. In FIG. 19, a thick broken line represents a frequency and time resource to be notified from the base station to the UE as a grant. FIG. 19 illustrates the example where one of the duplicated packets is mapped to the transport block #1 and the other packet is mapped to the transport block #2. FIG. 19 illustrates a case where the frequency resources to which the duplicated packets are mapped are placed discretely and adjacent to each other. In FIG. 19, "Cycle time" represents a cycle on which data is transmitted from the transmitter. FIG. 19 omits placement of, for example, a control channel and/or a reference signal. In FIG. 19, the same numbers are applied to the elements identical to those in FIG. 18, and the common description thereof is omitted.

In FIG. 19, the physical channel signal generated from the transport block #1 is mapped to a time and frequency region 1902 with cross hatching that slants down to the left, in the time and frequency resource 1801 granted or assigned by the base station. The physical channel signal generated from the transport block #2 is mapped to a time and frequency region 1903 with cross hatching that slants down to the right in the resource 1801.

In FIG. 19, a resource 1804, a region 1905, and a region 1906 are identical to the resource 1801, the region 1902, and the region 1903, respectively. In FIG. 19, a resource 1807, a region 1908, and a region 1909 are identical to the resource 1801, the region 1902, and the region 1903, respectively.

In FIG. 19, the regions to which the physical channel signal generated from the transport block #1 is mapped may be replaced with the regions to which the physical channel signal generated from the transport block #2 is mapped, similarly to FIG. 18. The mapping may be switched for each time. This enables, for example, the base station to perform flexible scheduling.

In FIG. 19, the regions to which the transport block #1 is mapped may be separate from the regions to which the transport block #2 is mapped, similarly to FIG. 18. In the aforementioned case, the resources 1801, 1804, and 1807 should be discretely assigned. This enables, for example, the base station to assign another channel between two separate regions. Consequently, the flexibility in the scheduling is increased.

As another example, the frequency resources to be used for transmitting one of the packets may be placed in a concentrated manner, whereas the frequency resources to be used for transmitting the other packet may be placed in a distributed manner. Another frequency resource may be placed between the frequency resources placed in a distributed manner. This enables, for example, the base station to perform flexible scheduling in the frequency direction.

Another method for mapping the duplicated packets is disclosed. The duplicated packets may be mapped to different time resources and transmitted. The duplicated packets may be mapped to, for example, different symbols. The transport blocks to be used for transmitting and receiving the packet may be mapped to different time resources (e.g., symbols) and transmitted. Both of the duplicated packets may be assigned to the same time resource assigned by the scheduling. This can, for example, produce advantages of time diversity in the packet duplication. Furthermore, the transmitter can transmit both of the duplicated packets in the same scheduling resource. This can reduce, for example, fluctuation in the latency that occurs due to the HARQ retransmission of the packets, that is, jitter.

The time resources may be placed in a concentrated manner or a distributed manner. The time resource may be configured, for example, per symbol, per mini-slot, or per another unit. Placing the time resources in a concentrated manner enables, for example, reduction in the amount of processing in the communication system. As another example, placing the time resources in a distributed manner can increase the advantages of time diversity.

The base station may notify the UE of information on packets to be mapped to the time resources. The UE may map the duplicated packet to each of the time resources using the information, and transmit the packets to the base station. Alternatively, the UE may extract the duplicated packets from signals received in the time resources, using the information.

FIG. 20 illustrates another example of transmitting and receiving the duplicated packets over the same carrier. In FIG. 20, a thick broken line represents a frequency and time resource to be notified from the base station to the UE as a grant. FIG. 20 illustrates the example where one of the duplicated packets is mapped to the transport block #1 and the other packet is mapped to the transport block #2. FIG. 20 illustrates a case where the time resources to which the duplicated packets are mapped are placed in a concentrated manner. In FIG. 20, "Cycle time" represents a cycle on which data is transmitted from the transmitter. FIG. 20 omits placement of, for example, a control channel and/or a reference signal. In FIG. 20, the same numbers are applied to the elements identical to those in FIG. 18, and the common description thereof is omitted.

In FIG. 20, the physical channel signal generated from the transport block #1 is mapped to a time and frequency region 2002 with cross hatching that slants down to the left, in the time and frequency resource 1801 granted or assigned by the base station. The physical channel signal generated from the transport block #2 is mapped to a time and frequency region 2003 with cross hatching that slants down to the right in the resource 1801.

In FIG. 20, a resource 1804, a region 2005, and a region 2006 are identical to the resource 1801, the region 2002, and the region 2003, respectively. In FIG. 20, a resource 1807, a region 2008, and a region 2009 are identical to the resource 1801, the region 2002, and the region 2003, respectively.

In FIG. 20, the regions to which the physical channel signal generated from the transport block #1 is mapped may be replaced with the regions to which the physical channel signal generated from the transport block #2 is mapped, similarly to FIG. 18. The mapping may be switched for each time. This enables, for example, the base station to perform flexible scheduling.

FIG. 20 illustrates a case where the time resources to which the duplicated packets are mapped are placed in a concentrated manner. However, these time resources may be placed in a distributed manner. For example, the packet to be mapped may be changed per symbol. This can, for example, increase the advantages of time diversity in transmitting both of the packets.

The example where both of the duplicated packets are assigned to the same scheduling resource when the duplicated packets are mapped to different time resources is disclosed above. However, the duplicated packets may be assigned to different scheduling resources. This can, for example, avoid the designing complexity on scheduling in the communication system.

Another method for mapping the duplicated packets is disclosed. The duplicated packets may be mapped to different time and frequency resources and transmitted. For example, the duplicated packets in a time resource (e.g., a symbol) may be mapped to different frequency resources, and the frequency resources to which the packets are assigned may be switched in another time resource. Both of the duplicated packets may be assigned to the same time resource assigned by the scheduling. This can, for example, produce the advantages of frequency diversity and time diversity in the packet duplication. Consequently, the reliability in the communication can be enhanced. Furthermore, the transmitter can transmit both of the duplicated packets in the same scheduling resource. This can reduce, for example, fluctuation in the latency that occurs due to the HARQ retransmission of the packets, that is, jitter.

The frequency resources assigned to the packets in each time resource may be placed in a concentrated manner or a distributed manner. Placing the frequency resources in a concentrated manner enables, for example, reduction in the amount of processing in the communication system. As another example, placing the frequency resources in a distributed manner can increase the advantages of frequency diversity.

The time resources assigned to the packets in each frequency resource may be placed in a concentrated manner or a distributed manner. Placing the time resources in a concentrated manner enables, for example, reduction in the amount of processing in the communication system. As another example, placing the time resources in a distributed manner can increase the advantages of time diversity.

The base station may notify the UE of information on packets to be mapped to the time and frequency resources. The UE may map the duplicated packets to the frequency resources in the time resources using the information, and transmit the packets to the base station. Alternatively, the UE may extract the duplicated packets from signals received in the time resources, using the information.

FIG. 21 illustrates another example of transmitting and receiving the duplicated packets over the same carrier. In FIG. 21, a thick broken line represents a frequency and time resource to be notified from the base station to the UE as a grant. FIG. 21 illustrates the example where one of the duplicated packets is mapped to the transport block #1 and the other packet is mapped to the transport block #2. FIG. 21 illustrates a case where the frequency resources to which the duplicated packets are mapped are placed in a concentrated manner in each time resource. In FIG. 21, "Cycle time" represents a cycle on which data is transmitted from the transmitter. FIG. 21 omits placement of, for example, a control channel and/or a reference signal. In FIG. 21, the same numbers are applied to the elements identical to those in FIG. 18, and the common description thereof is omitted.

In FIG. 21, the physical channel signal generated from the transport block #1 is mapped to a time and frequency region 2102 with cross hatching that slants down to the left, in the time and frequency resource 1801 granted or assigned by the base station. The physical channel signal generated from the transport block #2 is mapped to a time and frequency region 2103 with cross hatching that slants down to the right in the resource 1801. In the example of FIG. 21, the frequency resource to be mapped to the transport block #1 and the resource to be mapped to the transport block #2 are switched between the first half and the latter half of the time resource granted or assigned in the scheduling.

In FIG. 21, the resource 1804, a region 2105, and a region 2106 are identical to the resource 1801, the region 2102, and the region 2103, respectively. In FIG. 21, the resource 1807, a region 2108, and a region 2109 are identical to the resource 1801, the region 2102, and the region 2103, respectively.

In FIG. 21, the regions to which the physical channel signal generated from the transport block #1 is mapped may be replaced with the regions to which the physical channel signal generated from the transport block #2 is mapped, similarly to FIG. 18. The mapping may be changed per scheduling assignment. This enables, for example, the base station to perform flexible scheduling.

FIG. 21 illustrates a case where the time resources to which the duplicated packets are mapped are placed in a concentrated manner in a frequency resource. However, these time resources may be placed in a distributed manner. For example, the packet to be mapped may be changed per symbol. This can, for example, increase the advantages of time diversity in transmitting both of the packets.

The example where both of the duplicated packets are assigned to the same scheduling resource when the duplicated packets are mapped to different time resources is disclosed above. However, the duplicated packets may be assigned to different scheduling resources. This can, for example, avoid the designing complexity on scheduling in the communication system.

Another method for mapping the duplicated packets is disclosed. The duplicated packets may be spatially multiplexed into different layers and transmitted. The duplicated packets may be spatially multiplexed using different codebooks and transmitted. The transport blocks to be used for transmitting and receiving the packet may be spatially multiplexed into different layers and transmitted, or spatially multiplexed using different codebooks and transmitted. Thus, the frequency and/or time resources need not be assigned to the packets. Consequently, the designing complexity in the communication system can be avoided. Furthermore, the transmitter can simultaneously transmit both of the duplicated packets. This can reduce, for example, fluctuation in the latency that occurs due to the HARQ retransmission of the packets, that is, jitter.

The base station may notify the UE of information on the layers to which the packets are mapped or information on the codebooks to be used for the packets. The UE may map the duplicated packets to the respective layers using the information, and transmit the packets to the base station. Alternatively, the UE may extract each of the duplicated packets from a signal received from the base station, using the information. As another example, the UE may perform a process of modulating the duplicated packets using the information on the codebooks that has been notified from the base station, or extract each of the duplicated packets from the signal received from the base station.

Another method for mapping the duplicated packets is disclosed. Each of the duplicated packets may be code-multiplexed and transmitted. The code to be used for the code-multiplexing may be, for example, an orthogonal code (e.g., the Hadamard code, the Zadoff-Chu (ZC) code), or a code different from the orthogonal code. This enables the packet duplication even using, for example, a single carrier or a single layer. This can enhance the reliability.

Another method for mapping the duplicated packets is disclosed. For example, the duplicated packets in a time resource (e.g., a symbol) may be mapped to different frequency resources, and the frequency resources to which the packets are assigned may be switched in another time resource. Both of the duplicated packets may be assigned to the same time resource assigned by the scheduling. This can, for example, produce the advantages of frequency diversity and time diversity in the packet duplication. Consequently, the reliability in the communication can be enhanced. Furthermore, the transmitter can transmit both of the duplicated packets in the same scheduling resource. This can reduce, for example, fluctuation in the latency that occurs due to the HARQ retransmission of the packets, that is, jitter.

The methods disclosed in the first modification of the first embodiment may be combined with the methods disclosed in the first embodiment. For example, a plurality of configured grants and/or a plurality of configured scheduling assignments may be performed in the same carrier. The packets duplicated in the packet duplication may be mapped to different configured grants and/or different configured scheduling assignments in the same carrier, and transmitted. This enables, for example, the designing complexity in the communication system, and enhancement of the reliability in the communication using a single carrier.

The methods disclosed in the first modification of the first embodiment may be used in the communication without any jitter requirement. For example, the packet duplication using the same carrier may be performed in the communication without any jitter requirement. This can, for example, enhance the reliability in the communication using a single carrier.

The first modification of the first embodiment can enhance the jitter characteristics in the communication using a single carrier.

The Second Modification of the First Embodiment

Although the first embodiment and the first modification of the first embodiment disclose the application of the packet duplication as an example method satisfying the URLLC requirements, the repetition may be used.

In the repetition, however, the receiver transmits the HARQ feedback after transmission of a predetermined number of iterations. Consequently, even when the receiver successfully receives data during the predetermined number of iterations and accurately demodulate and decode the data, the receiver performs the HARQ feedback after receiving the data the remaining number of times. The same is applied to transferring of data received by the receiver to the upper layer (e.g., the RLC). This causes a problem of worsening of the latency in transmitting the data.

A solution to the problem is hereinafter disclosed.

After successfully and accurately decoding data, the receiver transmits the HARQ-Ack in the transmission with repetitions. The receiver may transmit the HARQ-Ack to the transmitter during the predetermined number of iterations. This enables, for example, the receiver to promptly notify the transmitter of the HARQ-Ack.

After successfully and accurately decoding data, the receiver may transfer the data to the upper layer (e.g., the RLC) in the transmission with repetitions. The receiver may perform the transfer during the predetermined number of iterations. This can, for example, reduce the latency while securing the reliability in the communication using repetitions. The receiver may transmit the HARQ-Ack to the transmitter during the predetermined number of iterations. This enables, for example, the receiver to promptly notify the transmitter of the HARQ response. As another example, the receiver may transmit the HARQ-Ack after the end of the predetermined number of iterations. This enables, for example, reduction in the frequency and/or time resources that are reserved for transmitting the HARQ-Ack. Consequently, the efficiency in the communication system can be increased.

The receiver need not receive repeated data subsequent to data whose decoding result has been OK. This can, for example, reduce the power consumption in the receiver.

The transmitter need not perform repetitions of data after receiving the HARQ-Ack. This can, for example, reduce the power consumption in the transmitter and the time and/or frequency resources to be used for the repetitions of the data.

Candidates for the timing to transmit the HARQ-Ack may be predefined in a standard. For example, each timing of the predetermined number of iterations may be defined as a candidate for the timing to transmit the HARQ-Ack. Alternatively, a plurality of timings (e.g., twice) in the predetermined number of iterations may be defined as the candidates for the timing to transmit the HARQ-Ack. The base station may reserve the frequency and time resources in the candidate timings for transmitting the HARQ-Ack. The base station may notify the UE of the frequency and time resources. The notification may include information on the number of iterations or information on the uplink and/or downlink in the communication. The UE may transmit the HARQ-Ack to the base station or receive the HARQ-Ack transmitted from the base station, with the frequency and time resources included in the notification. If the base station cannot reserve the resources, the receiver need not transmit the HARQ-Ack.

As another example on determination of the candidates for the timing to transmit the HARQ-Ack, the base station may determine the candidates and notify the candidates to the UE. The candidates for the timing determined by the base station may be identical to those defined in a standard, or determined in another method. The base station may notify the UE of the frequency and time resources. The notification may include information on the number of iterations, information on the uplink and/or downlink in the communication, information on logical channels to which the HARQ-Ack response is applied, or information on a sequence to be used in the response (e.g., cyclic shift). The base station may reserve the frequency and/or time resources to be used for the HARQ-Ack response in advance. The UE may transmit the HARQ-Ack to the base station or receive the HARQ-Ack transmitted from the base station, with the frequency and time resources included in the notification. If the base station cannot reserve the resources, the receiver need not transmit the HARQ-Ack. This enables, for example, flexible scheduling in the communication system.

As another example on the candidates for the timing to transmit the HARQ-Ack, each timing after a predetermined number of waits in the predetermined number of iterations may be defined as a candidate for the timing to transmit the HARQ-Ack. Alternatively, a plurality of timings (e.g., twice) after a predetermined number of waits (e.g., after four times) may be defined as the candidates for the timing to transmit the HARQ-Ack. The predetermined number of waits may be, for example, the number of timely transmission and reception times in the cyclical communication in which the jitter requirements are defined. The timely transmission and reception may be transmission and reception to be performed with the timing of predetermined latency, that is, no jitter (the same may be applied to the following description). This can, for example, reduce variations in the transfer timing from the receiver to the upper layer and/or the timing to transmit the HARQ-Ack. Consequently, jitter can be reduced in the communication between the base station and the UE. The candidates may be defined in a standard, or determined and notified to the UE by the base station.

The base station may determine the timely transmission and reception timing. The base station may notify the UE of information on the timely transmission and reception timing. The base station may give the notification, for example, via the RRC signaling, the MAC signaling, or the L1/L2 signaling. The information may be, for example, information on an offset for the transmission cycle or information on an appropriate time in a predetermined transmission cycle. The information may include information on a cycle. The information on the offset may be given, for example, per millisecond, per subframe, per slot, or per symbol. The information on the offset may include information on subcarrier spacing. The information on the appropriate time may be given, for example, as the time per millisecond, as a subframe number, as a slot number, or per symbol. The UE may derive the timely transmission and reception timing, using the information. For example, the UE may add, in a predetermined transmission cycle, an integer multiple of the cycle to information on the appropriate time to derive the appropriate time in a transmission cycle after the current time. As another example, the base station may notify the UE of only the timely transmission and reception time. The notification may be applied, for example, in the absence of cyclical transmission between the base station and the UE. This enables, for example, the UE to derive the timely transmission and reception timing.

The base station may notify the UE of the timely transmission and reception timing, for example, in the method for notifying information on the predetermined timing according to the first embodiment.

The UE may give the HARQ response, which is disclosed in the second modification, to a transport block including a logical channel included in the notification. The UE need not apply the HARQ response, which is disclosed in the second modification, to a transport block excluding the logical channel. This can, for example, reduce the amount of processing in the UE.

The timing for the receiver to transfer received data to the upper layer may be defined in a standard, or determined and notified to the UE by the base station, similarly to the HARQ-Ack. The notification may include, for example, information similar to that for the notification on the candidates for the HARQ-Ack response timing. This can, for example, reduce the latency in transmitting and receiving data.

FIG. 22 illustrates operations of the receiver for performing HARQ feedback and performing a transfer to the upper layer during the predetermined number of iterations in the repetitions. FIG. 22 illustrates an example of transmitting the transmission data repeatedly four times. In FIG. 22, "Cycle time" represents a cycle on which data is transmitted from the transmitter. FIG. 22 illustrates a case where the number of waits in the HARQ-Ack transmission from the receiver to the transmitter is 2. FIG. 22 illustrates application of operations of giving a HARQ response and performing a transfer to the upper layer during the predetermined number of iterations, in the communication requiring predetermined jitter characteristics (hereinafter may be referred to as jitter-critical communication). In FIG. 22, a broken line represents the timely reception timing in the jitter-critical communication. FIG. 22 illustrates a case where the transmitter is the base station and the receiver is the UE.

In the data transmission in the first transmission cycle in FIG. 22, the receiver receives data 2501 transmitted for the second time as an indication that the decoding result has been OK. Since the receiver receives the data 2501 with the timely reception timing or after, the receiver transfers the data 2501 to the upper layer. The receiver transmits a HARQ-Ack signal 2502 to the transmitter, using the indication that the reception result of the data 2501 has been decoding OK.

In the data transmission in the second transmission cycle in FIG. 22, the receiver receives data 2503 transmitted for the third time as an indication that the decoding result has been OK. Since the receiver receives the data 2503 with the timely reception timing or after, the receiver transfers the data 2503 to the upper layer. The receiver transmits a HARQ-Ack signal 2504 to the transmitter, using the indication that the reception result of the data 2503 has been decoding OK.

In the data transmission in the third transmission cycle in FIG. 22, the receiver receives data 2505 transmitted for the first time as an indication that the decoding result has been OK. Since the receiver receives the data 2505 before the timely reception timing, the receiver holds the data 2505 until the timely reception timing. The receiver transfers the data 2505 to the upper layer after the timely reception timing has passed. Furthermore, the receiver transmits a HARQ-Ack signal 2506 to the transmitter, using the indication that the reception result of the data 2505 has been decoding OK. The receiver may wait for the HARQ-Ack transmission timing for the second data reception and then transmit the HARQ-Ack signal 2506.

In the data transmission in the fourth transmission cycle in FIG. 22, the receiver receives data 2507 transmitted for the fourth time as an indication that the decoding result has been OK. Since the receiver receives the data 2507 with the timely reception timing or after, the receiver transfers the data 2507 to the upper layer. The receiver transmits a HARQ-Ack signal 2508 to the transmitter, using the indication that the reception result of the data 2507 has been decoding OK.

FIG. 22 illustrates a case where the number of iterations is 4 and the predetermined number of waits for transmitting the HARQ-Ack is 2. However, the various numbers may be the other values. For example, when the communication environment between the base station and the UE is poor, the number of iterations may be set to a value larger than 4, or the number of waits may be set to a value larger than 2. This can, for example, enhance the reliability in the communication using repetitions.

FIG. 22 illustrates a case where the transmitter is the base station and the receiver is the UE, that is, the downlink communication. However, the example of FIG. 22 is applicable to a case where the transmitter is the UE and the receiver is the base station, that is, the uplink communication. As another example, the example of FIG. 22 is applicable to a case where both of the transmitter and the receiver are UEs, that is, the sidelink communication. This can, for example, enhance the jitter characteristics not only in the downlink communication but also in the uplink communication and/or the sidelink communication.

FIG. 22 illustrates a case where the receiver transmits the HARQ-Ack as the HARQ-Ack to reception after a predetermined number of waits. However, the receiver may transmit the HARQ-Ack when decoding is OK. Consequently, for example, the HARQ-Ack transmission resource after decoding is OK is available for transmitting another signal. Consequently, the efficiency in the communication system can be increased.

The HARQ feedback need not be performed. For example, the receiver need not perform the HARQ feedback on the transmitter. The transmitter may regard decoding of the entire data transmitted as OK in the receiver. The operations without the HARQ feedback may be applied, for example, during the repetitions. This can, for example, reduce the amount of signaling between the base station and the UE and the amount of HARQ processing in the receiver. For example, the base station need not reserve the frequency and time resources for the HARQ feedback. Consequently, the use efficiency of the frequency and time resources in the communication system can be increased.

As another example on the HARQ feedback, only the HARQ-Nack may be fed back. For example, the receiver may transmit only the HARQ-Nack to the transmitter, or need not transmit the HARQ-Ack thereto. The transmitter may regard decoding of the entire data without the HARQ feedback as OK in the receiver. The operations of feeding back only the HARQ-Nack may be applied, for example, during the repetitions. This can, for example, reduce the amount of signaling between the base station and the UE and the amount of HARQ processing in the receiver. Furthermore, the reliability in the communication between the base station and the UE can be enhanced.

The HARQ feedback operations from the receiver to the transmitter may be predefined in a standard. The feedback operations may be defined for each communication method. For example, only the HARQ-Nack may be fed back as the HARQ feedback in the repetition communication. Furthermore, the HARQ feedback may be performed in the packet duplication.

As another example, the base station may determine the HARQ feedback operations from the receiver to the transmitter, and notify the operations to the UE. The base station may determine the feedback operations for each communication method. For example, only the HARQ-Nack may be fed back as the HARQ feedback in the repetition communication. Furthermore, the HARQ feedback may be performed in the packet duplication. As another example, the base station may determine the feedback operations, using a communication state (e.g., QoS) between the base station and the UE or the information on network slicing. The HARQ feedback may be performed, for example, when the SINR is favorable. When the SINR is worse, only the HARQ-Nack may be fed back. This can, for example, increase the efficiency in the communication system.

The base station may give the notification to the UE via the RRC signaling. This can, for example, increase the amount of information in the notification. As another example, the base station may give the notification via the MAC signaling. This enables, for example, prompt notification while securing the reliability in the HARQ retransmission. As another example, the base station may give the notification via the L1/L2 signaling. This enables, for example, prompt determination of the operations and prompt notification in consideration of a communication state between the base station and the UE.

As another example, the high-level NW device may determine the HARQ feedback operations from the receiver to the transmitter, and notify the operations to the UE. The high-level NW device may be, for example, the AMF or the SMF. The high-level NW device may determine the feedback operations, for example, using the QoS requirements in the communication with the UE or the information on network slicing. The high-level NW device may give the notification through the base station. The high-level NW device may give the notification, for example, via the NAS signaling. This enables, for example, the communication that satisfies the QoS requirements between the base station and the UE.

The second modification of the first embodiment can reduce the latency while securing the reliability in the communication using repetitions. Furthermore, jitter can be reduced.

The Third Modification of the First Embodiment

The UE may use the logical channel prioritization (LCP: see Non-Patent Document 17) in the MAC for contention adjustment between data transmission in the communication requiring the predetermined jitter characteristics (hereinafter may be referred to as jitter-critical communication) and data transmission in another communication. The operation may be applied in the uplink communication.

However, a parameter indicating a priority is semi-statically given in the LCP (see Non-Patent Document 26 (3GPP TS38.331 V15.2.1)). For example, in the presence of another data of a logical channel with a high priority, the UE allocates data to the logical channel with a high priority earlier than a jitter-critical logical channel. Thus, the UE sometimes cannot allocate data to the jitter-critical logical channel. Consequently, a problem of worsening of the jitter characteristics occurs.

A solution to the problem is hereinafter disclosed.

The UE preferentially allocates the jitter-critical logical channel. The UE may more preferentially allocate the jitter-critical logical channel than a logical channel that is not jitter-critical, for example, in the LCP in the MAC layer of the UE.

As an example of the preferential allocation in the LCP, the UE may allocate the jitter-critical logical channels in priority order, and allocate the jitter-critical logical channels in priority order in the rest of allocatable data size. The base station may notify the UE of information indicating whether the communication is jitter-critical. The information may be included in the logical channel configuration in the RRC configuration to be transmitted from the base station to the UE. The UE may determine whether the configured logical channel is jitter-critical, using the information. This enables, for example, the UE to preferentially transmit the jitter-critical logical channel. Consequently, jitter can be reduced.

As another example of the preferential allocation in the LCP, a higher priority may be assigned to the jitter-critical logical channel. A value indicating the highest priority among parameters indicating the priorities in the LCP may be allocated to the jitter-critical logical channel. Alternatively, any value in a range from the highest priority to a predetermined value in order may be allocated to the jitter-critical logical channel. In addition to the aforementioned advantages, for example, the base station need not notify the UE of the information indicating whether the communication is jitter-critical. Consequently, the complexity in the communication system can be avoided.

Another solution is disclosed. The UE transfers data of the jitter-critical logical channel to the MAC layer of its own UE with appropriate transmission timing. The UE may hold the data of the jitter-critical logical channel without transferring it to the MAC layer, until the appropriate transmission timing. This enables, for example, the latency to fall within a certain range in the communication requiring deterministic latency, that is, the latency ranging from a certain value to a certain value.

The base station may determine the timely transmission and reception timing. The base station may notify the UE of information on the timely transmission and reception timing. The base station may give the notification, for example, via the RRC signaling, the MAC signaling, or the L1/L2 signaling. The information may be, for example, information on an offset for the transmission cycle or information on an appropriate time in a predetermined transmission cycle. The information may include information on the cycle. The information on the offset may be given, for example, per millisecond, per subframe, per slot, or per symbol. The information on the offset may include information on subcarrier spacing. The information on the appropriate time may be given, for example, as the time per millisecond, as a subframe number, as a slot number, or as a symbol number. The UE may derive the timely transmission and reception timing, using the information. For example, the UE may add, in a predetermined transmission cycle, an integer multiple of the cycle to information on the appropriate time to derive the appropriate time in a transmission cycle after the current time. As another example, the base station may notify the UE of only the timely transmission and reception time. The notification may be applied, for example, in the absence of cyclical transmission between the base station and the UE. This enables, for example, the UE to derive the timely transmission and reception timing.

The upper layer (may be, for example, an application layer or a layer referred to as a service layer), the SDAP, the PDCP, or the RLC may perform the transferring or holding operation.

As another example, the MAC layer itself may hold data of the logical channel. For example, the jitter-critical logical channel may be allocated only with predetermined timing in the LCP. The predetermined timing may exclude a timing range before the appropriate transmission timing in the logical channel. This can, for example, prevent allocation of the jitter-critical logical channel before the appropriate time. Consequently, the jitter characteristics can be enhanced.

The predetermined timing may be predefined in a standard. The predetermined timing may be, for example, identical to the timing that falls within the jitter tolerance, or a part of the timing that falls within the jitter tolerance (e.g., the timing from the appropriate time to the maximum limit of the jitter tolerance). The base station may notify the UE of information for deriving the predetermined timing. The information for deriving the predetermined timing may be included in, for example, the QoS parameter, or the logical channel configuration included in the RRC configuration to be transmitted from the base station to the UE. The QoS parameter may be identical to that disclosed in the first embodiment. The information for deriving the predetermined timing may be, for example, information on the jitter tolerance. The information on the jitter tolerance may be given, for example, per absolute time (e.g., per millisecond or per microsecond), by the number of subframes, or by the number of slots. Alternatively, the information on the jitter tolerance may be given as information using a data transmission cycle (e.g., Cycle time) in the logical channel (e.g., a percentage for the data transmission cycle). Alternatively, the information on the jitter tolerance may be given in another method. The information for the UE to derive the predetermined timing may include information on the data transmission cycle or information on the timely transmission timing (e.g., information using a slot number or a symbol number). This can, for example, reduce the amount of signaling from the base station to the UE on the derivation of the predetermined timing in the UE.

The base station may determine the predetermined timing, and notify the UE of the timing. This enables, for example, flexible scheduling in the communication system.

The base station may notify the UE of the information on the predetermined timing. The information on the timing may be, for example, information for the UE to derive the timing. For example, the methods disclosed in the first embodiment may be used for notifying the predetermined timing.

Another solution is disclosed. Allocation of a plurality of jitter-critical logical channels may be performed in ascending order of jitter tolerance. For example, when a logical channel with a wider jitter tolerance and a higher priority and a logical channel with a narrower jitter tolerance and a lower priority coexist, allocation of the logical channel with a narrower jitter tolerance and a lower priority is possible. Consequently, the jitter characteristics can be satisfied.

As another example, the UE may allocate logical channels in ascending order of the time from the timing to be scheduled (e.g., a slot, a mini-slot, or a symbol) to the maximum limit of the time range that can satisfy the jitter tolerance. For example, even when a plurality of jitter-critical logical channels exist at different timings, the jitter characteristics of the logical channels can be satisfied.

As another example, the base station may assign a higher priority to a logical channel with a narrow jitter tolerance. This can, for example, avoid the complexity in designing the communication system.

As another example, the UE may determine to allocate a logical channel, using the size of data that can be transmitted in each logical channel. Examples of the size may include the size of the RLC PDU that can be transmitted, the size of the PDCP PDU, the size of the SDAP PDP, the size of the SDAP SDU, and a sum of some of these sizes. For example, the UE may allocate the logical channels in descending order of the size. This can, for example, reduce a backlog of data in the communication system.

The aforementioned methods may be applied to the allocation of a jitter-critical logical channel and a logical channel with latency requirements. The UE may replace the jitter tolerance in the jitter-critical logical channel with the latency requirements and apply the latency requirements. For example, the UE may allocate logical channels in ascending order of the time from the timing to be scheduled (e.g., a slot, a mini-slot, or a symbol) to the maximum limit of the time range that can satisfy the latency requirements and/or the jitter tolerance. This can, for example, satisfy both of the jitter characteristics in the jitter-critical logical channel and the latency requirements of the logical channel with the latency requirements.

As another example, the base station may assign a higher priority to a logical channel with a narrow jitter tolerance and/or latency requirements. For example, the UE may replace the jitter tolerance in the jitter-critical logical channel with the latency requirements. The UE may replace, for example, the time from the minimum limit to the maximum limit of the jitter tolerance with a latency requirement in the jitter-critical logical channel, or the time from the center to the maximum limit of the jitter tolerance with the latency requirement. This can, for example, avoid the complexity in designing the communication system.

Information on the jitter tolerance and/or latency requirements may be included in the QoS parameter, or the logical channel configuration included in the RRC configuration to be transmitted from the base station to the UE. The QoS parameter may be notified from the base station to the UE, from the high-level NW device to the UE through the base station, or from the high-level NW device to the base station. The QoS parameter may be identical to that disclosed in the first embodiment.

In the communication system, latency requirements lower than a predetermined threshold may be regarded as the absence of the latency requirements. The threshold may be predefined in a standard, determined and notified to the UE by the base station, or determined and notified to the base station by the high-level NW device. The base station may or need not notify the UE of the threshold determined by the high-level NW device. This can, for example, avoid the complexity in the communication system.

The aforementioned methods may be applied to the allocation of a plurality of logical channels with the latency requirements. For example, the UE may allocate the logical channels in ascending order of the time until the latency requirements. The same may be applied to the information on the latency requirements. This can, for example, satisfy the latency requirements in the plurality of logical channels.

FIG. 23 illustrates operations of the LCP when the jitter-critical logical channel and the logical channel with latency requirements coexist. In FIG. 23, the LCH #1 indicates the logical channel with latency requirements, and the LCH #2 indicates the jitter-critical logical channel.

In FIG. 23, first, allocation of a logical channel to a unit of scheduling 2801 is described. The tolerable latency in the LCH #1 is shorter than the time until the maximum limit of the jitter tolerance in the LCH #2. The UE allocates data 2802 of the LCH #1 to the unit of scheduling 2801, using this.

In FIG. 23, allocation of a logical channel to a unit of scheduling 2803 next to the unit of scheduling 2081 is described. There is no logical channel with latency requirements or data of a jitter-critical logical channel other than that of the LCH #2. Thus, the UE allocates data 2804 of the LCH #2 to the unit of scheduling 2803.

Another solution is disclosed. The priorities may be variable. For example, in the jitter-critical communication, priorities in the jitter tolerance may be increased. For example, the UE may increase the priority in the logical channel by reducing a predetermined value (hereinafter may be referred to as an offset of the priority) from the priority value described in Non-Patent Document 17.

The reduced priority value need not be smaller than a predetermined threshold. The UE may set the reduced priority value identical to the predetermined threshold when the reduced priority value is smaller than the predetermined threshold. The predetermined threshold may be defined in a standard, or determined and notified to the UE by the base station. This can, for example, prevent the reduced priority value from falling out of a range predefined in a standard. Consequently, a malfunction in the LCP can be prevented. As another example, excessive increase in the priority can be prevented using an offset of the priority.

The offset of the priority may be a uniform value within the jitter tolerance. This can, for example, avoid the designing complexity in the LCP.

As another example, the offset of the priority may be variable within the jitter tolerance. For example, the offset of the priority after the appropriate reception timing may be, within the jitter tolerance, a value higher than the offset of the priority before the appropriate reception timing. This enables, for example, preferential retransmission of the HARQ when the retransmission of the HARQ is necessary. Consequently, the jitter characteristics can be enhanced.

The offset of the priority may be given per scheduling time unit. For example, as time progresses, a higher offset value of the priority may be set within the jitter tolerance. In addition to the aforementioned advantages, for example, the logical channels in the LCP can be flexibly allocated. The scheduling time unit may be a subframe, a slot, a mini-slot, or a symbol.

The offset of the priority may be predefined in a standard. For example, a uniform offset amount may be defined. Alternatively, an offset amount for each scheduling timing may be defined. Alternatively, association between a timing range and the offset amount may be defined. As the association between the timing range and the offset amount, a range from the minimum limit to the maximum limit of the jitter tolerance may be divided, and an offset amount may be defined for each of the divided ranges. For example, an offset amount in a range from the minimum limit to the center of the jitter tolerance and an offset amount in a range from the center to the maximum limit of the jitter tolerance may be defined.

The logical channels to which the offset of the priority is applied may be predefined in a standard. The offset of the priority may be applied to, for example, a jitter-critical logical channel and/or a logical channel with the latency requirements lower than or equal to a predetermined threshold. This can, for example, increase the priorities of the logical channels more than the other logical channels. Consequently, the jitter requirements and/or the latency requirements can be satisfied.

As another example, the base station may determine the offset of the priority and notify it to the UE. The base station may give the notification, for example, via the RRC signaling. The notification may include information on the logical channels. The information may include information on the offset amount. The UE may apply the offset included in the notification to the logical channels included in the notification. The information on the offset amount may be identical to that predefined in a standard. This enables, for example, the base station to notify the UE of a large amount of information. Consequently, the flexibility in configuring the offset of the priority can be increased.

As another example, the base station may give the notification via the MAC signaling. The notification may include the information on the logical channels or the information on the offset. The information on the offset may be identical to the information on the offset amount predefined in a standard. The UE may apply the offset included in the notification to the logical channels included in the notification. This enables, for example, the UE to promptly apply the offset.

As another example, the base station may give the notification via the L1/L2 signaling. The notification may include information on the logical channels or information on the offset. The notification may be included in the DCI including a scheduling grant, or different DCI. Furthermore, the base station may give the notification via different L1/L2 signaling. The information on the offset may be identical to the information on the offset amount predefined in a standard, or the offset amount applied in the grant. This enables, for example, the UE to further promptly apply the offset.

A plurality of information on offset amounts may be provided. The plurality of information may be defined in a standard, determined and notified to the UE by the base station, or determined and notified to the UE through the base station by the high-level NW device. The base station may notify the UE of an identifier of information to be used, in the plurality of information. The base station may notify the identifier, for example, via the RRC signaling, the MAC signaling, or the L1/L2 signaling. The notification may include information on the logical channels to which the offset is applied. The UE may derive the information to be used, using the identifier. The base station may determine the information to be used, using a configuration from the high-level NW device, for example, the QoS parameter or the information on network slicing. This can, for example, reduce the amount of signaling from the base station to the UE.

FIG. 24 illustrates giving an offset of a priority in the jitter-critical logical channel. FIG. 24 illustrates a case where an offset of a priority is configured within the jitter tolerance per scheduling time unit. In FIG. 24, the offset of the priority is not given outside the jitter tolerance.

In FIG. 24, the offset of the priority is configured to monotonically increase from the scheduling timing indicated by the minimum limit of the jitter tolerance to the appropriate timing. In FIG. 24, a uniform value is configured as the offset of the priority from the appropriate timing to the scheduling timing indicated by the maximum limit of the jitter tolerance.

FIG. 24 illustrates a case where the offset of the priority is configured per scheduling time unit. However, a uniform value may be configured as the offset of the priority within the jitter tolerance. This can, for example, avoid the designing complexity in the LCP processes of the UE.

An offset may be given to a priority outside the jitter tolerance. For example, the priority may be reduced outside the jitter tolerance. This can reduce the possibility of allocating a logical channel outside the jitter tolerance. Consequently, the jitter characteristics can be enhanced.

As another example, the priority may be reduced before the minimum limit of the jitter tolerance, and may be increased after the maximum limit of the jitter tolerance. The offset of the priority which monotonically decreases may be given in a range immediately after the maximum limit of the jitter tolerance and immediately before the minimum limit of the jitter tolerance in the next transmission cycle. This can prevent a backlog of data in the logical channel while enhancing the jitter characteristics.

FIG. 25 illustrates another example of giving an offset of a priority in the jitter-critical logical channel. The offset of the priority within the jitter tolerance in FIG. is identical to that in FIG. 24.

In FIG. 25, the offset of the priority is given even outside the jitter tolerance. The offset of the priority outside the jitter tolerance is an offset in a direction for reducing the priority. In FIG. 25, a uniform value is configured as the offset of the priority outside the jitter tolerance.

In FIG. 25, the uniform value may be configured as the offset of the priority within the jitter tolerance similarly to FIG. 24. This can, for example, avoid the designing complexity in the LCP processes of the UE.

FIG. 25 illustrates a case where a uniform value is configured as the offset of the priority outside the jitter tolerance. However, the offset may be variable per scheduling. For example, the priority may be reduced before the minimum limit of the jitter tolerance, and may be increased after the maximum limit of the jitter tolerance. The offset of the priority which monotonically decreases may be given in a range from immediately after the maximum limit of the jitter tolerance to immediately before the minimum limit of the jitter tolerance in the next transmission cycle. This can prevent a backlog of data in the logical channel while enhancing the jitter characteristics.

Giving of a priority to an offset may be applied to a logical channel with latency requirements. A method for configuring the offset amount in the logical channel with latency requirements and a method for notifying this configuration may be identical to those for the offset in the jitter-critical logical channel. As an example association between the timing range and the offset amount, a range from generation of data to the end transmission timing that satisfies the latency requirements may be divided, and an offset amount may be defined for each of the divided ranges. This enables, for example, the communication satisfying the latency requirements in the logical channel with the latency requirements.

FIG. 26 illustrates giving an offset of a priority in the logical channel with latency requirements. FIG. 26 illustrates a case where an offset of a priority is configured within the latency tolerance per scheduling time unit. In FIG. 26, a starting point of the latency tolerance in time is an uplink data generation time.

In the example of FIG. 26, the offset of the priority is configured to increase as the time progresses, in a section from the scheduling timing upon generation of data to the third preceding scheduling timing with respect to the maximum limit of the latency tolerance. In FIG. 26, a uniform value is configured as the offset of the priority from the third preceding scheduling timing with respect to the maximum limit of the latency tolerance to the maximum limit of the latency tolerance. In FIG. 26, the offset of the priority is not given outside the latency tolerance.

FIG. 26 illustrates a case where the offset of the priority is configured per scheduling time unit. However, a uniform value may be configured within the latency tolerance as the offset of the priority. This can, for example, avoid the designing complexity in the LCP processes of the UE.

FIG. 26 illustrates an example of configuring the offset of the priority only within the latency tolerance. However, the offset of the priority may be configured outside the latency tolerance. This enables, for example, the UE to promptly transmit data falling out of the latency tolerance to the base station. Consequently, a backlog of data in the UE can be prevented.

The offset of the priority may be applied to the scheduling using the configured grant. A method for applying the offset of the priority using the configured grant may be identical to the method disclosed in the third modification of the first embodiment. This can, for example, satisfy the jitter characteristics in the scheduling using the configured grant.

The jitter-critical logical channel may be switched to a logical channel that is not jitter-critical. The logical channel that is not jitter-critical may be switched to a jitter-critical logical channel.

The base station may determine whether to switch the logical channel. The base station may notify the UE of information on the switching. The base station may give the notification, for example, via the RRC signaling, the MAC signaling, or the L1/L2 signaling.

As another example, the high-level NW device may determine whether to switch the logical channel. The high-level NW device may notify the UE of information on the switching. The high-level NW device may give the notification, for example, via the NAS signaling. The high-level NW device may give the notification through the base station.

As another example, the UE may determine whether to switch the logical channel. The UE may notify the information on the switching to the base station or the high-level NW device. The base station or the high-level NW device may determine whether to switch the logical channel. The base station and/or the high-level NW device may notify the UE of information on the determination.

The notification on the switching may include information on the logical channel or information on the switched QoS. The information on the QoS may be, for example, information on the jitter characteristics or information on the latency requirements.

The third modification of the first embodiment can enhance the jitter characteristics even when the jitter-critical communication and the other communication coexist.

The Fourth Modification of the First Embodiment

In the jitter-critical communication, data falling out of the jitter tolerance may be discarded. The data may be discarded in the uplink communication or the downlink communication. The same may be applied to the communication with the latency requirements.

A threshold different from that for the jitter tolerance may be used in the discarding. For example, a range wider than the jitter tolerance may be provided. Data falling out of the wider range may be discarded. The same may be applied to the communication with the latency requirements.

The transmitter may perform the discarding operation. An application layer, the SDAP layer, or the PDCP layer of the transmitter may perform the discarding operation. In the discarding operation, the PDCP layer may discard the PDCP SDU. The PDCP layer may discard the PDCP SDU, for example, before the PDCP SDU is transferred to a lower layer (e.g., the RLC layer). As another example, the PDCP layer may discard the PDCP PDU. The PDCP layer may discard the PDCP PDU, for example, when the PDCP PDU has already been transferred to the lower layer (e.g., the RLC layer). When the PDCP layer discards the PDCP PDU, acknowledgement of the PDCP PDU may be assumed. The PDCP layer may advance a transmission window. As another example, discarding of the PDCP SDU and discarding of the PDCP PDU may be used in combination.

As another example, the RLC layer of the transmitter may perform the discarding operation. In the discarding operation, the RLC layer may discard the RLC SDU. The RLC layer may discard the RLC SDU, for example, before the RLC SDU is transferred to a lower layer (e.g., the MAC layer). As another example, the RLC layer may discard the RLC PDU. The RLC layer may discard the RLC PDU, for example, when the RLC PDU has already been transferred to the lower layer (e.g., the MAC layer). When the RLC layer discards the RLC PDU, acknowledgment of the RLC PDU may be assumed. The RLC layer may advance a transmission window. As another example, discarding of the RLC SDU and discarding of the RLC PDU may be used in combination.

As another example, the MAC layer of the transmitter may perform the discarding operation. The MAC layer may perform the discarding operation in the LCP processes.

The discarding operations in the layers of the transmitter may be used in combination. For example, the PDCP layer may discard the PDCP SDU and the PDCP PDU, and the RLC layer may discard the RLC PDU. This can, for example, prevent a backlog of data in each of the layers.

As another example, the receiver may perform the discarding operation. An application layer, the SDAP layer, or the PDCP layer of the receiver may perform the discarding operation. In the discarding operation, the PDCP layer may discard the PDCP PDU. In discarding of the PDCP PDU, the PDCP layer may regard the PDCP PDU as being normally received (Ack). The PDCP layer may advance a reception window of the PDCP layer when discarding the PDCP PDU.

As another example, the RLC layer of the receiver may perform the discarding operation. In the discarding operation, the RLC layer may discard the RLC PDU. In discarding of the RLC PDU, the RLC layer may regard the RLC PDU as being normally received (Ack). The RLC layer may advance a reception window of the RLC layer when discarding the RLC PDU.

As another example, the MAC layer of the receiver may perform the discarding operation. In the discarding operation, the MAC layer may discard the received transport block. As another example, the MAC layer may discard logical channel data extracted from the transport block. This can prevent a packet loss caused by discarding the other logical channels, for example, even when the jitter-critical logical channel and the other logical channels are multiplexed into the same transport block.

When performing the discarding operation, the MAC layer of the receiver may transmit the HARQ-Ack as HARQ feedback in the transport block to be discarded.

The discarding operations in the layers of the receiver may be used in combination. This can, for example, prevent a backlog of data in each of the layers of the receiver.

As another example, both of the transmitter and the receiver may perform the discarding operations. The methods disclosed in the fourth modification of the first embodiment may be used in combination when both of the transmitter and the receiver perform the discarding operations. This can, for example, reduce the memory usage in the communication system.

The discarding operation may be predefined in a standard. For example, the presence or absence of discarding may be defined, or an entity that performs the discarding (e.g., the transmitter and/or the receiver) may be defined.

The discarding operation may be determined using the QoS parameter. Information included in the QoS parameter may be, for example, information on the jitter tolerance, information on the latency requirements, or information on the wider range. The information on network slicing (e.g., Network Slice Selection Assistance Information (NSSAI)) may be used.

As another example, the base station may determine the discarding operation and notify it to the UE. The base station may give the notification, for example, via the RRC signaling, the MAC signaling, the L1/L2 signaling, or a combination of some of these.

As another example, the high-level NW device may determine the discarding operation and notify it to the UE. The high-level NW device may give the notification through the base station. The high-level NW device may give the notification, for example, via the NAS signaling. Alternatively, the high-level NW device may give the notification, for example, via a combination of the signaling to be used for the interface between the high-level NW device and the base station and the signaling to be used for the notification from the base station to the UE.

The information to be notified from the base station and/or the high-level NW device to the UE may include information for identifying data on which the discarding operation is performed. Examples of the information for identifying data may include a PDU session, a bearer, a logical channel, a QoS flow, the information on network slicing, and a combination of some of these.

As another example, the information may include information on conditions of the QoS (e.g., a threshold) for performing the discarding operation. The UE may perform the discarding operation on data satisfying the conditions. As another example, the UE may perform the discarding operation on data that does not satisfy the conditions.

As another example, the information may include the information on the wider range.

The receiver may hold data until the timing with which jitter does not occur. The receiver may transfer the data to the upper layer with the timing. The data may be held in, for example, an application layer, an input terminal of the application layer, the SDAP, the PDCP layer, the RLC layer, or the MAC layer. The same may be applied to data with latency requirements. For example, the receiver may hold data until the timing with predetermined latency. The receiver may transfer received data to the upper layer with the timing. This can, for example, enhance the jitter characteristics through the communication system.

The base station may notify the UE of information on the timing. The base station may give the notification, for example, via the RRC signaling, the MAC signaling, or the L1/L2 signaling.

The transmitter may notify information on the transmission time of transmission data or information on the reception due time at which the receiver should perform reception. The reception due time may be, for example, the time at which the receiver should transfer data to the upper layer. The time may be, for example, the time per millisecond, the time using a subframe number, the time using a slot number, the time using a mini-slot number, the time using a symbol number, or the time using a combination of some of these. The transmitter may, for example, attach a timestamp to the transmission data. The timestamp may represent information identical to the aforementioned time. The upper layer, the SDAP, the PDCP, the RLC, or the MAC may attach the timestamp. As another example, the information on the transmission time may be notified via the RRC signaling, the MAC signaling, or the L1/L2 signaling. The receiver may derive the timing using the information on the transmission time. The receiver may remove the timestamp from the received data. Consequently, for example, the latency in transmitting and receiving data can be held constant. Specifically, jitter can be reduced.

According to the fourth modification of the first embodiment, data falling out of the jitter tolerance is discarded. This enables, for example, discarding of data in the logical channel as well as reducing the amount of processing in the communication system.

The Second Embodiment

A dormant state described in Non-Patent Document 24 (TS36.321 V15.2.0) may be applied in an NR cell. The UE may transition a communication state with a cell of the gNB to the dormant state or an activated state, using the MAC signaling from the gNB.

However, when a cell configured for the packet duplication using the CA is in the dormant state, the gNB needs to notify the UE of the MAC signaling for canceling the dormant state, prior to the communication of the packet duplication. This causes problems of delay in the start of the communication of the packet duplication and increase in the latency.

A solution to the problems is disclosed.

The cell in which the packet duplication has been configured is not put into the dormant state. The dormant state may be disabled. A timer to be used for implicitly transitioning the cell to the dormant state may be disabled. A timer to be used for implicitly terminating communication of the dormant SCell (e.g., dormantSCellDeactivationTimer described in Non-Patent Document 24) may be disabled.

As another example, the cell in which the packet duplication has been configured is not put into a deactivated state. Only an activated state or the dormant state may be chosen for the cell in which the packet duplication has been configured. This enables, for example, prompt resumption of the packet duplication.

As another example, the cell in which the packet duplication has been activated need not be put into the dormant state. The dormant state may be disabled. A timer to be used for implicitly transitioning the cell to the dormant state may be disabled. A timer to be used for implicitly terminating communication of the dormant SCell may be disabled.

As another example, the cell in which the packet duplication has been activated may be put into the activated state. Transitioning to the activated state may be performed without the MAC signaling for instructing cell activation. This can, for example, reduce the amount of signaling from the base station to the UE.

Two or three of the MAC signaling for instructing activation/deactivation of the packet duplication, the MAC signaling for instructing a dormant state or canceling the dormant state in the cell, and the MAC signaling for instructing activation/deactivation of the cell may be unified. This can, for example, reduce the amount of signaling from the base station to the UE.

As another example, the packet duplication may be performed using a cell in a non-dormant state. The cell may be, for example, a cell in an activated state. For example, cancellation of the dormant state of the cell is unnecessary. Consequently, the packet duplication can be promptly performed.

The UE may prioritize the MAC signaling for the packet duplication over the MAC signaling for putting the SCell into a dormant state or canceling the dormant state. As another example, the UE may prioritize the MAC signaling for putting the SCell into a dormant state or canceling the dormant state over the MAC signaling for the packet duplication. The prioritizing operations may be applied when the aforementioned MAC signalings are transmitted simultaneously or with different timings. This can prevent a malfunction caused by a variance in the cell state between the base station and the UE.

Operations may be defined by combinations of the MAC signaling for instructing activation/deactivation of the packet duplication, the MAC signaling for instructing a dormant state or canceling the dormant state in the cell, and the MAC signaling for instructing activation/deactivation of the cell. This can, for example, prevent a malfunction caused by a variance in the cell state between the base station and the UE.

The dormant SCell may be applied to each of the uplink communication and the downlink communication. For example, the SCell may be activated in the uplink communication, whereas the SCell may be put into the dormant state in the downlink communication. The same may be applied to the activation/deactivation of the SCell and to the packet duplication. An identifier indicating the uplink or the downlink may be added to the MAC signaling from the base station to the UE. This enables, for example, flexible operations of the communication system.

The operations in the second embodiment may be applied to the LTE. This enables, for example, prompt packet duplication using the LTE.

According to the second embodiment, the UE can promptly perform the packet duplication on a dormant cell.

The First Modification of the Second Embodiment

The UE using the CA may pause the communication with the SCell. The SCell may be an LTE cell, an NR cell, or further a next-generation cell. The base station may explicitly instruct the UE to pause the communication with the SCell. The base station may give the instruction, for example, via the MAC signaling. As another example, the UE may implicitly pause the communication with the SCell. A timer may be used when the UE implicitly pauses the communication. The UE may pause the communication with the SCell on expiration of the timer. After pausing the communication with the SCell, the UE may terminate the communication with the SCell.

However, Non-Patent Document 24 does not disclose a method for implicitly terminating the communication with the SCell after implicitly pausing the communication with the SCell. Thus, the UE cannot implicitly terminate the communication with the SCell after implicitly pausing the communication with the SCell. Thus, a problem of increase in the power consumption in the UE occurs.

A method for solving the problem is disclosed. The UE starts a timer to be used for implicitly terminating the communication with the dormant SCell after implicitly pausing the communication with the SCell. The UE may terminate the communication with the dormant SCell on expiration of the timer. The timer may be identical to the timer to be activated when the base station explicitly instructs pausing the communication with the SCell (e.g., the dormantSCellDeactivationTimer described in Non-Patent Document 24). This can, for example, avoid the complexity in designing the communication system.

Values of the timer when the UE explicitly and implicitly pauses the communication with the SCell may be the same or different. As an example where the values of the timer are different, the UE may use a value obtained by subtracting a predetermined value from each of the values of the timer, as an initial value of the timer. For example, when the UE implicitly pauses the communication with the SCell, the value resulting from the subtraction may be used as the initial value of the timer. This enables, for example, the UE to terminate the communication with the dormant SCell earlier. Consequently, the power consumption in the UE can be reduced.

As another example, the timer to be used for implicitly terminating the communication with the dormant SCell may be different from the timer to be activated when the base station explicitly instructs pausing the communication with the SCell. This produces, for example, the same advantages as previously described.

The first modification of the second embodiment enables the UE to implicitly transition the communication with the SCell from a pause to its termination. This enables reduction of the power consumption in the UE as well as reduction of the amount of signaling between the base station and the UE.

The Second Modification of the Second Embodiment

The UE even in RRC_IDLE or RRC_INACTIVE state may measure a cell. The UE may notify the base station of the measurement result.

However, none discloses a measurement method in the UE in RRC_IDLE or RRC_INACTIVE state or a method for notifying the measurement result. Thus, the UE cannot perform the measurement or notify the base station of the measurement result.

The second modification of the second embodiment discloses a method for solving the problem.

The UE in RRC_IDLE or RRC_INACTIVE state may measure an SS block.

The base station may notify the UE of information on the SS block to be measured by the UE. The base station may give the notification, for example, before the UE transitions from RRC_CONNECTED state to RRC_IDLE or RRC_I-NACTIVE state.

The information may include an identifier of the cell to be measured, information on a frequency of the SS block to be measured, an identifier of the SS block, information on the timing, or information on subcarrier spacing in which the SS block is measured. The information on the timing may be, for example, information on the frame timing offset between a cell to which the UE is being connected and a cell to be measured, and information on a position of the SS block in the time direction which is included in the SS burst of the cell. A plurality of the information may be provided. For example, the number of the plurality of the information may correspond to the number of cells and/or beams to be measured. The UE may measure the SS block using the information. This enables, for example, the UE in RRC_IDLE or RRC_CONNECTED to promptly measure the SS block.

As another example, the UE in RRC_IDLE or RRC_I-NACTIVE state may measure the CSI-RS. The base station may notify the UE of information on the CSI-RS to be measured by the UE. The base station may give the notification, for example, before the UE transitions from RRC_CONNECTED state to RRC_IDLE or RRC_INAC-TIVE state.

The information may include an identifier of the cell to be measured, information on a frequency of the CSI-RS, information on the timing, information on the placement in the frequency and time resources, information on subcarrier spacing in which the CSI-RS is measured, or information on code patterns. The information on the timing may be, for example, information on the frame timing offset between a cell to which the UE is being connected and a cell to be measured. A plurality of the information may be provided. For example, the number of the plurality of the information may correspond to the number of cells and/or beams to be measured. The UE may measure the CSI-RS using the information. This enables, for example, the UE in RRC_IDLE or RRC_CONNECTED to promptly measure the CSI-RS.

As another example, the UE in RRC_IDLE or RRC_I-NACTIVE state may measure both of the SS block and the CSI-RS. The notification to be used in measuring the SS block and the notification to be used in measuring the CSI-RS may be used in combination as the notification from the base station to the UE. This enables, for example, the base station to promptly perform the RRC connection resumption for the UE.

A measurement event in RRC_IDLE and/or RRC_INAC-TIVE may be provided. The measurement event may be an event on the measurement result of the cell or an event on the measurement result of the beam. The measurement event may be, for example, a measurement event in RRC_CON-NECTED. As another example, the measurement event may occur when the conditions on cell reselection are satisfied. The base station may configure the measurement event for the UE. Upon occurrence of the measurement event, the UE may report the measurement result to the base station. This enables, for example, the UE to promptly notify the base station of a measurement result of a cell.

The UE may give the report, for example, via the RRC signaling. The UE may transition to RRC_CONNECTED in the reporting. The base station may instruct the UE to transition to RRC_INACTIVE or RRC_IDLE after the report is given.

The UE may include the measurement report in the notification on the RAN Notification Area Update (RNAU) for the base station. The UE may notify the measurement report together with the notification on the RNAU. For example, the UE need not transition from RRC_INACTIVE to RRC_CONNECTED to notify only the measurement report. This can reduce the power consumption in the UE.

As another example, the UE may include the measurement report in the notification on the Tracking Area Update (TAU) for the base station. The UE may notify the measurement report together with the notification on the TAU. For example, the UE need not return from RRC_IDLE to RRC_CONNECTED to notify only the measurement report. This can reduce the power consumption in the UE.

When instructing the UE to transition to RRC_CON-NECTED, the base station need not notify the RRC parameter configured before the UE transitions to RRC_IDLE or RRC_INACTIVE. The RRC parameter may indicate, for example, a configuration on the PDU session, a bearer configuration, or a logical channel configuration. The RRC parameter may indicate, for example, the SDAP configuration, the PDCP configuration, the RLC configuration, the MAC configuration, or the PHY configuration. The UE may hold the configured RRC parameter after transitioning to RRC_IDLE or RRC_INACTIVE. This can reduce the amount of signaling from the base station to the UE. Consequently, the UE can promptly report the measurement result to the base station.

The second modification of the second embodiment enables the UE in RRC_IDLE or RRC_INACTIVE state to notify the measurement result with less power consumption.

The Third Embodiment

In 3GPP, the sidelink (SL) is supported for the Device-to-Device (D2D) communication and the Vehicle-to-Vehicle (V2V) communication (see Non-Patent Document 1). The SL is defined by the PC5 interface.

Physical channels (see Non-Patent Document 1) to be used for the SL are described. A physical sidelink broadcast channel (PSBCH) carries information related to systems and synchronization, and is transmitted from the UE.

A physical sidelink discovery channel (PSDCH) carries a sidelink discovery message from the UE.

A physical sidelink control channel (PSCCH) carries control information from the UE for the sidelink communication and the V2X sidelink communication.

A physical sidelink shared channel (PSSCH) carries data from the UE for the sidelink communication and the V2X sidelink communication.

Transport channels (see Non-Patent Document 1) to be used for the SL are described. A sidelink broadcast channel (SL-BCH) has a predetermined transport format, and is mapped to the PSBCH that is a physical channel.

A sidelink discovery channel (SL-DCH) has periodic broadcast transmission of a fixed size and a predetermined format. The SL-DCH supports both of the UE autonomous resource selection and the resource allocation scheduled by the eNB. The SL-DCH has collision risk in the UE autonomous resource selection. The SL-DCH has no collision when the eNB allocates dedicated resources to the UE. The SL-DCH supports the HARQ combining. The SL-DCH does not support the HARQ feedback. The SL-DCH is mapped to the PSDCH that is a physical channel.

A sidelink shared channel (SL-SCH) supports broadcast transmission. The SL-SCH supports both of the UE autonomous resource selection and the resource allocation scheduled by the eNB. The SL-SCH has collision risk in the UE autonomous resource selection. The SL-SCH has no collision when the eNB allocates dedicated resources to the UE. The SL-SCH supports the HARQ combining. The SL-SCH does not support the HARQ feedback. The SL-SCH supports dynamic link adaptation by varying the transmission power, modulation, and coding. The SL-SCH is mapped to the PSSCH that is a physical channel.

Logical channels (see Non-Patent Document 1) to be used for the SL are described. A Sidelink Broadcast Control Channel (SBCCH) is a sidelink channel for broadcasting sidelink system information from one UE to other UEs. The SBCCH is mapped to the SL-BCH that is a transport channel.

A Sidelink Traffic Channel (STCH) is a point-to-multipoint sidelink traffic channel for transmitting user information from one UE to other UEs. This STCH is used only by sidelink communication capable UEs and V2X sidelink communication capable UEs. The point-to-point communication between two sidelink communication capable UEs is realized with the STCH. The STCH is mapped to the SL-SCH that is a transport channel.

In NR in 3GPP, support of the V2X communication has been studied. Study of the V2X communication in NR has been pursued based on the LTE system and the LTE-A system. There are changes and additions from the LTE system and the LTE-A system in the following points.

In LTE, the V2V communication in the SL relies only on broadcasts. In NR, support of not only broadcasts but also unicasts and groupcasts has been studied as the V2V communication in the SL (see Non-Patent Document 22 (3GPP RP-182111)).

FIGS. 27 and 28 are conceptual diagrams of the SL communication. FIG. 27 illustrates the broadcast communication, and FIG. 28 illustrates the unicast communication. In the broadcast communication of FIG. 27, transmission from the UE #1 to the UE #2, the UE #3, and the UE #4 is performed. In the unicast communication of FIG. 28, communication from the UE #1 to the UE #2 and from the UE #2 to the UE #1 is performed. Bidirectional communication is performed between the UE #1 and the UE #2. For example, data, HARQ feedback (Ack/Nack), or the CSI report may be communicated between the UE #1 and the UE #2.

As such, support of unicasts as the SL communication has been studied in NR. Unicasts require bidirectional communication unlike broadcasts. For example, two UEs (the UE #1 and the UE #2) need not only transmission from the UE #1 to the UE #2 but also transmission from the UE #2 to the UE #1. Since the SL communication in LTE relies on broadcasts, the transmission from the UE #2 to the UE #1 is unnecessary.

The SL communication requires configuring communication resources. Since the SL communication in LTE relies only on broadcasts, only the configuration of resources for transmission from the UE #1 to the UE #2 is necessary. However, unicasts in NR require not only the configuration of resources for transmission from the UE #1 to the UE #2 but also the configuration of resources for transmission from the UE #2 to the UE #1. A method for configuring the resources for transmission from the UE #2 to the UE #1 for unicasts in NR has not yet been determined. Without the configuration, the bidirectional communication is not possible.

The third embodiment discloses a method for solving such a problem.

A case where the gNB does not schedule the resources for communication in the SL is disclosed. In other words, a case where the UE performs the scheduling is disclosed.

One UE configures resources for unicast communication. One UE configures resources for bidirectional communication. The resource configuration may include sensing resources, selecting resources for transmission, and reserving the resources for transmission.

The one UE may be a UE that first transmits data. The UE that first transmits data preconfigures resources for transmission of its own UE and resources for transmission from the UE that performs unicast communication, before transmitting the data.

The resources for transmission from each UE may be resources for data to be transmitted from the UE, or resources for HARQ feedback (Ack/Nack), the CSI report, etc. The resources for transmission from each UE may be resources for sounding signals or channels to be transmitted from the UE. The resources for data may include resources for initial transmission data and resources for retransmission data.

One UE that configures resources for unicast communication may be, for example, a UE that first transmits a control signal or channel. The UE may transmit not the control signal or channel but control signaling. Specifically, the one UE that configures resources for unicast communication may be, for example, a UE that first transmits the control signaling.

The unicast communication method may include first transmitting a control signal, channel, or signaling for starting to establish a connection for the unicast communication. In such a case, the UE that first transmits a control signal, channel, or signaling for starting to establish a connection should configure the resources for the unicast communication.

Since the one UE that performs unicasts configures resources for bidirectional communication, control on configuration of the resources can be simplified. Since the one UE configures the resources for unicast communication, the number of UEs that configure the resources can be reduced. Thus, collision in the resources to be used by other UEs can be reduced.

In the unicast communication, information indicating for which data the HARQ feedback is may be attached to the HARQ feedback. The HARQ feedback may include information for identifying the corresponding data. This enables the UE that has transmitted data to recognize for which data the HARQ feedback is. The UE that first transmits data should associate the data with resources for the HARQ feedback when configuring the resources for the HARQ feedback on the data. This can omit the information indicating for which data the HARQ feedback is.

Another method is disclosed. The UE that performs transmission configures resources for the transmission. Each of the UEs that perform unicast communication configures resources for transmission of its own UE. The resources for transmission of its own UE may be resources for data or resources for the HARQ feedback (Ack/Nack), the CSI report, etc. The resources for transmission of its own UE may be resources for sounding signals or channels to be transmitted by its own UE. The resources for data may include resources for initial transmission data and resources for retransmission data. The resources for transmission of its own UE may be resources for transmitting a control signal or channel for starting to establish a connection in the unicast communication.

In the HARQ feedback, the UE that transmits the HARQ feedback configures resources. Thus, the UE that has transmitted data cannot recognize that the transmitted HARQ feedback is HARQ feedback information for which data.

To solve such a problem, the HARQ feedback should include information for identifying the corresponding data when the HARQ feedback is transmitted. How to include the information may be, for example, providing combined information of the feedback and the information for identifying the data. Alternatively, the information for identifying the data may be scrambled with the feedback. The information for identifying the corresponding data may be, for example, information for identifying the UE that has transmitted the data, e.g., a UE identifier. The UE that has transmitted the data can recognize the feedback from which the identifier of its own UE has been detected, as the feedback information on the data transmitted by its own UE.

As another example, the UE that transmits data includes a specific identifier to be associated with the data, in the control information to be transmitted when transmitting the data. The UE that has received the data may include the identifier into the HARQ feedback to be transmitted. The UE that has transmitted the data can recognize the feedback from which the identifier has been detected, as the feedback information on the data transmitted by its own UE.

This enables the data transmission UE to receive the HARQ feedback information from the data reception UE, even when the UE that transmits the HARQ feedback configures the resources for feedback.

Consequently, one UE need not configure the resources for transmission of other UEs. Thus, information on configuration of transmission resources, for example, resource allocation information need not be notified between the UEs. In the SL communication, the signaling between the UEs can be reduced. Each UE can configure the resources appropriate in amount to perform its own transmission. This can increase the use efficiency of the resources.

Another method is disclosed. In the unicast communication, the same UE should configure the resources for transmitting a predetermined signal or channel and the resources for transmitting, for example, the feedback or the report on the transmission. The UE that transmits the predetermined signal or channel may configure both of the resources. The latency in the unicast communication can be reduced.

For example, the UE that transmits data associated with the feedback configures the resources for the HARQ feedback. For example, the UE #1 transmits data to the UE #2, and the UE #2 transmits, to the UE #1, the HARQ feedback on the data. Here, the UE #1 configures the resources for the HARQ feedback. The UE #1 configures both of the resources for data transmission and the resources for the HARQ feedback on the data transmission.

In the bidirectional data communication, for example, the UE #1 transmits data to the UE #2, the UE #2 transmits, to the UE #1, the HARQ feedback on the data, the UE #2 further transmits data to the UE #1, and the UE #1 transmits, to the UE #2, the HARQ feedback on the data. Here, the UE #1 configures the resources for the data to be transmitted by the UE #1 and for the HARQ feedback on the data which is to be transmitted by the UE #2. The UE #2 configures the resources for the data to be transmitted by the UE #2 and for the HARQ feedback on the data which is to be transmitted by the UE #1.

Consequently, the UE that transmits the HARQ feedback need not configure the resources before the HARQ feedback. Thus, a period from transmission of the data to transmission of the HARQ feedback can be shortened. The latency in the unicast communication can be reduced.

The UE that transmits a signal or channel related to the CSI report may configure the resources for the CSI report. For example, the UE #1 transmits the CSI-RS to the UE #2, and the UE #2 transmits, to the UE #1, the CSI report derived from a reception result of the CSI-RS. Here, the UE #1 configures the resources for the CSI report. The UE #1 configures both of the resources for transmitting the CSI-RS and the resources for the CSI report on the CSI-RS. The same is applied to the bidirectional case.

Consequently, the UE that transmits the CSI report need not configure the resources before the CSI report. Thus, a period from transmission of the CSI-RS to transmission of the CSI report can be shortened. The latency in the unicast communication can be reduced.

Another method is disclosed. Whether its own UE configures the resources for transmission is configurable. The following five specific examples of judgment indicators indicating whether its own UE configures the resources for transmission are disclosed.

(1) The type of a service
(2) The QoS
(3) The type of a resource schedule
(4) The type of transmission data
(5) Transmission protocol In (1), whether its own UE configures the resources for transmission is determined according to the type of a service to be communicated in unicast. For example, when the service to be communicated in unicast is a service in which data is non-cyclically transmitted, its own UE may configure the resources for transmission. When the service is a service in which data is transmitted not non-cyclically but cyclically, one UE may configure the resources for transmission.

When the data is cyclically transmitted, the timing of the data transmission is easily derived. Thus, one UE easily configures the resources for transmission, which can simplify the control.

In (2), whether its own UE configures the resources for transmission is determined according to the QoS of the service to be communicated in unicast. For example, when the low latency characteristics, which are required as the QoS of the service to be communicated in unicast, are greater than a predetermined threshold, its own UE may configure the resources for transmission. When the required low latency characteristics are less than or equal to the predetermined threshold, one UE may configure the resources for transmission.

When the service requires the low latency characteristics, the low latency characteristics can be further enhanced by one UE configuring the resources for transmission. When the service does not require the low latency characteristics, the use efficiency of the resources can be further increased by its own UE configuring the resources for transmission.

The low latency characteristics are exemplified as the QoS. However, the QoS may be the reliability such as a packet error rate, a slew rate such as a guaranteed bit rate, or priorities such as a priority for each packet as the other examples. The priority for each packet may be, for example, a ProSe Per-Packet Priority (PPPP).

In (3), whether its own UE configures the resources for transmission is determined according to the type of resource schedule to be used for the communication in the SL. For example, when the resource scheduling is dynamic scheduling, its own UE may configure the resources for transmission. When the resource scheduling timing such as semi-persistent scheduling (SPS) or the configured grant is preconfigured, one UE may configure the resources for transmission.

When the resources are dynamically scheduled, its own UE configures the resources for transmission. This can increase the use efficiency of the resources. When the resource scheduling timing is configured, one UE easily configures the resources for transmission. This can simplify the control.

In (4), whether its own UE configures the resources for transmission is determined according to the type of transmission data. For example, when transmitting control planes, control information, or control signaling, its own UE may configure the resources for transmission. When transmitting user planes or data, one UE may configure the resources for transmission.

The timing to perform transmission on control often dynamically occurs. Thus, its own UE configures the resources for transmission, which can increase the use efficiency of the resources. The timing to transmit data is often preconfigured. This facilitates configuration of the resources for transmission by one UE, which can simplify the control.

In (5), whether its own UE configures the resources for transmission is determined according to a transmission protocol stack. For example, its own UE may configure the resources for transmission to perform the transmission via the RRC, whereas one UE may configure the resources for transmission to perform the transmission via the PHY or the MAC.

The transmission via the RRC sometimes requires a plurality of number of transmissions, or the latency characteristics required for the transmission are sometimes loose. Thus, its own UE can configure the resources for transmission. On the other hand, the transmission via the PHY or the MAC sometimes requires less number of transmissions and the low latency characteristics. Thus, one UE configures the resources for transmission, which can produce the low latency characteristics.

The description above shows mere exemplifications. Without being limited by these, the appropriate configuration may be made according to the judgment indicators.

Whether its own UE configures the resources for transmission may be statically predetermined, for example, in a standard. The gNB may notify the UE of the configuration. The notification method may be a broadcast or a dedicated notification. The gNB may give the dedicated notification, for example, via the RRC signaling, the MAC signaling, or the L1/L2 control signaling. Whether its own UE configures the resources for transmission may be preconfigured in the UE. For example, the configuration information may be preconfigured in the SIM of the UE. The configuration method may be notified between the UEs.

The aforementioned methods may be appropriately combined. For example, when the unicast communication is performed, each UE that performs transmission configures the resources for transmission in a connection request process, whereas one UE configures the resources for transmission in processes of transmitting data and the feedback. This can produce an advantage appropriate for each process or each signal or channel to be transmitted.

When performing scheduling, the UE can configure the resources for transmission by each peer UE for unicast communication. Thus, the bidirectional communication is possible. The scheduling by the UE enables application of the disclosed methods, regardless of the presence or absence of the UE in a coverage of the gNB. This enables the configuration of the resources for transmission by each peer UE for unicast communication. Thus, the bidirectional communication is possible.

A case where the gNB performs scheduling in the SL is disclosed.

The gNB notifies each UE that performs transmission of the configuration of resources for transmission. Each UE configures the resources according to the configuration of resources which has been notified from the gNB, and performs transmission with the resources.

The UE that performs unicast communication may transmit the SR and/or BSR to the gNB. The gNB configures, for each UE, the resources for transmission according to the SR and/or BSR received from the UE. This SR and/or BSR is transmitted from each UE to the gNB via the Uu interface. The gNB should notify the UE of the configuration of resources for transmitting the SR and/or BSR in advance. This enables the configuration of the resources for transmission for each UE that performs a unicast.

The gNB may notify, in advance, the UE that performs unicast communication of the configuration of resources for transmitting a control signal/channel or control signaling in the SL. For example, when the connection request process is performed between UEs in the unicast communication, the gNB notifies, in advance, the UEs of the configuration of resources for transmitting a control signal/channel or control signaling for the connection request process. This enables the configuration of resources for the process before data is transmitted in unicast.

Another method is disclosed. The gNB notifies one UE of configuration of resources for bidirectional transmission. The gNB may transmit, to the one UE, information indicating a transmission target UE in the unicast communication. The gNB may associate the configuration of resources for transmission with an identifier of the transmission target UE, and transmit them to the one UE. The UE notified of the configuration of resources notifies the transmission target UE in the unicast communication of the configuration of resources notified from the gNB. Each UE configures the resources according to the notified configuration of resources, and performs transmission with the resources.

The UE that performs unicast communication may transmit the SR and/or BSR to the gNB. The UE may transmit, to the gNB, information indicating the transmission target UE in the unicast communication. The information may be a UE identifier. The UE may include the information in the SR and/or BSR, and notify the information. The aforementioned methods may be applied to a method for transmitting the SR and/or BSR. The gNB should detect the peer UE that performs unicast communication from among the UEs that have transmitted the SR and/or BSR, and notify one of the UEs of the configuration of resources for bidirectional transmission.

The resources for transmission for the transmission target UE in the unicast communication may be blindly configured. Until receiving the BSR from the transmission target UE, the UE may blindly configure the resources. The configuration of resources for transmission is possible without the gNB receiving the SR and/or BSR from the transmission target UE. In other words, the SR and/or BSR from the transmission target UE are unnecessary. This can simplify the control of the unicast communication, and reduce the amount of signaling.

Consequently, the resources for transmission for each UE that performs a unicast are configurable.

The methods disclosed in the third embodiment enable the configuration of the resources for transmission for each UE in the unicast communication. Thus, the unicast communication is possible. Furthermore, the resources for transmitting data or a predetermined signal or channel, and the resources for transmitting, for example, the feedback or the report on the transmission are configurable. This can increase the communication quality in the unicast communication.

The UE senses resources to determine the resources available for the communication in the SL (Non-Patent Document 27). Since the SL in the conventional LTE relies only on broadcasts, only the initial transmission (including repeated transmission (repetitions)) is performed without retransmission. However, retransmission is required in the unicast communication. A sensing method when retransmission is required is unknown. Thus, a new sensing method for enabling the unicast communication is sought. Here, a method for sensing resources for the unicast communication is disclosed.

When resources are sensed, resources excluded from candidates for resources to be used for the unicast communication include the resources for retransmission as well as the resources for initial transmission. The resources may include the resources for feedback as well as the resources for initial transmission. The resources may include the resources for another signal, channel, or signaling.

The resources to be sensed need not exclude all the resources configured for initial transmission, retransmission, feedback, and another signal, channel, or signaling. For example, a threshold for exclusion may be provided. For example, a threshold for the received power is provided. The UE may measure the received power of these resources, and exclude resources whose measurement value is larger than the threshold. Although the received power is used as a measurement indicator, a received intensity may be used. Without being limited by this, other indicators may be used.

A threshold may be determined for each resource use. For example, a threshold used for excluding the resources for initial transmission may be identical to that for retransmission, and a threshold used for excluding the resources for feedback may be different from those for initial transmission and for retransmission. For example, decrease in a threshold for a FB signal may reduce the interference between the UEs. Consequently, the signal can change the interference from another UE.

The UE evaluates a channel occupied ratio (CR) in transmission in the SL (Non-Patent Document 27). The CR is a ratio of the resources to be used by the UE. Specifically, the CR is a ratio of sub-channels that have been used/to be used for transmission in a predetermined number of sub-frames before and after determination of the transmission. Since the SL in the conventional LTE relies only on broadcasts, only the initial transmission (including repeated transmission (repetitions)) is performed without retransmission. Thus, a ratio of sub-channels that have been used/to be used for initial transmission has been calculated as the CR.

However, retransmission is required in the unicast communication. A method for evaluating the CR when retransmission is required is unknown. Thus, a new method for evaluating the CR for enabling the unicast communication is sought. Here, a method for evaluating the CR for the unicast communication is disclosed.

The UE that evaluates the CR is disclosed. Bidirectional communication is performed between the peer UEs in the unicast communication. In the unicast communication, the UE that transmits data, feedback, etc., evaluates the CR. In this manner, the UE can determine how much the data, feedback, etc., should be transmitted with the resources that its own UE has configured or that have been configured. The transmission is controllable such that the amount of communication is limited to the amount preconfigured in association with the CR.

Another method is disclosed. The UE that configures resources evaluates the CR in the unicast communication. This enables selection and reservation of the resources such that the amount of communication is limited to the amount preconfigured in association with the CR, in configuring the resources. The calculation of the CR can avoid congestion between the UEs in configuring the resources.

A method for calculating the CR is disclosed. In the unicast communication, a ratio of sub-channels that have been used/to be used for initial transmission (including repeated transmission) is calculated. Although retransmission is required in the unicast communication, whether the retransmission is performed depends on the communication quality. The retransmission is not always performed. The number of retransmissions in the future (e.g., after determination of the transmission) is uncertain. Exclusion of the retransmission enables reduction of uncertain elements.

Under the transmission control using the CR, the UE controls transmission such that the amount of communication is limited to the amount preconfigured in association with the CR. The influence of retransmission or feedback may be incorporated into the amount of communication preconfigured in association with the CR. For example, the amount of communication preconfigured in association with the CR should be configured, in consideration of the ratio of sub-channels to be used as an average number of retransmissions, the maximum number of retransmissions, an average number of feedbacks, or the maximum number of feedbacks in the future transmission. This enables incorporating the influence of retransmission or feedback.

Another method is disclosed. The ratio of sub-channels that have been used/to be used for initial transmission and retransmission is calculated. Alternatively, the ratio of sub-channels that have been used/to be used for initial transmission and feedback may be calculated. Alternatively, the ratio of sub-channels that have been used/to be used for initial transmission, retransmission, and feedback may be calculated. Sub-channels whose resources have been reserved may be used for the future retransmission or feedback.

Alternatively, a predetermined number of times may be preconfigured as the number of retransmissions or feedbacks in the future. The predetermined number of times may be, for example, the average number of retransmissions, the maximum number of retransmissions, the average number of feedbacks, or the maximum number of feedbacks. Furthermore, the number of retransmissions or feedbacks in the future may be configured, for example, according to the communication quality. For example, the number of retransmissions or feedbacks in the future is configured larger when the communication quality is less than a predetermined value, and the number of retransmissions or feedbacks in the future is configured smaller when the communication quality is greater than the predetermined value.

Since this enables incorporating the influence of retransmission or feedback in calculating the CR, the control can be facilitated. The application of such a method for evaluating the CR in the unicast communication enables the evaluation of the CR even when retransmission is required, and enables the control for avoiding congestion between the UEs.

The packet duplication is supported in NR. Here, a method for duplicating a packet using the unicast communication is disclosed. Each of the peer UEs in the unicast communication configures resources for the unicast communication. For example, the UE that transmits data configures resources, and the UE that receives the data also configures resources. The data is transmitted using these two resource configurations. The UEs transmit the data through the packet duplication, using these two resource configurations.

For example, a case where the UE #1 transmits data to the UE #2 is disclosed. The UE #1 configures resources for data transmission. Furthermore, the UE #1 requests the UE #2 to configure the resources for data transmission. The UE #1 may provide a resource configuring request signaling for data transmission, and give the notification via the signaling. The UE #1 may make this request before configuring the resources for data transmission. The request should include information necessary for configuring resources.

The information necessary for configuring resources includes the QoS, priorities, the data generation timing, the data generation cycle, and a buffer status. Furthermore, the information may include an identifier of the UE that has transmitted the request. Upon receipt of the request for configuring resources, the UE #2 configures the resources using the information. The UE #2 notifies the UE #1 of the resource configuration that has been made.

Consequently, the UE #1 can recognize the resource configurations made by its own UE and the peer UE #2. The UE #1 duplicates a packet in the PDCP. The UE #1 transmits one of the duplicated packets with the resources configured by its own UE, and transmits the other packet with the resources configured by the UE #2. The LCH may be configured for each resource configuration. The UE #1 maps the duplicated packets to different LCHs, transmits one of the LCHs with the resources configured by its own UE, and transmits the other LCH with the resources configured by the UE #2.

This enables the packet duplication of data to be transmitted from the UE #1 to the UE #2, and transmission of the duplicated packets with the resources configured by the UE #1 and the UE #2.

The UE #1 senses and selects the resources, in the resource configuration of the UE #1. Furthermore, the UE #2 senses and selects the resources, in the resource configuration of the UE #2. The resources sensed and selected by the UE #1 are different from those sensed and selected by the UE #2. One of the reasons is that the difference in position between the UE #1 and the UE #2 causes different states of the other surrounding UEs. Since the states of the other surrounding UEs are different, states of the resources being used differ between the UE #1 and the UE #2.

Thus, the resources configured by the UE #1 and the resources configured by the UE #2 differ in the communication quality. The application of these resources that differ in the communication quality to transmission of data of duplicated packets can increase the delivery probability of the duplicated packet data. This can enhance the reliability in the communication.

The First Modification of the Third Embodiment

Since the SL communication in LTE relies only on broadcasts, the communication is not performed between two UEs unlike unicasts. In other words, the communication between two UEs is connectionless communication in LTE. Unicasts have been studied as the SL communication in NR. Establishing a connection between two UEs for SL unicasts and then performing communication have been proposed.

However, the method for establishing a connection is unknown. Thus, processes until the unicast communication are unknown. The first modification discloses a method for solving such a problem.

Examples of communication details in unicast are disclosed. The unicast communication may consist of transmission of data or the RS in one direction, and transmission of a response to the transmission. The transmission of data may be transmission of user plane data. The unicast communication may include, for example, data and feedback on the data, data and the SRS, the CSI-RS and the CSI report on the CSI-RS, and the SRS and the SRI for the SRS. These may be combined.

Another example of the communication details in unicast is disclosed. The unicast communication may include transmission of bidirectional data or the RS, and transmission of a response to the transmission. The transmission of data may be transmission of user plane data. The unicast communication may include, for example, bidirectional data and feedback on the data, bidirectional data and the SRS, the bidirectional CSI-RS and the CSI report on the CSI-RS, and the bidirectional SRS and the SRI for the SRS. These may be combined.

A processing method until the unicast communication between two UEs for the SL unicast is disclosed. The UE provides a signal/channel indicating the intention of transmission. The UE may provide signaling indicating the intention of transmission. The UE may provide a control signal, channel, or signaling. The UE may provide a control-plane signal, channel, or signaling. The UE that needs to perform transmission in the SL transmits a signal/channel indicating the intention of transmission. The UE may transmit the signal/channel in broadcast. The following six specific examples of information to be included in the signal/channel are described.

(1) Information indicating the intention of transmission
(2) Information on a service
(3) Information on a target UE (the peer UE in the bidirectional communication)
(4) Information on a source UE (its own UE)
(5) Information on configuring response resources.
(6) Combinations of (1) to (5) above The information on a service in (2) may be an identifier for identifying the service. The information in (2) may include information on the QoS of the service. The information in (2) may include information on priorities.

The information on the target UE in (3) may be a UE identifier. The information in (3) may be any information for identifying the peer UE in the bidirectional communication. The information in (3) may include information on one or more target UEs. The information in (3) may be information on a group including the target UEs. The information may be, for example, an identifier of the group.

The information on the source UE in (4) may be a UE identifier. The information in (4) may be any information for identifying the UE that transmits the signal/channel. The information in (4) may be information indicating a state of the UE. The information may be, for example, position information of the UE or information on the moving speed. The information in (4) may be group information. The information may be information on a group including the source UE. The information may be, for example, an identifier of the group.

The information on configuring response resources in (5) should be resource configuration information for a response signal/channel to be transmitted from the target UE to the source UE in response to the signal/channel. The information in (5) may include scheduling information such as resource allocation. If the target UE configures the response resources, the information may be omitted.

The signal/channel indicating the intention of transmission may be newly provided. As another method, the PSBCH used in the D2D communication may be used. The aforementioned information may be included as broadcast information of the PSBCH. The UE that needs to perform transmission in the SL transmits the PSBCH including the information to indicate the intention of transmission.

As another method, the PSDCH used in the D2D communication may be used. The aforementioned information may be included in the PSDCH. The UE that needs to perform transmission in the SL transmits the PSDCH including the information to indicate the intention of transmission.

The signal/channel indicating the intention of transmission may be cyclically transmitted. The signal/channel may be cyclically transmitted for a predetermined period or a predetermined number of times. In the absence of receiving the response signal/channel after transmission of the signal/channel indicating the intention of transmission for the predetermined period or the predetermined number of times, the transmission of the signal/channel may be terminated. Alternatively, the signal/channel may be cyclically retransmitted for a predetermined period or a predetermined number of times. In the absence of receiving, a predetermined retransmission number of times or for a retransmission period, the response signal/channel to the signal/channel indicating the intention of transmission, transmission of the signal/channel may be terminated. Upon receipt of the response signal/channel to the signal/channel indicating the intention of transmission, transmission of the signal/channel may be terminated.

Although the absence of receiving the response signal/channel to the signal/channel indicating the intention of transmission is exemplified as a condition for terminating the transmission of the signal/channel, a failure of detecting the peer UE may be the condition for terminating the transmission. This is effective when a plurality of UEs each transmit a signal/channel indicating the existence and the source UE detects the peer UE from among the UEs.

The cycle, the predetermined period or number of times, and the predetermined retransmission number of times or the retransmission period may be statically predetermined, for example, in a standard. Alternatively, the gNB may notify the UE of the cycle, etc. Alternatively, the UE may determine the cycle, etc. The upper layer in the UE may determine the cycle, etc.

The UE provides the signal/channel indicating the existence. The UE may provide signaling indicating the existence. The UE may provide a control signal, channel, or signaling. The UE may provide a control-plane signal, channel, or signaling. The UE receives the signal/channel indicating the intention of transmission from the source UE. When determining the source UE as a peer UE from information included in the signal/channel, the UE transmits the signal/channel indicating the existence of the UE as a response signal/channel to the signal/channel. The UE may transmit the signal/channel indicating the existence of the UE in broadcast. The following five specific examples of information to be included in the signal/channel indicating the existence of the UE are described.

(1) Information indicating the existence
(2) Information on a service
(3) Information on the target UE (its own UE)

(4) Information on the source UE (the peer UE in the bidirectional communication)
(5) Combinations of (1) to (4) above The information indicating the existence in (1) may be information indicating the target UE to which the signal/channel indicating the intention of transmission is transmitted. Explicit notification of the information can enhance the reliability. The target UE in (3) is its own UE. The source UE in (4) is the peer UE in the bidirectional communication, that is, the UE that has transmitted the signal/channel indicating the intention of transmission.

The information on the target UE (its own UE) in (3) may be a UE identifier. The information in (3) may be any information for identifying the UE that transmits the signal/channel. The information in (3) may be information indicating a state of the UE. The information may be, for example, position information of the UE or information on the moving speed. The information in (3) may be group information. The information may be information on a group including its own UE. The information may be, for example, an identifier of the group.

The information on the source UE in (4) may be a UE identifier. The information in (4) may be any information for identifying the peer UE in the bidirectional communication. The information in (4) may be group information. The information may be information on a group including the source UE. The information may be, for example, an identifier of the group.

The UE may newly provide a signal/channel indicating the existence. As another method, the PSCCH or the PSSCH may be used. The PSCCH and the PSSCH may be combined for use. For example, information to be included in the signal/channel indicating the existence of the UE may be included in the PSSCH and transmitted. For example, a part or the entirety of the information to be included in the signal/channel indicating the existence of the UE may be included in the PSSCH and transmitted. The scheduling information of the PSSCH and the rest of the information to be included in the signal/channel indicating the existence of the UE may be included in the PSCCH and notified.

The information on configuring the response resources that is included in the signal/channel indicating the intention of transmission may be used for configuring the resources for transmitting the signal/channel. Alternatively, the target UE may configure the resources for the signal/channel. This is effective when the signal/channel does not include the information on configuring the response resources.

The signaling for a connection request is provided. A signal/channel for the connection request may be provided. The control signal, channel, or signaling may be provided. The control-plane signal, channel, or signaling may be provided. The UE that needs to perform transmission in the SL transmits the connection request signaling for unicasts to the peer UE that performs unicasts. The following six specific examples of information to be included in the connection request are described.

(1) Information indicating the connection request
(2) Information on a service
(3) Information on the target UE (the peer UE in the bidirectional communication)
(4) Information on the source UE (its own UE)
(5) Information on configuring resources for a connection request response
(6) Combinations of (1) to (5) above The information on the target UE in (3) may be a UE identifier. The information in (3) may be any information for identifying the peer UE in the bidirectional communication. The information in (3) should be information on one target UE.

The information on configuring resources for the connection request response in (4) may be resource configuration information for the connection request response signaling transmitted from the target UE to the source UE in response to the connection request. The information in (4) may include scheduling information such as resource allocation. If the target UE configures the resources for the connection request response, the information may be omitted.

A signal/channel for the connection request may be newly provided. As another method, the PSCCH or the PSSCH may be used. The PSCCH and the PSSCH may be combined for use. For example, the information to be included in the connection request may be included in the PSCCH and transmitted.

Alternatively, the information to be included in the connection request may be notified via the RRC signaling or the MAC signaling. For example, a part or the entirety of the information to be included in the connection request may be included in the PSSCH and transmitted. The scheduling information of the PSSCH and the rest of the information to be included in the connection request may be included in the PSCCH and notified.

The method for transmitting the signal/channel indicating the intention of transmission may be applied to a method for transmitting the connection request signaling.

The connection request response signaling is provided. A signal/channel for the connection request response may be provided. The control signal, channel, or signaling may be provided. The control-plane signal, channel, or signaling may be provided. Upon receipt of the connection request signaling from the source UE, the peer UE in unicast transmits the connection request response signaling. The following seven specific examples of information to be included in the connection request response are described.

(1) Information on the connection request response
 (2) Information on a service
 (3) Information on the target UE (its own UE)
 (4) Information on the source UE (the peer UE in the bidirectional communication)
 (5) A scheduling request (SR)
 (6) A buffer status report (BSR)
 (7) Combinations of (1) to (6) above The information on the connection request response in (1) includes a permission response or a rejection response. The information in (1) may include reason information. Alternatively, the information in (1) may be Ack/Nack information. Providing the rejection response or the Nack information enables determination on whether the target UE establishes a connection, according to a load state or capability of the target UE.

The scheduling request in (5) should be notified in the presence of data to be transmitted from the target UE to the source UE or when the data is probably generated.

The capacity of buffered data of the BSR in (6) should be notified in the presence of data to be transmitted from the target UE to the source UE or when the data is probably generated. Alternatively, the amount of data requiring transmission may be notified. The capacity of data buffered by a user plane protocol for SL should be used as the capacity of buffered data. For example, the capacity of data buffered in the PDCP for SL and/or the RLC for SL should be used.

Upon receipt of (5) and/or (6), the source UE can determine whether to configure the resources for transmitting data for the target UE. Furthermore, the source UE can determine the amount of resources to be reserved.

A signal/channel for the connection request response may be newly provided. As another method, the PSCCH or the PSSCH may be used. The PSCCH and the PSSCH may be combined for use. For example, the information to be included in the connection request response may be included in the PSCCH and transmitted.

Alternatively, the information to be included in the connection request response may be notified via the RRC signaling or the MAC signaling. For example, a part or the entirety of the information to be included in the connection request response may be included in the PSSCH and transmitted. The scheduling information of the PSSCH and the rest of the information to be included in the connection request response may be included in the PSCCH and notified.

The information on configuring the resources for the connection request response that is included in the connection request signaling may be used for configuring the resources for the connection request response. Alternatively, the target UE may configure the resources for the connection request response. This is effective when the connection request signaling does not include the information on configuring the resources for the connection request response.

A signal/channel for scheduling data transmission is provided. The UE that needs to perform transmission in the SL transmits the signal/channel for scheduling data transmission. The following five specific examples of information to be included in the signal/channel are described.

(1) Resource scheduling information for transmitting data and/or the feedback
 (2) Information on a service
 (3) Information on the target UE (the peer UE in the bidirectional communication)
 (4) Information on the source UE (its own UE)
 (5) Combinations of (1) to (4) above The resource scheduling information for transmitting data and/or the feedback in (1) may include resource allocation information for transmission from the source UE to the target UE and/or resource allocation information for transmission from the target UE to the source UE. The resource allocation information may include resource allocation information for data transmission and/or resource allocation information for transmitting, for example, the feedback or the report. The data transmission may be not limited to transmission of initial transmission data, but may be repeated transmission or transmission of retransmission data. Appropriate combinations of these pieces of information should be included in the scheduling information for transmitting data and/or the feedback.

A signal/channel for transmitting the scheduling information for data transmission may be newly provided. As another method, the PSCCH may be used. For example, the information to be included in the connection request response may be included in the PSCCH and transmitted.

Alternatively, the information to be included in the connection request response may be notified via the RRC signaling or the MAC signaling. For example, a part or the entirety of the information to be included in the connection request response may be included in the PSSCH and transmitted. The scheduling information of the PSSCH and the rest of the information to be included in the connection request response may be included in the PSCCH and notified.

The method for transmitting the signal/channel indicating the intention of transmission may be applied to a method for transmitting the scheduling information for data transmission.

A signal/channel for the data transmission is provided. The UE that needs to perform transmission in the SL transmits the signal/channel for the data transmission. The signal/channel for data transmission may be transmitted according to the scheduling information for data transmission. The following seven specific examples of information to be included in the signal/channel for data transmission are described.

(1) Data
(2) The RS
(3) The Ack/Nack
(4) The CSI
(5) The SR
(6) The BSR
(7) Combinations of (1) to (6) above The RS in (2) may be an RS for data demodulation. Alternatively, the RS in (2) may be an RS for channel evaluation, for example, the CSI-RS or the SRS. Alternatively, the RS in (2) may be an RS for positioning. The RS may be transmitted separately from the channel including data. The Ack/Nack in (3), the CSI in (4), the SR in (5), and the BSR in (6) may be transmitted alone or in combination with data. For example, the Ack/Nack in (3) may be piggy-backed onto data, and transmitted in a data transmission channel.

The signal/channel for data transmission may be newly provided. As another method, the PSSCH may be used.

FIG. 29 illustrates a first example sequence until the unicast communication between two UEs for the SL unicast. FIG. 29 illustrates a case where the UE_A has transmission data in the SL for the UE_B. Bidirectional communication is performed in unicast between the UE_A and the UE_B. The sequence until the unicast communication may include a peer UE detection phase, a connection establishment phase, and a data transmission phase.

In the example of FIG. 29, the peer UE detection phase includes a sequence from Step ST5103 to Step ST5106. The connection establishment phase includes a sequence of Step ST5107 and Step ST5108. The data transmission phase includes a sequence from Step ST5110 to Step ST5112. The unicast communication is performed in the data transmission phase.

The peer UE detection phase and/or the connection establishment phase may be processes in the control planes. The communication in the peer UE detection phase and/or the connection establishment phase may be performed via the signaling for the control planes. The RRC protocol for SL may be provided. The peer UE detection phase and/or the connection establishment phase may be processes in the RRC protocol for SL. Handling these phases as control processes can facilitate the control processes until the unicast communication between the two UEs.

In Step ST5101, the UE_A needs to transmit data to the UE_B in the SL. In Step ST5102, the UE_A senses, selects, and reserves resources for transmitting the signal/channel indicating the intention of transmission. Here, the UE_A may sense, select, and reserve resources for transmitting the signal/channel indicating the existence.

In Step ST5103, the UE_A transmits the signal/channel indicating the intention of transmission. The UE_A may transmit the signal/channel in broadcast. This enables the UE_A to indicate the presence of transmission data. In Step ST5104, the UE_B receives the signal/channel indicating the intention of transmission from the UE_A, and detects that the UE_A is a target or a candidate for the target, from information included in the signal/channel.

In Step ST5105, the UE_B transmits, to the UE_A, the signal/channel indicating the existence. The signal/channel may indicate transmission to the UE_A by including identifier information of the source UE in the signal/channel. Alternatively, the signal/channel may indicate transmission to the UE_A by configuring the resources for transmitting the signal/channel indicating the existence, using the resource configuration information for the existence response which has been notified in Step ST5103.

A plurality of UEs may be candidates for the target, and each transmit, to the UE_A, the signal/channel indicating the existence.

In Step ST5106, the UE_A detects the peer UE in the bidirectional communication of unicasts. The UE_A may store the UE detected once. The UE_A may store the UE detected once for a predetermined period. For example, when the UE_A cannot detect the peer UE for a predetermined period, the UE_A may terminate transmission of the signal/channel indicating the intention of transmission. The aforementioned methods may be applied. When the UE_A detects the peer UE, the UE_A may terminate transmission of the signal/channel indicating the intention of transmission.

In Step ST5107, the UE_A transmits a connection request to the peer UE_B. Upon receipt of the connection request, the UE_B transmits a connection request response to the UE_A in Step ST5108. In the example of FIG. 29, the UE_B notifies connection permission information as the connection request response. The resources reserved in Step ST5102 may be used as resources for the connection request. The resources reserved for the existence response in Step ST5102 may be used as resources for the connection request response. This enables omission of a process of configuring resources for a process of establishing a connection.

The UE_A may newly sense, select, and reserve resources for the connection request and the connection request response, before transmitting the connection request. This enables configuration of the resources appropriate for the process of establishing a connection.

In Step ST5110, the UE_A transmits, to the UE_B, the signal/channel for scheduling data transmission. The UE_A includes the scheduling information for data transmission in the PSCCH and notifies the information. In Step ST5111, the UE_B detects the PSCCH which includes the scheduling information for data transmission and which is addressed to its own UE. In Step ST5112, the UE_B receives data from the UE_A, according to the scheduling information for data transmission that is included in the detected PSCCH.

In Step ST5112, the UE_B may transmit, to the UE_A, the HARQ feedback on the data received from the UE_A. The UE_B transmits the feedback, according to the scheduling information for feedback that is included in the detected PSCCH.

Besides these, the UE_B may transmit the CSI report to the UE_A in Step ST5112. Furthermore, the UE_B may transmit data to the UE_A. The UE_B transmits the CSI or data according to the resource scheduling information from the UE_B to the UE_A that is included in the detected PSCCH, specifically, according to the resource scheduling information for the CSI report or the resource scheduling information for data transmission. Similarly, the UE_A should transmit the HARQ feedback, the CSI report, or retransmission data to the UE_B.

In Step ST5109, the UE_A may newly sense, select, and reserve the resources for scheduling resources for data transmission in Step ST5110 and the resources for unicast communication in Step ST5112, before transmitting the resource scheduling information for data transmission. This enables configuration of the resources appropriate for the unicast communication.

The resources reserved in Step ST5102 or before the connection request may be used as the resources for scheduling resources for data transmission and the resources for unicast communication. This enables omission of the process of configuring resources.

A scheduling method for data transmission when one UE configures resources is disclosed.

The UE_A notifies the UE_B of resource scheduling information for initial transmission from the UE_A to the UE_B, resource scheduling information for feedback, and resource scheduling information for retransmission, using the PSCCH associated with transmission of the initial transmission data.

The UE_A also notifies the UE_B of resource scheduling information for initial transmission from the UE_B to the UE_A, resource scheduling information for feedback, and resource scheduling information for retransmission. The UE_A may notify these pieces of information using the PSCCH associated with transmission of the initial transmission data from the UE_A to the UE_B.

After the UE_B notifies the UE_A of the SR or the BSR on the resource scheduling information for initial transmission from the UE_B to the UE_A, the resource scheduling information for feedback, and the resource scheduling information for retransmission, the UE_A may configure the resources for the UE_B and/or notify the configuration to the UE_B. The configuration of the resources is unnecessary in the absence of transmission data in the UE_B. This can increase the use efficiency of the resources.

One UE configures the resources for bidirectional transmission and notifies the configuration to the peer UE. This can produce the same advantages as those disclosed in the third embodiment.

A scheduling method for data transmission when each UE that transmits data configures resources is disclosed.

The UE_A notifies the UE_B of the resource scheduling information for initial transmission from the UE_A to the UE_B, the resource scheduling information for feedback, and the resource scheduling information for retransmission, using the PSCCH associated with transmission of the initial transmission data.

Furthermore, the UE_B notifies the UE_A of the resource scheduling information for initial transmission from the UE_B to the UE_A, the resource scheduling information for feedback, and the resource scheduling information for retransmission, using the PSCCH associated with transmission of the initial transmission data.

Each UE that transmits data configures the resources for transmission and notifies the configuration to the peer UE. This can produce the same advantages as those disclosed in the third embodiment.

The disclosed method is to include the resource scheduling information for retransmission in the PSCCH associated with transmission of the initial transmission data and notify the information. As another method, the resource scheduling information for retransmission may be included in the PSCCH associated with transmission of retransmission data and notify the information. This enables notification of the resource configuration after the retransmission is required. For example, when the communication quality is favorable and no retransmission is required, resources need not be reserved for retransmission. This can increase the use efficiency of the resources.

The following seven examples of information to be included in the resource scheduling information are disclosed.

(1) Resource allocation information (2) MCS information (3) Information indicating initial transmission or retransmission (4) Redundancy version (RV) information (5) Information on the target UE (6) Information on a service (7) Combinations of (1) to (6) above One of the information to be included in the signal/channel for scheduling the data transmission and information overlapping with the information may be omitted. Omission of the overlapping information can reduce the amount of information.

The resource allocation information in (1) should include resource time (timing) information, resource frequency information, and resource offset information. The resource time information may be cyclical information.

The resource offset information for feedback may be, for example, a time offset from the data transmission timing. The data transmission timing may be transmission timing for initial transmission data or retransmission data. The unit of time is not limited to the second but may be the slot, the subframe, the mini-slot, or the TTI.

This enables the UE that transmits feedback on data transmission to be notified of a timing offset from the data transmission to the feedback. Providing an offset from the transmission timing of initial transmission data and an offset from the transmission timing of retransmission data can separately configure the feedback timing for the initial transmission and the feedback timing for the retransmission.

The resource offset information for retransmission may be, for example, a time offset from the data transmission timing. The data transmission timing may be transmission timing for the initial transmission data, feedback transmission timing, or transmission timing for the retransmission data. The unit of time is not limited to the second but may be the slot, the subframe, the mini-slot, or the TTI.

For example, the timing with which the scheduling information for retransmission is transmitted may be different from the timing with which the retransmission data is transmitted. In such a case, notification of the resource offset information for retransmission enables reception of the retransmission data. This enables flexible scheduling.

Consequently, transmission of data, feedback on the transmission, and configuration of a series of transmission resources for retransmission, and the notification to the peer UE are possible. This enables the HARQ feedback control and increase in the communication quality in the unicast communication.

Another method for configuring and notifying the resources for feedback is disclosed. The UE_A that is a relevant data transmission source may configure the resource timing information and the resource frequency information for feedback. The UE_A should configure the resources. Alternatively, the UE_A should configure only the resource timing information for feedback, whereas the UE_B that is a feedback transmission source should configure the resource frequency information for feedback. The UE_A should notify the UE_B of the resource timing information for feedback. The UE_B should configure the resources, using the timing information notified from UE_A.

A predetermined resource sensing period may be provided for configuring the resources for feedback. The period should be provided separately from the sensing period for configuring the resources for data. Separately providing these periods can, for example, only sense the resources for feedback when such resources are provided. Thus, the sensing process can be simplified.

The minimum offset may be configured as the resource timing for feedback. The offset information may be, for example, a time offset from the data transmission timing. The unit of time is not limited to the second but may be the slot, the subframe, the mini-slot, or the TTI. The minimum offset may be included in the UE capability information, and notified to the peer UE that performs the unicast communication.

Alternatively, the minimum offset may be notified to the gNB. This enables configuration of the optimal offset from transmission of data, as the feedback transmission timing.

This enables establishment of a connection for the unicast communication between the peer UEs (the UE_A and the UE_B) in the SL. Thus, the unicast communication between the peer UEs is possible.

The resources for the unicast communication may be reserved before the connection establishment phase. The resources for the unicast communication should be selected from the reserved resources and configured. The resources reserved before the connection establishment phase should be used for transmission of data, feedback on the transmission, and configuration of a series of transmission resources for retransmission.

For example, when a plurality of unicast communications are performed through one unicast connection, the resources need not be reserved for each of the unicast communications. This can simplify the process of configuring the resources.

The resources to be reserved before the connection establishment phase are, for example, configured in a frequency range wider than that for the resources to be reserved in the unicast communication. The UE_A may transmit a signal for channel evaluation with the resources reserved before the connection establishment phase. The signal for channel evaluation may be the CSI-RS. Alternatively, the signal may be the DMRS. The UE_B measures the signal for channel evaluation, and reports a channel state to the UE_A. The report on the channel state may be the CSI.

As such, the UE_A can receive, from the UE_B, the CSI in a frequency range wider than that for the resources used for data transmission. Thus, when the communication quality of the resources used for data transmission becomes poor, the UE_A can change the resources for the data transmission. The resources with favorable communication quality can be configured for data communication, which can increase the communication quality.

The same is applied to measurement of the communication quality in the opposite direction. For example, the UE_A configures the resources for sounding signals, for example, the SRS with the resources reserved before the connection establishment phase. The UE_B transmits the SRS with the resources. As such, the UE_A can receive, from the UE_B, the SRS in a frequency range wider than that for the resources used for data transmission. Thus, when the communication quality of the resources used for data transmission from the UE_B becomes poor, the UE_A can change the resources for the data transmission. The resources with favorable communication quality can be configured for data communication, which can increase the communication quality.

The processes until the unicast communication are disclosed above. Next, processes of terminating the unicast communication are disclosed. Conditions for performing the processes of terminating the unicast communication are provided. The following three examples of the conditions for performing the processes of terminating the unicast communication are disclosed.

(1) In the absence of transmission data: For example, when no transmission is performed for a predetermined period or consecutively a predetermined number of times, the absence of transmission data may be determined.

(2) When a service is terminated (3) When the upper layer notifies the end of the unicast communication The processes of terminating the unicast communication are disclosed. The UE provides disconnection signaling and notifies it to the peer UE. Upon receipt of the notification, the UE releases the resources reserved for the unicast communication. The UE may reset the configuration in, for example, the PHY, the MAC, the RLC, the PDCP, and/or the SDAP for SL.

The completion signaling indicating the end of the unicast communication may be provided. The UE that has released the resources reserved for the unicast communication notifies the peer UE of the completion signaling indicating the end of the unicast communication. Upon receipt of the completion signaling indicating the end of the unicast communication, the UE releases the resources reserved for the unicast communication. Similarly, the UE may reset the configuration in, for example, the PHY, the MAC, the RLC, the PDCP, and/or the SDAP for SL.

These can implement the processes of terminating the unicast communication. Thus, the resources reserved for the unicast communication can be released. Since other UEs can use the released resources, the use efficiency of the resources can be increased.

The unicast communication may be terminated while the unicast connection is maintained. For example, when the unicast communication is performed again, the unicast communication may start from the data transmission phase. The method to be disclosed later with reference to FIG. 35 may be used. The unicast connection may be maintained even when the unicast communication is suspended. Examples of the suspension of the unicast communication include the absence of data communication for a long period of time and desynchronization between the UEs.

A link failure in the SL may be provided. The link failure is defined as the absence of a predetermined signal/channel between the UEs for a predetermined period. Even when this link failure occurs in the unicast communication, the unicast connection may be maintained for a predetermined period. The unicast connection may be terminated if the link failure is prolonged even after the predetermined period.

This can avoid the frequent unicast connection processes. Since the number of unicast connection processes can be reduced, the signaling between the UEs can be reduced. This can reduce the resources to be used for the unicast connection, and increase the resources available for other UEs. The use efficiency of the resources can be increased. Since the frequent unicast connection processes can be avoided, the processes in the UE can be simplified.

FIG. 30 illustrates a second example sequence until the unicast communication between two UEs for the SL unicast. In FIG. 30, the same step numbers are applied to the steps common to those in FIG. 29, and the common description thereof is omitted. FIG. 30 illustrates an example of reduced transmission of the signal/channel indicating the existence as compared to that in FIG. 29. The connection request should be transmitted instead of the signal/channel indicating the existence.

In Step ST5103, the UE_A transmits the signal/channel indicating the intention of transmission. The signal/channel should include not the resource configuration for transmitting the signal/channel indicating the existence but the resource configuration for the connection request. In Step ST5104, the UE_B receives the signal/channel indicating the intention of transmission from the UE_A, and detects that the UE_A is a target or a candidate for the target, from information included in the signal/channel.

A signal/channel indicating a connection request from the target UE (the UE_B) to the source UE (the UE_A) is provided. In Step ST5201, the UE_B transmits, to the UE_A, the signal/channel indicating the connection request. The signal/channel indicating the connection request may include information such as the SR or the BSR as well as the information to be included in the signal/channel indicating the existence. In the presence of data to be transmitted from the UE_B to the UE_A, for example, the SR or the BSR should be included in the signal/channel indicating the connection request and transmitted. Furthermore, the signal/channel indicating the connection request may include information indicating the connection request instead of information indicating the existence.

This can reduce the step of transmitting the information indicating the existence. This can also reduce the step of transmitting the connection request from the UE_A to the UE_B. This can reduce the amount of signaling required for establishing a connection. Since the example of FIG. 30 shows the connection request enabling inclusion of, for example, the SR or the BSR, the example is more appropriate when the number of target UEs is one than when the number of target UEs is two or more.

FIG. 31 illustrates a third example sequence until the unicast communication between two UEs for the SL unicast. In FIG. 31, the same step numbers are applied to the steps common to those in FIG. 29, and the common description thereof is omitted. FIG. 31 illustrates an example of reduced transmission of the signal/channel indicating the intention of transmission and the signal/channel indicating the existence as compared to that in FIG. 29. The UE_A that needs to transmit data in the SL in Step ST5101 senses, selects, and reserves the resources for transmitting the connection request and/or the connection request response in Step ST5301, and transmits the connection request signaling in Step ST5107.

As such, the method disclosed in FIG. 31 is a method without the peer UE detection phase. The peer UE is detected in the connection establishment phase. The method is more appropriate when the number of target UEs is one than when the number of target UEs is two or more.

The UE may store the UE with which the unicast connection has been established once. The UE may store the UE with which the unicast connection has been established once, for a predetermined period. The UE may preferentially perform the connection process on the UE with which the unicast connection has been established once. In such a case, the peer UE detection phase may be omitted. The UE_A may request a connection, and perform the peer UE detection phase if the UE_A cannot receive the connection response. Since the UE with which the unicast connection has been established once is probably close by, the process of establishing a connection is probably performed without the peer UE detection phase. Thus, the probability that the peer UE detection phase can be omitted is high, and the signaling between the UEs can be reduced. Since other UEs may be able to use the resources for the peer UE detection phase, the use efficiency of the resources can be increased.

FIG. 32 illustrates a fourth example sequence until the unicast communication between two UEs for the SL unicast. In FIG. 32, the same step numbers are applied to the steps common to those in FIGS. 29 and 31, and the common description thereof is omitted. In the example of FIG. 32, the UE to be a target UE first transmits the signal/channel indicating the existence. The UE that needs to transmit data in the SL receives the signal/channel indicating the existence that has been transmitted from another UE, and detects the target UE.

In Step ST5401, the UE_B senses, selects, and reserves resources for transmitting the signal/channel indicating the existence. In Step ST5402, the UE_B transmits the signal/channel indicating the existence. The UE_B should transmit the signal/channel in broadcast. The method for transmitting the signal/channel indicating the intention of transmission should be applied to a method for transmitting the signal/channel indicating the existence. The connection request should be used as a terminating condition, instead of the signal/channel indicating the existence.

The UE_A that needs to transmit data in the SL in Step ST5101 receives the signal/channel indicating the existence that has been transmitted from another UE (Step ST5402), and detects the target UE (Step ST5106). The UE_A senses, selects, and reserves the resources for transmitting the connection request and/or the connection request response in Step ST5301, and transmits the connection request signaling in Step ST5107.

Consequently, the UE that needs to transmit data in the SL need not transmit the signal/channel indicating the intention of transmission. Thus, the latency from the time when transmission of data in the SL is required to the connection establishment phase can be reduced.

The UE that cannot communicate in the SL need not transmit the signal/channel indicating the existence. The UE that cannot perform the unicast communication or establish the unicast connection need not transmit the signal/channel indicating the existence. The UE that cannot communicate in the SL is, for example, a UE with no capability in the SL communication. For example, when the communication in the UE exceeds the allowable communication processing load, the UE cannot communicate in the SL. This can limit the number of UEs each transmitting the signal/channel indicating the existence. The signal/channel or signaling between the UEs can be reduced. This can reduce the resource usage for the signal/channel or signaling between the UEs.

FIG. 33 illustrates a fifth example sequence until the unicast communication between two UEs for the SL unicast. In FIG. 33, the same step numbers are applied to the steps common to those in FIGS. 29 and 30, and the common description thereof is omitted. In the example of FIG. 33, the UE to be a target UE first transmits the connection request signaling. The UE that needs to transmit data in the SL receives the connection request signaling transmitted from another UE, and detects the target UE. FIG. 33 illustrates an example of reduced transmission of the signal/channel indicating the existence as compared to that in FIG. 32. The connection request should be transmitted instead of the signal/channel indicating the existence.

In Step ST5501, the UE_B senses, selects, and reserves resources for transmitting the connection request signaling. In Step ST5201, the UE_B transmits the signal/channel indicating the connection request. The UE_B may transmit the signal/channel in broadcast. Information to be included in the signal/channel indicating the connection request may include information such as the SR or the BSR as well as the information to be included in the signal/channel indicating the existence. In the presence of data to be transmitted from the UE_B to the UE_A, for example, the SR or the BSR should be included in the signal/channel indicating the connection request and transmitted. Furthermore, the signal/channel indicating the connection request may include information indicating the connection request instead of information indicating the existence.

The method for transmitting the signal/channel indicating the intention of transmission should be applied to the method for transmitting the connection request signaling. The resource schedule for data transmission should be used as a terminating condition, instead of the signal/channel indicating the existence.

The UE_A that needs to transmit data in the SL in Step ST5101 receives the connection request signaling that has been transmitted from another UE (Step ST5201), and detects the target UE. The UE_A senses, selects, and reserves the resources for scheduling resources for data transmission and/or unicast communication in Step ST5109, and transmits the schedule for data transmission in Step ST5110.

Consequently, the UE that needs to transmit data in the SL need not transmit the signal/channel indicating the intention of transmission. Furthermore, the UE need not transmit the signal/channel indicating the existence before the connection request. Thus, the latency from the time when transmission of data in the SL is required to the data transmission phase can be reduced.

FIG. 34 illustrates a sixth example sequence until the unicast communication between two UEs for the SL unicast. In FIG. 34, the same step numbers are applied to the steps common to those in FIGS. 29 and 32, and the common description thereof is omitted. In the example of FIG. 34, the UE to be a target UE first transmits the signal/channel indicating the existence. The UE that needs to transmit data in the SL receives the signal/channel indicating the existence which has been transmitted from another UE, and detects the target UE.

The example of FIG. 34 omits the connection establishment phase as compared to the example of FIG. 32. The UE that needs to transmit data in the SL transmits the schedule for data transmission after detecting the target UE. The UE that needs to transmit data in the SL performs processes of the data transmission phase after detecting the target UE.

In Step ST5401, the UE_B senses, selects, and reserves resources for transmitting the signal/channel indicating the existence. In Step ST5402, the UE_B transmits the signal/channel indicating the existence. The UE_B should transmit the signal/channel in broadcast. The method for transmitting the signal/channel indicating the intention of transmission should be applied to the method for transmitting the signal/channel indicating the existence. The scheduling for data transmission should be used as a terminating condition, instead of the signal/channel indicating the existence.

The UE_A that needs to transmit data in the SL in Step ST5101 receives the signal/channel indicating the existence which has been transmitted from another UE (Step ST5402), and detects the target UE (Step ST5106). The UE_A senses, selects, and reserves the resources for transmitting the schedule for data transmission and for unicast communication in Step ST5109, and transmits the schedule for data transmission in Step ST5110.

This can omit the connection establishment phase. Thus, the latency from the time when transmission of data in the SL is required to the data transmission phase can be reduced.

FIG. 35 illustrates a seventh example sequence until the unicast communication between two UEs for the SL unicast. In FIG. 35, the same step numbers are applied to the steps common to those in FIG. 29, and the common description thereof is omitted. The UE that needs to transmit data in the SL transmits the schedule for data transmission in the example of FIG. 35. FIG. 35 illustrates an example omitting the processes from the signal/channel indicating the intention of transmission to the connection request response as compared to FIG. 29. FIG. 35 illustrates the example omitting the peer UE detection phase and the connection establishment phase. The peer UE is detected in the data transmission phase. The method is more appropriate when the number of target UEs is one than when the number of target UEs is two or more.

The UE_A that needs to transmit data in the SL in Step ST5101 senses, selects, and reserves the resources for transmitting the schedule for data transmission and for unicast communication in Step ST5109, and transmits the schedule for data transmission in Step ST5701. The UE_A may transmit the schedule for data transmission in broadcast. In Step ST5111, the UE_B detects the PSCCH which includes the scheduling information for data transmission and which is addressed to its own UE. In Step ST5112, the UE_B receives data from the UE_A, according to the scheduling information for data transmission that is included in the detected PSCCH.

In Step ST5112, the UE_B may transmit, to the UE_A, the HARQ feedback on the data received from the UE_A, the CSI report, and/or data.

This can omit the peer UE detection phase and the connection establishment phase. Thus, the latency from the time when transmission of data in the SL is required to the data transmission phase can be reduced.

The UE may store the UE with which the unicast communication has been performed once. The UE may store the UE with which the unicast communication has been performed once, for a predetermined period. The UE may preferentially perform the connection process on the UE with which the unicast communication has been performed once. In such a case, the peer UE detection phase and the connection establishment phase may be omitted. The UE_A may transmit the resource schedule for data transmission, and perform the peer UE detection phase or the connection establishment phase if the UE_A cannot receive the feedback. Since the UE with which the unicast communication has been performed once is probably close by, the process of establishing a connection is probably performed without the peer UE detection phase and/or the connection establishment phase. Thus, the probability that the peer UE detection phase or the connection establishment phase can be omitted is high, and the signaling between the UEs can be reduced. Since other UEs may be able to use the resources for the peer UE detection phase or the connection establishment phase, the use efficiency of the resources can be increased.

In the data transmission phase, data for initial transmission or retransmission may be transmitted through the broadcast communication, whereas feedback, reporting, etc., may be performed through the unicast communication. When the target UE cannot be detected in transmitting data, transmission of the data for initial transmission or retransmission through the broadcast communication enables the target UE to detect the transmitted data. Since the target UE can identify to which UE the feedback, the report, etc., should be transmitted, by receiving the transmitted data (including the resource schedule for data transmission), the target UE should perform the feedback, reporting, etc., through the unicast communication.

The methods disclosed in the first modification of the third embodiment enable the unicast communication between the peer UEs (the UE_A and the UE_B) in the SL.

When the UE performs a plurality of unicast communications, for example, when transmission and reception timings in the plurality of unicast communications are the same, half-duplex communication is established. Thus, transmission and reception are not possible except for one of the unicast communications. Here, a method for solving such a problem is disclosed.

The UE only establishes a connection for one unicast communication. Connections for two or more unicast communications may be inhibited. The connection for the unicast communication may be referred to as a unicast connection.

The UE that has already established one unicast connection does not establish other unicast connections. Furthermore, the UE that has already established one unicast connection need not transmit the signal/channel indicating the existence. Furthermore, the UE that has already established one unicast connection may reply with a rejection to the second unicast connection request. Furthermore, the UE that has already established one unicast connection need not search for the resource schedule for data transmission.

This disables the UE to perform two or more unicast communications, and can avoid a state where the UE cannot perform transmission and reception.

Another method is disclosed. The unicast connection with a high priority is prioritized.

The UE that has already established one unicast connection establishes another unicast connection with a higher priority. Here, the UE terminates the original unicast connection. The UE that has already established one unicast connection may transmit the signal/channel indicating the existence to the other unicast connection with a higher priority. Here, the UE terminates the original unicast connection.

Furthermore, the UE that has already established one unicast connection may notify acknowledgement to the second unicast connection request when the priority of the second unicast connection is higher. Here, the UE terminates the original unicast connection. When the priority is lower, the UE may reply with a rejection. Furthermore, the UE that has already established one unicast connection may search for the resource schedule for data transmission for another unicast connection with a higher priority. Here, the UE terminates the original unicast connection.

This disables the UE to perform two or more unicast communications, and enables the UE to establish a connection for the unicast communication with a higher priority. A service with a higher priority can be preferentially communicated.

The connection for unicast communication may be read as unicast communication. For example, the UE may perform only one unicast communication. Two or more unicast communications may be inhibited. This can similarly avoid a state where the UE cannot perform transmission and reception due to an overlap in the resources which is caused by a plurality of unicast communications. This is effective, for example, when the connection establishment phase for the unicast communication is omitted.

Although the UE makes various determinations in the previous description, the gNB may make the various determinations and control the UE. This is effective when the gNB schedules the resources.

Another method is disclosed. A plurality of unicast connections are established. The plurality of unicast connections are established between identical UEs. The plurality of unicast connections are not inhibited between the identical UEs. For example, the UE_A and the UE_B may establish the plurality of unicast connections. For example, a plurality of processes from the connection establishment phase should be performed in parallel, in the processes until the unicast communication disclosed in FIG. 29.

The UE_A and/or the UE_B recognize that the plurality of unicast connections will be established. The UE_A and/or the UE_B can recognize the resources to be used in each of the unicast communications. The UE_A and/or the UE_B should adjust the resources to be used in each of the unicast communications to avoid an overlap in transmission and reception with the same timing. This enables a plurality of unicast communications while avoiding a state where the UEs cannot perform transmission and reception due to the overlap in the resources.

Another method is disclosed. A plurality of unicast connections are established. The UE may establish unicast connections with different UEs. For example, the UE_A and the UE_B may establish a unicast connection, and the UE_C and the UE_B may establish a unicast connection. Since this creates a state where the UEs cannot perform transmission and reception due to an overlap in the resources, a method for solving such a problem is disclosed.

The signaling requesting reconfiguration of resources is provided.

When one UE establishes a plurality of unicast connections, each of the peer UEs that perform the unicast communications with the one UE senses the resources. The peer UE may configure the resources. In the aforementioned example, the UE_B establishes the plurality of unicast connections. In this example, the UE_A and the UE_C sense the resources.

When the sensing of the resources causes an overlap in the resource timing with which the UE_B performs transmission and reception, a request for reconfiguring the resources is issued to the UE that has configured the resources. In this example, the UE_B notifies the UE_A or the UE_C of the request for reconfiguring the resources. The request for reconfiguring the resources may be a request for reconfiguring the resource timing.

Upon receipt of the request for reconfiguring the resources, the UE reconfigures the resources. Upon receipt of the request for reconfiguring the resources from the UE_B, the UE_A reconfigures the resources, for example, by changing the resource timing. The UE_A should notify the UE_B of the resource reconfiguration. The signaling for requesting the resource reconfiguration may include the resource timing requested for change. The UE_A can avoid the resource timing when reconfiguring the resources.

The UE that overlaps in the resource timing, that is, the UE_B in this example may reconfigure the resources by changing the resource timing in the unicast communication for which the resource configuration is to be changed. The UE_B notifies the peer UE in the unicast communication of the resource configuration in which the timing has been changed. For example, if the UE_B configures the resources by changing the resource timing of the unicast communication with the UE_A, the UE_B notifies the UE_A of the resource configuration. The UE_A performs the unicast communication with the UE_B, based on the resource configuration.

An example of determining which one of the UE_A and the UE_C the UE_B requests to reconfigure the resources is disclosed. For example, the UE_B requests the UE notified later of the resource configuration to reconfigure the resources. Alternatively, the UE_B may request the UE notified later of the connection request to reconfigure the resources. Alternatively, the UE_B may request the UE that has performed the process of establishing a connection later to reconfigure the resources. Alternatively, the UE_B may request the UE notified later of the resource schedule for unicast communication to reconfigure the resources. Alternatively, the UE_B may request the peer UE lower in priority in the unicast connection to reconfigure the resources. Alternatively, the UE_B may request the peer UE whose required low latency characteristics are greater in the unicast connection to reconfigure the resources. Alternatively, the UE_B may request the peer UE whose required reliability is lower in the unicast connection to reconfigure the resources.

This enables avoidance of the state where the UE cannot perform transmission and reception due to the overlap in the resources, and enables a plurality of unicast communications.

Another method is disclosed. The UE detects the presence or absence of the PSCCH for the peer UE in the process of sensing the resources. For example, when the SCI of the PSCCH includes an identifier of the target UE, the UE detects whether the SCI includes the UE identifier identical to that of the peer UE. When the SCI includes the UE identifier identical to that of the peer UE, the UE excludes the resources with the resource timing in the PSCCH from resource candidates to be selected. When the SCI does not include the UE identifier identical to that of the peer UE, the UE should perform normal processes of sensing, selecting, and reserving the resources.

This enables avoidance of the state where the UE cannot perform transmission and reception due to the overlap in the resources, and enables a plurality of unicast communications.

When one UE establishes a plurality of unicast connections, the one UE senses the resources. The UE may configure the resources. In the aforementioned example, the UE_B establishes the plurality of unicast connections. In this example, the UE_B sense the resources.

Information indicating a plurality of connections is provided. The UE_B notifies the UE_A or the UE_C of the information indicating a plurality of connections. For example, the UE_B may notify the UE for which the unicast connection process is performed later of the information indicating a plurality of connections. For example, when the UE for which the unicast connection process is performed later is the UE_C, the UE_B notifies the UE_C of the information indicating a plurality of connections.

For example, the UE_B may include the information indicating a plurality of connections in the signal indicating the existence or the connection request response, and notify the information. For example, when the UE_B notifies the UE_C of the signal indicating the existence or the connection request response, the UE_B may include the information indicating a plurality of connections in the signal indicating the existence or the connection request response, and notify the information. This can prevent increase in the amount of signaling.

Upon receipt of the information indicating a plurality of connections, the UE requests the UE that establishes a plurality of unicast connections to configure the resources. For example, upon receipt of the information indicating a plurality of connections, the UE_C notifies the UE_B of a request for configuring the resources. For example, upon receipt of the signal indicating the existence or the connection request response which includes the information indicating a plurality of connections, the UE_C notifies the UE_B of the signaling for requesting the resource configuration.

This enables avoidance of the state where the UE cannot perform transmission and reception due to the overlap in the resources, and enables a plurality of unicast communications.

The maximum number of unicast connections that can be established by the UE may be provided. The maximum number of unicast connections may be predetermined, for example, in a standard, notified from the gNB to the UE, or preconfigured in the UE. When the gNB notifies the UE of the maximum number of unicast connections, the gNB may include the maximum number of unicast connections in the broadcast information to notify the maximum number of unicast connections, or notify the maximum number of unicast connections via the RRC dedicated signaling.

The maximum number of unicast connections that can be established by the UE may be dedicatedly configured for each UE. When the maximum number of unicast connections that can be established by the UE is dedicatedly configured for each UE, the maximum number of unicast connections may be notified between the UEs using the SL communication. The UE may notify the gNB of the maximum number of unicast connections. The maximum number of unicast connections that can be established by the UE may be included in the capability information. The UE may include the maximum number of unicast connections that can be established by the UE in the capability information and notify other UEs or the gNB of the maximum number of unicast connections.

This enables configuration of the maximum number of unicast connections that can be established by the UE. The unicast connection process exceeding the capability of the UE need not be performed. A plurality of unicast communications can be stably performed.

In the previous description, one unicast connection is established for one unicast communication. Furthermore, one unicast communication is performed through one unicast connection. One unicast connection may be established for a plurality of unicast communications. One unicast communication may be performed through one unicast connection. A plurality of unicast communication processes should be performed while one unicast connection is maintained. Since the process of establishing a unicast connection need not be performed for each unicast communication, the processes until the unicast communication can be simplified. The latency until the unicast communication can be reduced. This is effective, for example, in the V2V communication requiring the low latency characteristics.

One unicast communication may be performed as the communication through one service. The communication through one service is performed for one unicast communication. One unicast communication for each service may be performed as the communication through a plurality of services. Not the unicast communication for each service but the unicast communication for each application may be performed. One unicast communication may be performed as the communication through one application. This enables configuration of the resources for each service. This also enables the unicast communication appropriate for each required service.

One unicast communication may be performed as the communication through a plurality of services. Since the processes until the unicast communication need not be performed for each service, the processes until the unicast communication can be simplified. The latency until the unicast communication can be reduced. This is effective, for example, in the V2V communication requiring the low latency characteristics.

An example of performing one unicast communication as the communication through a plurality of services is disclosed.

The unicast communication is performed for each QoS required for the service. The unicast communication corresponding to a predetermined QoS is provided. Each service is performed in the unicast communication corresponding to the QoS of the service. If services have the same QoS, the same unicast communication is performed. Not the unicast communication for each QoS but the unicast communication for each QoS group consisting of a plurality of QoSs may be performed. The unicast communication is performed for each QoS, so that the unicast communication appropriate for the QoS can be configured. For example, the resources appropriate for the QoS can be configured.

The unicast communication is performed for each priority required for the service. The priority may be, for example, the PPPP. The unicast communication corresponding to a predetermined priority is provided. Each service is performed in the unicast communication corresponding to the priority. If services have the same priority, the same unicast communication is performed. Not the unicast communication for each priority but the unicast communication for each priority group consisting of a plurality of priorities may be performed. The unicast communication may be performed in descending order of the priorities in the priority group. The unicast communication is performed for each priority, so that the unicast communication appropriate for the priority can be configured. For example, the resources appropriate for the priority can be configured.

Another example is disclosed. The unicast communication may be performed for each of required low latency characteristics. The unicast communication may be performed for each service group. The unicast communication may be performed for each PDU session. The unicast communication may be performed for each network slicing. The unicast communication may be performed for each network slice selection assistance information (NSSAI) that is identification information to be used for network slicing. Similarly, the unicast communication appropriate for each of these can be configured.

An identifier indicating through which service the communication is performed should be provided. The identifier may be a service identifier or a service group identifier. The identifier may be used when the communication within the same unicast communication is performed through a plurality of services. This can identify which service in the same unicast communication.

The following seven examples of the identifier are disclosed.

(1) An identifier indicating through which service the communication is performed (2) An identifier indicating the communication of which QoS (3) An identifier indicating the communication with which priority (4) An identifier indicating the communication with which latency characteristics (5) An identifier indicating the communication of which PDU session (6) An identifier indicating the communication of which network slicing (7) An identifier indicating the communication with which NSSAI: The NSSAI may be used.

Each of (1) to (7) may be an identifier indicating a group. Consequently, one unicast communication enables communication for a plurality of services, etc.

The identifier may be included in the connection request signaling or the resource scheduling information for data transmission. The identifier may be included in the control signal/channel or control signaling in the processes until the unicast communication, and notified. For example, the identifier may be included in the RRC signaling for connection request, and notified. For example, the identifier may be included in the resource scheduling information for data transmission. The identifier may be included in the SCI, and transmitted in the PSCCH. Furthermore, the identifier may be included in the resource scheduling information for feedback. The identifier may be included in the SCI, and transmitted in the PSCCH.

Furthermore, the identifier may be multiplexed into data and/or the feedback. The multiplexing method may be the FDM, the TDM, or the CDM.

Although the unicast communication is disclosed, it may be replaced with a unicast connection. With application of the aforementioned methods to unicast connections, one unicast connection enables communication of a plurality of services. Since the processes of establishing a unicast connection need not be performed for each service, the processes until the unicast communication can be simplified. The latency until the unicast communication can be reduced. This is effective, for example, in the V2V communication requiring the low latency characteristics.

A plurality of resource configurations may be made through one unicast connection. For example, one resource is configured in one unicast communication. A plurality of unicast communications are performed through one unicast connection. This enables a plurality of resource configurations through one unicast connection. The resource configurations may include the SPS and the configured grant. Making the plurality of resource configurations enables, for example, configuring of resources appropriate for each service. This enables the unicast connection appropriate for each service.

A plurality of resource configurations may be made in one unicast communication. The resource configurations may include the SPS and the configured grant. Making the plurality of resource configurations in one unicast communication enables, for example, configuring of resources appropriate for each service. This enables the unicast communication appropriate for each service.

A plurality of SRs and/or BSRs may be provided through one unicast connection. For example, one SR and/or one BSR are provided in one unicast communication. A plurality of unicast communications are performed through one unicast connection. This enables configuring of a plurality of SRs and/or BSRs through one unicast connection. Configuring the plurality of SRs and/or BSRs enables, for example, configuring of the SR and/or BSR appropriate for each service. This enables the unicast connection appropriate for each service.

A plurality of SRs and/or BSRs may be provided in one unicast communication. Configuring the plurality of SRs and/or BSRs in one unicast communication enables, for example, configuring of the SR and/or BSR appropriate for each service. This enables the unicast communication appropriate for each service.

The Fourth Embodiment

Unicasts have been studied as the SL communication in NR. Support of the HARQ feedback (Ack/Nack) in the unicast communication in the SL has also been studied. However, a method for transmitting the HARQ feedback is unknown. Thus, upon receipt of data from another UE in the SL, the UE has a problem of failing to transmit the HARQ feedback to the other UE that has transmitted the data.

The fourth embodiment discloses a method for solving such a problem.

The HARQ feedback includes the Ack to be transmitted when the UE successfully receives the transmitted data, and the Nack to be transmitted when the UE fails to receive the transmitted data. Both of the Ack and the Nack are supported as the HARQ feedback in the unicast communication in the SL. Since the UE that has transmitted the data can explicitly receive the Ack or the Nack, the reliability in the communication can be enhanced.

As another method, only the Ack may be supported. The UE that has transmitted data retransmits the data when the UE does not receive the Ack. Upon receipt of the Ack, the UE terminates the retransmission. Since the Nack is unnecessary, the signaling load between the UEs can be reduced. Since the UE need not transmit the Nack, the power consumption can be reduced.

As another method, only the Nack may be supported. The UE that has transmitted data retransmits the data when the UE receives the Nack. When the UE does not receive the Nack, the UE terminates the retransmission. This can reduce the signaling load between the UEs. Since the UE need not transmit the Ack, the power consumption can be reduced.

A predetermined period for receiving the Ack or the Nack should be provided. After a lapse of the predetermined period, the absence of reception of the Ack or the Nack should be determined. Furthermore, the timing to receive the Ack or the Nack may be predetermined. The predetermined period or the reception timing may be statically predetermined, for example, in a standard, or notified from the UE that transmits data to the target UE. The predetermined period or the reception timing may be included in the PSCCH as control information, and notified. This can avoid the UE that has transmitted the data from continuing to wait for the Ack or the Nack.

The Ack or the Nack may be determined at Transmission Time Intervals (TTIs) and notified, as the HARQ feedback method. Alternatively, the Ack or the Nack may be determined for each Code Block Group (CBG) and notified. The retransmission may be performed for each code block. Furthermore, the repeated transmission (repetitions) in the SL communication has been studied in NR. The Ack or the Nack may be determined for each CBG after reception of the repeated transmission, and notified. Application of the feedback method for each CBG can reduce the resources for retransmission. The use efficiency of the resources can be increased. This is effective particularly in the SL communication where collision in the resources easily occurs between the UEs.

The repeated transmission (repetitions) in the SL communication has been studied in NR. A method for transmitting the HARQ feedback when the repeated communication is performed is unknown. Here, the method for transmitting the HARQ feedback when the repeated communication is performed is disclosed.

The HARQ feedback is transmitted per repeated transmission. Each time the UE that transmits data performs the transmission, the receiving UE transmits feedback on the data transmission. This enables earlier transmission of the feedback, and increase in the data throughput when the radio propagation environment is favorable.

As another method, the HARQ feedback is transmitted for all the repeated transmissions. After the UE that transmits data performs all the repeated transmissions, the receiving UE transmits feedback on all the data transmissions. This can reduce the resources to be used for transmitting the feedback. The amount of resources necessary to be reserved in the SL can be reduced. This can increase the use efficiency of the resources.

Although the HARQ feedback is transmitted per repeated transmission in the previous description, the HARQ feedback may be transmitted per n repeated transmissions (n is a positive integer). After every n times of transmission from the UE that transmits data, the receiving UE transmits feedback on the data transmissions. The value n may be predetermined, for example, in a standard, or notified from the transmitting UE to the receiving UE. The value n may be included in the PSCCH for the initial transmission data as control information, and notified. This enables the appropriate and optimal feedback control according to the radio propagation environment or the resource usage.

When the HARQ feedback is transmitted per repeated transmission, how to configure the resources for the HARQ feedback for each repeated transmission is unknown. A method for solving such a problem is disclosed. The timing from the repeated transmission to the HARQ feedback should be consistent in the HARQ feedback for each repeated transmission. This enables the transmitting UE to recognize for which repeated transmission the feedback is.

Furthermore, the frequency resources of the HARQ feedback for each repeated transmission may be consistent. For example, the RB with the same number is used. Alternatively, for example, a subcarrier range with the same number may be used. This can easily reserve the resources on the frequency axis.

As another method, the resources for the HARQ feedback for each repeated transmission may be changed. The transmitting UE may reserve different resources for the HARQ feedback for each repeated transmission, and notify the resources to the receiving UE. This can suppress the effect of, for example, fading.

A method for mapping the HARQ feedback to transmission data is disclosed. The HARQ feedback may be mapped to the last symbol in a slot. A short PUCCH is adopted in the UL in the Uu. The mapping identical to that for the short PUCCH may be used.

As another method, the HARQ feedback may be mapped to the first symbol in a slot. Alternatively, the HARQ feedback may be mapped to a predetermined number of symbols from the beginning. This can reduce a period until transmission of feedback on the transmission data.

As another method, the HARQ feedback may be included in the SCI and transmitted. Not the UE that transmits data but the UE that has received the data transmits the SCI including the HARQ feedback. Thus, how to transmit the SCI including the HARQ feedback is a problem.

The SCI to which no data is attached may be provided. A PSCCH to which the PSSCH is not attached may be provided, and the SCI may be mapped to the PSCCH. The SCI does not include the scheduling information of the PSSCH. The SCI to which no data is attached includes the HARQ feedback. This enables transmission of the PSCCH to which the SCI including the HARQ feedback is mapped, with less amount of information.

Although the SCI to which no data is attached is disclosed, the SCI may include CSI report information. Alternatively, the SCI may include the SR. Alternatively, the SCI may include the BSR. Consequently, the PSSCH is unnecessary for transmitting these pieces of information, and the PSCCH can be transmitted using the SCI with less amount of information. This can increase the use efficiency of the resources.

As another method, the HARQ feedback may be mapped to a plurality of symbols in predetermined positions. A long PUCCH is adopted in the UL in the Uu. The mapping identical to that for the long PUCCH may be used. Alternatively, the HARQ feedback may be mapped to all symbols in 1 slot. Alternatively, the HARQ feedback may be mapped to symbols in 1 slot except a symbol to which the RS is mapped. Since this enables transmission of many symbols, the communication quality of feedback can be increased.

The timing and/or frequency resources from transmission of each data to the HARQ feedback may be statically determined, for example, in a standard. Since the signaling is unnecessary, the signaling load can be reduced, and the control is facilitated.

As another method, the timing and/or frequency resources for the HARQ feedback on transmission of each data may be changed. The transmitting UE may notify the receiving UE of information on the timing and/or frequency resources. The transmitting UE may notify the information on the timing and/or frequency resources in advance via the RRC signaling. Alternatively, the transmitting UE may include the information on the timing and/or frequency resources in the PSCCH of each transmission data as control information, and notify the information. For example, the HARQ feedback is transmitted after K slots from transmission of data. The K slots may be included in the PSCCH. The timing may be counted not only per slot but also per symbol or per non-slot. This enables the appropriate and optimal feedback control according to the radio propagation environment or the resource usage.

A measurement method in sensing resources for the HARQ feedback is disclosed. For example, the RSRP or the RSSI for sensing may be measured in the PSCCH. Alternatively, the measurement may be performed in combination with the PSCCH and the PSSCH. Alternatively, the measurement may be performed per symbol. For example, the measurement of, for example, the RSRP or the RSSI per symbol enables reservation of resources per symbol, and mapping of the resources per symbol which is previously disclosed.

A HARQ feedback method when the CA is supported in the SL is disclosed. The HARQ feedback on data transmitted over each component carrier is transmitted over the component carrier used for transmitting the data. Since this enables reservation of the resources over the same carrier, the processes of sensing, selecting, and reserving the resources can be simplified.

As another method, the HARQ feedback is transmitted over one of the component carriers that are active in the SL. Alternatively, active component carriers are divided into a plurality of groups, and the HARQ feedback is transmitted over one of the component carriers in the groups. Consequently, the resources need not be reserved for each carrier. This can increase the use efficiency of the resources.

Support of groupcast in the SL communication has been studied in NR. One UE transmits data to a plurality of UEs. The plurality of UEs are organized into a group. However, none discloses a HARQ feedback method in groupcast. Here, the HARQ feedback method in groupcast is disclosed. A plurality of UEs transmit the HARQ feedback in groupcast.

Which resources the plurality of UEs use for the HARQ feedback is a problem. The resources of the plurality of UEs for the HARQ feedback may be preconfigured. The third embodiment may be applied to the method for configuring the resources. This enables the UE that has transmitted data to recognize the HARQ feedbacks from the plurality of UEs.

Another method is disclosed. Different cyclic shifts are used for the HARQ feedbacks of the plurality of UEs. A different cyclic shift is used for each UE. The UE that transmits data may notify the plurality of UEs of which cyclic shift should be used, dedicatedly via the control signal/channel or the control signaling in advance. Information on which cyclic shift should be used may be included in the SCI, and notified in the PSCCH.

Another method is disclosed. The HARQ feedbacks of the plurality of UEs are code-multiplexed. The HARQ feedbacks of the plurality of UEs are, for example, scrambled with a scrambling code that is different for each of the UEs. The UE that transmits data may notify the plurality of UEs of which scrambling code should be used, dedicatedly via the control signal/channel or the control signaling in advance. Information on which scrambling code should be used may be included in the SCI, and notified in the PSCCH. The scrambling code may be an identifier of the UE that transmits feedback.

This enables the UE that has transmitted data in groupcast to sort the HARQ feedbacks from the plurality of UEs and receive the HARQ feedbacks. If at least one of the UEs in the group that has transmitted the HARQ feedbacks does not return the Ack, the UE that has received the HARQ feedbacks from the plurality of UEs performs retransmission. The UE performs the retransmission in groupcast again. The UE that has received the Nack receives the retransmission. The UE that has transmitted the Ack need not receive the retransmission. Alternatively, the UE that has transmitted the Ack may receive the retransmission when whether the Ack has been delivered is uncertain. The plurality of UEs transmit the feedbacks according to reception results of the retransmissions. This can increase the communication quality in the groupcast communication.

As another method, upon receipt of the HARQ feedbacks from the plurality of UEs, the UE may perform retransmission in unicast to the UE that does not return the Ack. Specifically, the groupcast communication may be performed only in the initial transmission, and the unicast communication may be performed from the retransmission. This can increase, for a plurality of UEs, the communication quality per UE.

Performing the HARQ feedback (Ack/Nack) in the method disclosed in the fourth embodiment enables the HARQ feedback in the unicast communication in the SL. This can increase the communication quality in the unicast communication in the SL. The communication with a desired QoS is possible in the SL.

The Fifth Embodiment

The semi-persistent transmission is supported for the SL communication in LTE (see Non-Patent Document 25 (RP-161788)). In the semi-persistent transmission, the resources for data transmission are cyclically reserved so that the data can be transmitted with the resources (14.2.1 of Non-Patent Document 27). In NR, transmission using the configured grant for the SL communication has been studied.

In LTE, the SL communication relies only on broadcasts. Thus, the retransmission control using the HARQ feedback is not performed in LTE. In NR, support of not only broadcasts but also unicasts and groupcasts has been studied as the SL communication (see Non-Patent Document 22 (3GPP RP-182111)). Thus, transmission of the HARQ feedback has been studied in NR. Consequently, the retransmission control using the HARQ feedback is possible in the SL communication in NR.

However, a retransmission control method in the SL communication in NR is unknown. Moreover, a method for reserving resources under the retransmission control, in the transmission method through reserving resources is also unknown. Thus, the retransmission control cannot be performed, and the communication quality under the retransmission control cannot be increased.

The fifth embodiment discloses a method for solving such a problem.

The resources to be used for initial transmission and/or retransmission in the SL are reserved. The UE may reserve the resources to be used for initial transmission and/or retransmission in the SL. The resources to be reserved may be cyclical. The method for reserving resources for the semi-persistent transmission or the configured grant transmission may be applied. The UE that needs to transmit data in the SL may reserve the resources.

Alternatively, the gNB may reserve the resources in the SL, and notify the reserved resources to the UE that performs transmission in the SL. The gNB may notify the UE of the reserved resources as the scheduling information of the resources in the SL. The PDCCH in the Uu may be used for the notification.

For example, the UE reserves one set of cyclical resources for initial transmission and/or retransmission in the SL. The UE performs the initial transmission or the retransmission with the cyclical resources. Upon receipt of the Nack as the HARQ feedback after transmission of the initial transmission data, the UE transmits the retransmission data with the next cyclical resources. Although what is disclosed is performing retransmission upon receipt of the Nack as the HARQ feedback, the retransmission may be performed in the absence of receiving the Ack as the HARQ feedback.

FIG. 36 is a conceptual diagram illustrating an example method for reserving the resources for initial transmission and/or retransmission in the SL. One set of cyclical resources for initial transmission and/or retransmission in the SL is reserved. In FIG. 36, the upper tier illustrates the resources for transmitting data, and the lower tier illustrates HARQ feedback signals for the data. The Resource Reservation Interval (RRI) is a reservation cycle for the resources. The resources are reserved on the RRI cycle.

Although a resource to be reserved in the time axis direction is illustrated as 1 slot in FIG. 36, a plurality of slots may be reserved. Although the unit in the time axis direction is slot, the unit is not limited to the slot. The unit in the time axis direction may be, for example, non-slot (mini-slot) or symbol. Although FIG. 36 does not illustrate details on the resources to be reserved in the frequency axis direction, the unit in the frequency axis direction may be RB or RE. The contiguous or non-contiguous resources may be reserved.

The UE that needs to transmit data in the SL (the source UE) reserves one set of cyclical resources on the cycle of the RRI as illustrated in FIG. 36. The UE transmits the initial transmission data with a reserved resource 7101. When the peer UE (the target UE) cannot receive the initial transmission data, the peer UE transmits the Nack as a HARQ feedback signal with a resource 7102. Upon receipt of the Nack, the source UE transmits the retransmission data with a reserved resource 7103.

When the source UE performs the retransmission with a reserved resource 7105 and the target UE successfully receives the retransmission data, the target UE transmits the Ack as a HARQ feedback signal with a resource 7106. Upon receipt of the Ack, the source UE transmits the initial transmission data next generated with a reserved resource 7107. The retransmission control is performed by repeating such a method.

After the reserved resources are used a predetermined number of times, resources to be reserved may be reselected. Since the predetermined number of times until reselection of resources involves not only the initial transmission but also the retransmission, the predetermined number of times may be a value larger than 75 at the maximum. A plurality of the predetermined number of times until reselection of resources may be configured according to the value of the RRI or the maximum number of retransmissions.

The target UE may request the source UE to reselect the resources. A signal or channel for requesting reselection of the resources may be newly provided. Alternatively, the resource reselection request may be included in the PSCCH and transmitted. Alternatively, the resource reselection request may be included in the PSSCH and transmitted. The resource reselection request may be multiplexed into data in the PSSCH and transmitted.

As another method, the resource reselection request may be included in the HARQ feedback (Ack/Nack) and transmitted. The resource reselection request may be included in a channel in which the HARQ feedback (Ack/Nack) is transmitted, and transmitted. The resource reselection request may be multiplexed into the Ack or the Nack in the channel, and transmitted.

As another method, if the Ack cannot be received as the HARQ feedback consecutively a predetermined number of times, the resources may be reselected. The predetermined number of times may be statically predetermined, for example, in a standard, or notified from the gNB to the UE. The predetermined number of times may be broadcast as the broadcast information, or dedicatedly notified via the RRC signaling. Alternatively, the UE may select the predetermined number of times.

The maximum number of retransmissions may be provided. When the number of retransmissions exceeds the maximum number of retransmissions, the retransmissions may be terminated. The maximum number of retransmissions may be statically predetermined, for example, in a standard, or notified from the gNB to the UE. The maximum number of retransmissions may be broadcast as the broadcast information, or dedicatedly notified via the RRC signaling. When the number of retransmissions exceeds the maximum number of retransmissions, the resources may be reselected.

For example, when data cannot be delivered due to the worsening radio propagation environment for the reserved resources or the interference with another UE, the resources to be reserved can be changed through reselection of the resources. This can increase the communication quality in the SL.

For example, the cycle appropriate for the QoS of a service may be configured. For example, shortening the cycle in a service requiring high reliability and the low latency characteristics can produce the high reliability performance with increase in the communication quality through the HARQ, and the low latency characteristics through retransmission on the short cycle.

Another method is disclosed. A plurality of sets of resources to be used for initial transmission and/or retransmission in the SL are reserved. The UE may reserve the plurality of sets of resources to be used for initial transmission and/or retransmission in the SL. The plurality of sets of resources to be reserved may be cyclical. The method for reserving resources for the semi-persistent transmission or the configured grant transmission may be applied. The UE that needs to transmit data in the SL may reserve the resources.

Alternatively, the gNB may reserve the resources in the SL, and notify the reserved resources to the UE that performs transmission in the SL. The gNB may notify the UE of the reserved resources as the scheduling information of the resources in the SL. The PDCCH in the Uu may be used for the notification.

For example, the UE reserves one set of cyclical resources per set of initial transmission and/or retransmission for the initial transmission in the SL to consequently reserve a plurality of sets of the resources. The UE performs the initial transmission or the retransmission for the initial transmission with the one set of the cyclical resources. Upon receipt of the Nack as the HARQ feedback after transmission of the initial transmission data, the UE transmits the retransmission data with the next cyclical resource in the same set. Although what is disclosed is performing retransmission upon receipt of the Nack as the HARQ feedback, the retransmission may be performed in the absence of receiving the Ack as the HARQ feedback. Upon receipt of the Ack as the HARQ feedback, the UE terminates the retransmission. Furthermore, the UE may perform new initial transmission with the next cyclical resource in the same set.

A plurality of sets of the cyclical resources are configured. The UE performs initial transmission and/or retransmission for the initial transmission in the SL for each set of the cyclical resources. The number of the sets to be configured may be associated with the number of HARQ processes. The plurality of sets of the cyclical resources may be time-division multiplexed, frequency-division multiplexed, or time-frequency division multiplexed. This enables a plurality of initial transmissions and retransmissions corresponding to the initial transmissions.

The maximum value of the number of sets of the cyclical resources to be reserved may be provided. The maximum value may be statically predetermined, for example, in a standard, or notified from the gNB to the UE. The maximum value may be broadcast as the broadcast information, or dedicatedly notified via the RRC signaling. The number of sets of the cyclical resources to be actually reserved should be configured lower than or equal to the maximum value. The UE or the gNB may determine the number of sets of the cyclical resources to be actually reserved. Alternatively, the number of sets of the cyclical resources to be actually reserved may be preconfigured in the UE.

The cycle of the cyclical resources to be reserved may differ for each set. This may be applied to a plurality of services. Specifically, a different cycle should be configured for each service. For example, configuring a cycle appropriate for the QoS for each service can satisfy the QoS requirements for the service.

Resources may be selected for each set of resources. The resources may be configured for each set of the resources. For example, each time a set of resources is added, resources may be selected. Since this enables the resources to be reserved as necessary, the use efficiency of the resources can be increased.

Resources may be selected per set of all resources or per group consisting of a plurality of sets of resources. The resources may be configured per set of all resources or per group consisting of the plurality of sets of resources. For example, with the timing to select resources for the first set of resources, the number of sets of necessary resources is determined, and the resources are selected for the sets of resources. Consequently, there is no need to perform many processes for selecting the resources, which can simplify the control.

The number of times (or the time) until reselection of resources may be configured for each set of resources. This can configure the number of times (or the time) until reselection of resources for each set of resources. The number of times until reselection of resources may be configured, for example, on the cycle of resources to be reserved and for each set of the resources. The aforementioned methods may be applied to the number of times until reselection of resources. Consequently, the number of times until reselection of resources which is appropriate for each set of resources can be configured.

The number of times (or the time) until reselection of resources may be configured consistently for all sets of resources. Such configuration may be applied, for example, when the resources for all sets of the resources are selected with the same timing. Consequently, the timing to select the resources can be consistent in all sets of the resources. Thus, there is no need to perform many processes for selecting the resources, which can simplify the control.

FIG. 37 is a conceptual diagram illustrating an example method for reserving a plurality of sets of cyclical resources for initial transmission and/or retransmission in the SL.

FIG. 37 illustrates a case where two sets of the cyclical resources are time-division multiplexed. The cycles of the sets of the reserved resources are RRI-1 and RRI-2.

The UE that needs to transmit data in the SL (the source UE) reserves the cyclical resources on the cycle RRI-1 as the first set. The UE transmits the initial transmission data with a reserved resource 7201. When the UE further needs to transmit data before arrival of the next resource timing of the first set, the UE reserves the cyclical resources on the cycle RRI-2 as the second set. The UE transmits the generated initial transmission data with a reserved resource 7204. The reservation of a plurality of sets of cyclical resources enables earlier start of the next initial transmission.

Since the transmission method using the reserved sets of cyclical resources is identical to that disclosed in FIG. 36, the description is omitted.

Another method is disclosed. The resources to be used for initial transmission and the resources to be used for retransmission in the SL are dedicatedly reserved. The UE may dedicatedly reserve the resources to be used for initial transmission and the resources to be used for retransmission in the SL. One set of resources to be used for initial transmission, and one set of resources to be used for retransmission for the initial transmission are reserved. A plurality of combinations of such two sets may be reserved.

Each set of the resources to be reserved for initial transmission and retransmission may be cyclical. The method for reserving resources for the semi-persistent transmission or the configured grant transmission may be applied. The UE that needs to transmit data in the SL may reserve the resources.

Alternatively, the gNB may reserve the resources in the SL, and notify the reserved resources to the UE that performs transmission in the SL. The gNB may notify the UE of the reserved resources as the scheduling information of the resources in the SL. The PDCCH in the Uu may be used for the notification.

For example, the UE reserves one set of cyclical resources for initial transmission in the SL, and one set of cyclical resources for retransmission for the initial transmission. The UE performs the initial transmission with the one set of cyclical resources for initial transmission, and performs the retransmission with the one set of cyclical resources for retransmission.

The cycle of the cyclical resources for initial transmission may be different from that for retransmission. For example, when the timing to generate the initial transmission data is different from that of the retransmission data, varying these cycles to generate these data can render the cycles appropriate for the timing to generate each data.

Upon receipt of the Nack as the HARQ feedback after transmission of the initial transmission data with the cyclical resources for initial transmission, the UE transmits the retransmission data with the cyclical resources for retransmission. Upon receipt of the Ack as the HARQ feedback, the UE terminates the retransmission. After terminating the retransmission, the UE may perform new initial transmission with the cyclical resources for initial transmission.

For example, when the timing of initial transmission is longer in cycle than the timing of retransmission, the cycle of the resources for the initial transmission is reserved according to the timing of the initial transmission, and the resources for the retransmission are reserved according to the retransmission timing. This enables the retransmission on a shorter cycle.

The number of times (or the time) until reselection of resources may be configured for the resources for initial transmission. Once the number of times until reselection of resources has been exceeded, sets of resources for initial transmission and retransmission are reselected. Consequently, the processes of reselecting the resources can be simplified.

The number of times (or the time) until reselection of resources may be configured for each of the set of resources for initial transmission and the set of resources for retransmission. Different numbers of times may be configured as the number of times until reselection of resources, for the set of resources for initial transmission and the set of resources for retransmission. Once the number of times until reselection of the resources for initial transmission has been exceeded, a set of resources for initial transmission is reselected. Once the number of times until reselection of the resources for retransmission has been exceeded, a set of resources for retransmission is reselected. Consequently, the number of times until reselection of resources which is dedicatedly appropriate for each of the initial transmission and the retransmission can be configured.

The number of times (or the time) until reselection of resources may be configured for each of the set of resources for initial transmission and the set of resources for retransmission. Different numbers of times may be configured as the number of times until reselection of resources, for the set of resources for initial transmission and the set of resources for retransmission. Once the number of times until reselection of the resources for initial transmission has been exceeded, both sets of resources for initial transmission and retransmission are reselected. Once the number of times until reselection of the resources for retransmission has been exceeded, only a set of resources for retransmission is reselected. Consequently, the reservation of the resources for unnecessary retransmission can be reduced. The use efficiency of the resources can be increased.

FIG. 38 is a conceptual diagram illustrating an example method for dedicatedly reserving the resources to be used for initial transmission and the resources to be used for retransmission in the SL.

FIG. 38 illustrates a case where one set of cyclical resources for initial transmission and one set of cyclical resources for retransmission are reserved. Methods for multiplexing the cyclical resources for initial transmission and the cyclical resources for retransmission include time-division multiplexing, frequency-division multiplexing, and time-frequency division multiplexing. FIG. 38 illustrates application of the frequency-division multiplexing. The cycle of the cyclical resources for initial transmission is the RRI for initial transmission (RRI for initial TX), and the cycle of the cyclical resources for retransmission is the RRI for retransmission (RRI for re-TX).

The UE that needs to transmit data in the SL (the source UE) reserves one set of the cyclical resources for initial transmission (on the cycle RRI for initial TX), and one set of the cyclical resources for retransmission (on the cycle RRI for re-TX). The source UE transmits the initial transmission data with a resource 7301 reserved for initial transmission. When the peer UE (the target UE) cannot receive the initial transmission data, the peer UE transmits the Nack as a HARQ feedback signal with a resource 7302. Upon receipt of the Nack, the source UE transmits the retransmission data with a resource 7303 reserved for retransmission.

When the source UE performs the retransmission with a resource 7305 reserved for retransmission and the target UE successfully receives the retransmission data, the target UE transmits the Ack as a HARQ feedback signal with a resource 7306. Upon receipt of the Ack, the source UE transmits the initial transmission data next generated with a resource 7308 reserved for initial transmission. The retransmission control is performed by repeating such a method.

Application of such a method can configure the cycle of the retransmission shorter even when the timing of the initial transmission is longer in cycle, as compared to the method for performing the initial transmission and the retransmission as one set. Thus, the time until the retransmission can be reduced. This enables the low latency transmission.

Another method is disclosed. A resource group to be used for initial transmission and retransmission in the SL is reserved. The UE may reserve the resource group to be used for the initial transmission and the retransmission in the SL. One set of the resource groups to be used for the initial transmission and the retransmission may be reserved. The UE may reserve one set of the resource groups to be used for the initial transmission and the retransmission in the SL.

A plurality of these sets may be reserved. This enables simultaneous transmission of a plurality of the groups for the initial transmission and the retransmission. One of the groups may correspond to one HARQ process. This enables simultaneous transmission of a plurality of HARQ processes.

The resources for retransmission in a resource group to be reserved may be cyclical. The corresponding resources in each set of the resource groups to be reserved may be cyclical. The method for reserving resources for the semi-persistent transmission or the configured grant transmission may be applied. The UE that needs to transmit data in the SL may reserve the resources.

Alternatively, the gNB may reserve the resources in the SL, and notify the reserved resources to the UE that performs transmission in the SL. The gNB may notify the UE of the reserved resources as the scheduling information of the resources in the SL. The PDCCH in the Uu may be used for the notification.

For example, the UE reserves a resource group consisting of the resources for initial transmission and the cyclical resources for retransmission in the SL. Furthermore, the UE reserves one set of cyclical resource groups. The UE performs the initial transmission with the resources for initial transmission in the resource groups, and performs retransmission with the cyclical resources for retransmission in the resource groups.

The cycle of the resources for retransmission in the resource groups may be different from that of the resources for initial transmission in the resource groups. For example, when the timing to generate the initial transmission data is different from that of the retransmission data, varying these cycles to generate these data can render the cycles appropriate for the timing to generate each data.

Upon receipt of the Nack as the HARQ feedback after transmission of the initial transmission data with the resources for initial transmission in the resource groups, the UE transmits the retransmission data with the cyclical resources for retransmission in the resource groups. Upon receipt of the Ack as the HARQ feedback, the UE terminates the retransmission. The UE may perform new initial transmission with the resources for initial transmission in the cyclical resource groups.

For example, when the timing of the initial transmission is longer in cycle than the timing of the retransmission, a resource group is cyclically reserved according to the timing of the initial transmission, and the resources for retransmission in the resource group are cyclically reserved according to the retransmission timing. This enables retransmission on a shorter cycle.

Furthermore, the number of resources to be reserved for retransmission in a resource group may be limited. The number of resources to be reserved for retransmission is limited to, for example, a value identical to the maximum number of retransmissions. This can suppress reservation of unnecessary resources. The use efficiency of the resources can be increased.

The disclosed method when one set of cyclical resources for initial transmission and one set of cyclical resources for retransmission are reserved may be applied to the number of times (or the time) until reselection of resources. This can produce the same advantages as previously described.

Figure 39:
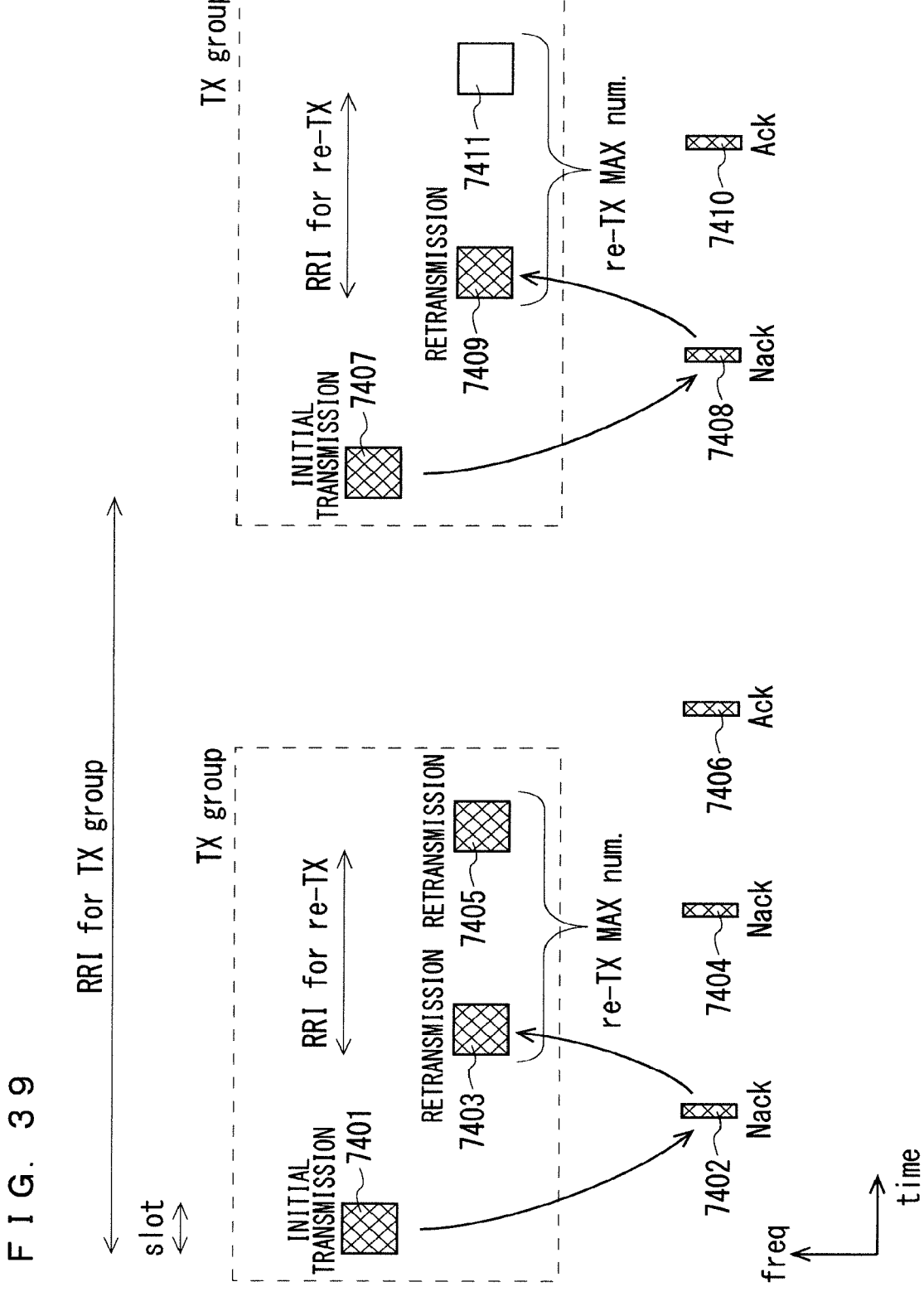
FIG. 39 is a conceptual diagram illustrating an example method for reserving resource groups to be used for initial transmission and retransmission in the SL according to the fifth embodiment.

FIG. 39 is a conceptual diagram illustrating an example method for reserving resource groups to be used for initial transmission and retransmission in the SL.

FIG. 39 illustrates a case where one resource for initial transmission and cyclical resources for retransmission are reserved as a resource group and one set of the resource groups is cyclically reserved. Methods for multiplexing the resource for initial transmission and the cyclical resources for retransmission in the resource group include time-division multiplexing, frequency-division multiplexing, and time-frequency division multiplexing. Furthermore, multiplexing methods between the resource groups include time-division multiplexing, frequency-division multiplexing, and time-frequency division multiplexing. In FIG. 39, the cycle of the cyclical resources for retransmission in the resource group is the RRI for retransmission (RRI for re-TX), and the cycle of the cyclical resources in the resource groups is the RRI for transmission group (RRI for TX group).

The UE that needs to transmit data in the SL (the source UE) reserves the resource for initial transmission and the cyclical resources for retransmission (on the cycle RRI for re-TX) in the resource group. Furthermore, the source UE cyclically reserves one set of the resource groups (on the cycle RRI for TX group). The source UE transmits the initial transmission data with a resource 7401 for initial transmission in the reserved resource group. When the peer UE (the target UE) cannot receive the initial transmission data, the peer UE transmits the Nack as a HARQ feedback signal with a resource 7402. Upon receipt of the Nack, the source UE transmits the retransmission data with a resource 7403 reserved for retransmission.

When the source UE performs the retransmission with a resource 7405 reserved for retransmission and the target UE successfully receives the retransmission data, the target UE transmits the Ack as a HARQ feedback signal with a resource 7406. Upon receipt of the Ack, the source UE terminates the retransmission. The source UE may transmit the initial transmission data next generated with a resource 7407 reserved for initial transmission in a resource group. The retransmission control is performed by repeating such a method.

Application of such a method can configure the cycle of the retransmission shorter even when the timing of the initial transmission is longer in cycle. Thus, the time until the retransmission can be reduced. This enables the low latency transmission. Furthermore, limiting the number of resources to be reserved for retransmission in the resource group can increase the use efficiency of the resources. Furthermore, a plurality of sets of resource groups may be reserved. Since this enables simultaneous transmission of a plurality of the groups for the initial transmission and the retransmission, the low latency and high-speed communication is possible.

Another method is disclosed. The resources to be used for retransmission in the SL are reserved in the retransmission. The UE may reserve, in the retransmission, the resources to be used for the retransmission in the SL. The resources to be reserved for retransmission may be cyclical. The method for reserving resources for the semi-persistent transmission or the configured grant transmission may be applied. The UE that needs to perform retransmission in the SL may reserve the resources.

Alternatively, the gNB may reserve, in the retransmission in the SL, the resources for retransmission, and notify the reserved resources to the UE that performs transmission in the SL. The gNB may notify the UE of the reserved resources as the scheduling information of the resources for retransmission in the SL. The PDCCH in the Uu may be used for the notification. Thus, collision in the resources with other UEs in the SL can be suppressed by the scheduling of the gNB.

The UE may notify the gNB that the resources for retransmission are necessary. The notification may be a request for the resources for retransmission. The request for the resources for retransmission may be used in a method for the gNB to reserve the resources for retransmission. The UE that needs retransmission notifies the gNB of the request for the resources for retransmission. Upon receipt of the request for the resources for retransmission from the UE, the gNB reserves the resources for retransmission in the SL. The gNB notifies the UE of the scheduling information of the reserved resources for retransmission. This enables the gNB to reserve the resources for retransmission for the UE when retransmission is required.

The UE may transmit the request for the resources for retransmission to the gNB, using the SR to be transmitted from the UE to the gNB via the Uu. Alternatively, the UE may use the BSR. Alternatively, the UE may include, in the PUCCH, the request for the resources for retransmission and notify the request. The gNB should configure, for the UE, the resources for the SR, the BSR, or the PUCCH.

The resources to be used for the initial transmission in the SL may be dedicatedly reserved. The UE may dedicatedly reserve the resources to be used for the initial transmission in the SL. The UE reserves one set of resources to be used for the initial transmission. The resources reserved in the retransmission may be used as the resources to be used for the retransmission for the initial transmission.

The resources to be reserved for retransmission may be cyclical. The resources to be used for the initial transmission may be cyclical. The number of cyclical resources to be reserved for retransmission may be limited. The number of cyclical resources to be reserved for the retransmission may be limited to, for example, the value identical to the maximum number of retransmissions. The use efficiency of the resources can be increased.

For example, the UE reserves the cyclical resources for initial transmission in the SL. Furthermore, the UE reserves, in the retransmission, the cyclical resources for retransmission. The UE performs the initial transmission with the cyclical resources for initial transmission, and performs the retransmission with the cyclical resources for retransmission that have been reserved in the previous retransmission.

The cycle of the cyclical resources for initial transmission may be different from that for retransmission. For example, when the timing to generate the initial transmission data is different from that of the retransmission data, varying these cycles to generate these data can render the cycles appropriate for the timing to generate each data.

Upon receipt of the Nack as the HARQ feedback after transmission of the initial transmission data with the resources for initial transmission, the UE reserves the cyclical resources for retransmission. The UE transmits the retransmission data with the reserved cyclical resources for retransmission. Upon receipt of the Ack as the HARQ feedback, the UE terminates the retransmission. The UE may perform new initial transmission with the cyclical resources for initial transmission.

For example, when the timing of the initial transmission is longer in cycle than the timing of the retransmission, the UE reserves the cyclical resources for initial transmission according to the timing of the initial transmission, and reserves the cyclical resources for retransmission according to the retransmission timing. This enables retransmission on a shorter cycle.

The disclosed method when one set of cyclical resources for initial transmission and one set of cyclical resources for retransmission are reserved may be applied to the number of times (or the time) until reselection of resources. This can produce the same advantages as previously described.

FIG. 40 is a conceptual diagram illustrating an example method for reserving, in retransmission, the resources to be used for the retransmission in the SL. FIG. 40 illustrates a case where one set of cyclical resources for initial transmission is reserved and one set of cyclical resources for the retransmission is reserved in the retransmission. Methods for multiplexing the resources for initial transmission and the resources for retransmission include time-division multiplexing, frequency-division multiplexing, and time-frequency division multiplexing. The cycle of the cyclical resources for initial transmission is the RRI, and the cycle of the cyclical resources for retransmission is the RRI for retransmission (RRI for re-TX).

The UE that needs to transmit data in the SL (the source UE) reserves one set of cyclical resources on the cycle of the RRI for initial transmission. The source UE transmits the initial transmission data with a reserved resource 7501 for initial transmission. When the peer UE (the target UE) cannot receive the initial transmission data, the peer UE transmits the Nack as a HARQ feedback signal with a resource 7502. Upon receipt of the Nack, the source UE reserves the cyclical resources (on the cycle RRI for re-TX) for retransmission. The source UE performs the retransmission with a reserved cyclical resource 7503 for retransmission.

When the source UE performs the retransmission with a resource 7505 reserved for retransmission and the target UE successfully receives the retransmission data, the target UE transmits the Ack as a HARQ feedback signal with a resource 7506. Upon receipt of the Ack, the source UE terminates the retransmission. The source UE may transmit the initial transmission data next generated with a resource 7508 reserved for the initial transmission. The retransmission control is performed by repeating such a method.

Since the resources for retransmission are reserved in the retransmission, the resources should be sensed, selected, and reserved in advance. The source UE may sense, select, and reserve the resources in parallel with the initial transmission or the retransmission. Since the half-duplex communication disables simultaneous transmission and reception, the source UE may suspend sensing or selecting the resources during the initial transmission or the retransmission.

In the example of FIG. 40, the source UE senses the resources during periods represented by numerals 7521, 7523, and 7525 in parallel with the initial transmission. Furthermore, when the source UE receives the Nack from the target UE and needs to perform retransmission, the source UE selects and reserves the resources during periods represented by numerals 7522 and 7524. The source UE performs the retransmission with the reserved resources. Each time the retransmission is required, the source UE may select and reserve the resources for retransmission. In the example of FIG. 40, the source UE cyclically reserves the resources for retransmission (on the cycle RRI for re-TX). This enables the use of the cyclical resources even when the retransmission is required again. This can reduce the number of times the resources are selected and reserved. The process of reserving the resources for retransmission can be simplified.

Since the resources for retransmission has only to be reserved after retransmission is required in such a method, the resources for retransmission need not be reserved in advance. For example, when the target UE successfully receives the initial transmission data, the resources for retransmission, which are previously reserved in advance, never become useless. This can increase the use efficiency of the resources.

Another method is disclosed. The resources to be used for retransmission in the SL are reserved in the retransmission. The UE may reserve, in the retransmission, the resources to be used for the retransmission in the SL. The resources to be reserved for retransmission may be cyclical. The method for reserving resources for the semi-persistent transmission or the configured grant transmission may be applied. The UE that needs to perform retransmission in the SL may reserve the resources.

What is disclosed is that the gNB reserves the resources for initial transmission or retransmission and notifies the UE of the reserved resources. The HARQ retransmission may be supported only when the gNB reserves the resources for retransmission and notifies the UE of the reserved resources. Consequently, the UE need not reserve the resources for retransmission. Thus, the amount of resources to be reserved can be reduced. Thereby, collision in the resources to be used by other UEs can be reduced. The unicast communication in the SL can be performed with high quality and high reliability.

The fifth embodiment discloses an example where the resources for initial transmission, retransmission, and feedback are contiguous in the frequency direction. Not limited to this, the resources for initial transmission, retransmission, and feedback may be discrete in the frequency direction. The fifth embodiment discloses an example where each of the resources for initial transmission, retransmission, and feedback consists of one slot in the time direction. Not limited to this, each of the resources for initial transmission, retransmission, and feedback may consist of a plurality of contiguous slots in the time direction.

The methods disclosed in the fifth embodiment clarify a method for configuring the resources for retransmission in the absence of receiving the Ack as the HARQ feedback in the SL. Thus, the HARQ feedback control is possible, and the unicast communication in the SL can be performed with high quality and high reliability.

When the UE reserves the resources, the resources remain reserved until reselection of resources. The UE senses and selects the resources in configuring the resources. Here, the resources reserved by other UEs sometimes cannot be used. Thus, reserving unnecessary resources reduces the use efficiency of the resources. Here, a method for solving such a problem is disclosed.

The UE having no new transmission data does not transmit the SCI including resource scheduling information for initial transmission. The UE need not transmit the PSCCH with the resources for initial transmission that are reserved next. The peer UE can check the absence of the PSCCH or the SCI with the resources for initial transmission that are reserved next, and recognize the absence of transmission data. Since other UEs cannot receive the PSCCH or the SCI through sensing the resources, they recognize that the reserved resources for initial transmission are not used.

The UEs that have recognized that the reserved resources for initial transmission are not used can select the resources as candidates for resources to be reserved in sensing the resources. Since other UEs can use the resources, the use efficiency of the resources can be increased.

Another method is disclosed. Information indicating the absence of new transmission is provided. The UE having no new transmission data includes information indicating the absence of new transmission in the SCI for resource scheduling information for initial transmission, and notifies the information. The UE may notify the absence of new transmission in the PSCCH for the resources for initial transmission that are reserved next. The peer UE can check whether the PSCCH or the SCI for the resources for initial transmission that are reserved next includes the information indicating the absence of new transmission, and recognize the absence of transmission data when the PSCCH or the SCI includes the information. Other UEs check whether the PSCCH or the SCI includes the information indicating the absence of new transmission in sensing the resources, and recognize that the reserved resources for initial transmission are not used when the PSCCH or the SCI includes the information.

The UEs that have recognized that the reserved resources for initial transmission are not used can select the resources as candidates for resources to be reserved in sensing the resources. Since other UEs can use the resources, the use efficiency of the resources can be increased. Provision of the information indicating the absence of new transmission enables the UEs to explicitly recognize the absence of transmission data or that the reserved resources for initial transmission are not used. The explicit notification can reduce malfunctions.

A method for the UE to determine the absence of new transmission data is disclosed. When the UE does not transmit data continuously for a predetermined period (a predetermined number of times), the UE determines the absence of transmission data. When a transmission data buffer has no data for the predetermined period, the UE may determine the absence of transmission data. When the upper layer notifies the UE of information indicating the absence of transmission data, the UE may determine the absence of transmission data. When the upper layer notifies the UE of information indicating the end of a service, the UE may determine the absence of transmission data. Consequently, the UE can determine the absence of new transmission data.

Retransmission of the HARQ in the unicast communication, which is not conventionally performed, has been studied in 3GPP. The retransmission of the HARQ is disclosed. In the retransmission of the HARQ, the retransmission data is not transmitted after the UE receives the Ack. Thus, resources reserved for retransmission are not used after the UE receives the Ack.

The UE sometimes excludes the resources reserved for retransmission when configuring the resources. Thus, other UEs sometimes cannot use the resources reserved for retransmission. Thus, reserving unnecessary resources for retransmission reduces the use efficiency of the resources. Here, a method for solving such a problem is disclosed.

Upon receipt of the Ack as the HARQ feedback, the UE does not transmit the SCI including the resource scheduling information for retransmission. The UE need not transmit the PSCCH with the resources reserved next. The peer UE can check the absence of the PSCCH or the SCI with the resources reserved next, and recognize the absence of transmission data. Since other UEs cannot receive the PSCCH or the SCI through sensing the resources, they recognize that the reserved resources for retransmission are not used.

The UEs that have recognized that the reserved resources for retransmission are not used can select the resources as candidates for resources to be reserved in sensing the resources. Since other UEs can use the resources, the use efficiency of the resources can be increased.

Another method is disclosed. Information indicating the absence of retransmission is provided. Upon receipt of the Ack as the HARQ feedback, the UE includes the information indicating the absence of retransmission in the SCI for the resource scheduling information for retransmission, and notify the information. The UE may notify the absence of retransmission in the PSCCH with the resources reserved next. The peer UE can check whether the PSCCH or the SCI for the resources reserved next includes the information indicating the absence of retransmission, and recognize the absence of retransmission data when the PSCCH or the SCI includes the information. Other UEs check whether the PSCCH or the SCI includes the information indicating the absence of retransmission in sensing the resources, and recognize that the reserved resources for retransmission are not used when the PSCCH or the SCI includes the information.

The UEs that have recognized that the reserved resources for retransmission are not used can select the resources as candidates for resources to be reserved in sensing the resources. Since other UEs can use the resources, the use efficiency of the resources can be increased. Provision of the information indicating the absence of retransmission enables the UEs to explicitly recognize the absence of retransmission data or that the reserved resources for retransmission are not used. The explicit notification can reduce malfunctions.

Even when the HARQ feedback is supported, the use efficiency of the resources can be increased.

The resources for HARQ feedback are disclosed. The disclosed method on the resources for retransmission should be applied. Whether the resources for retransmission are used determines whether the resources for feedback are used. For example, when the resources for retransmission are used, it is determined that the resources for feedback are also used. When the resources for retransmission are not used, it is determined that the resources for feedback are also not used.

Consequently, other UEs can select the resources for feedback that are not used as candidates for resources to be reserved. This can further increase the use efficiency of the resources.

For example, movement of the UE that performs unicast communication or groupcast communication sometimes causes the target UE to move out of a coverage of the source UE. In such a case, the communication between the peer UEs cannot be performed. The resources remain reserved until the UE reselects resources.

The UE senses and selects the resources in configuring the resources. Here, the resources reserved by other UEs sometimes cannot be used. Thus, reserving unnecessary resources reduces the use efficiency of the resources. Here, a method for solving such a problem is disclosed.

The source UE determines that the target UE has moved out of the coverage of the source UE when the source UE cannot receive a predetermined signal/channel or signaling from the target UE for a predetermined time (a predetermined number of times). The following six examples of the predetermined signal/channel or signaling are disclosed.

(1) Feedback: the feedback may be HARQ feedback.
(2) The CSI
(3) The PSSCH
(4) The RSs: the RSs include the SRS, the DMRS, and the PTRS.
(5) The response signaling from the target UE to the source UE
(6) Combinations of (1) to (5) above The predetermined signal/channel or signaling should be cyclically transmitted. The predetermined signal/channel or signaling may be cyclically transmitted for a predetermined period. Consequently, the source UE can determine that the target UE has moved out of the coverage of the source UE.

A processing method when the source UE determines that the target UE has moved out of the coverage is disclosed. The UE does not transmit the SCI including the resource scheduling information for initial transmission and/or retransmission. The UE need not transmit the PSCCH with the resources reserved next. Since other UEs cannot receive the PSCCH or the SCI in sensing the resources, they recognize that the reserved resources are not used.

The UEs that have recognized that the reserved resources are not used can select the resources as candidates for resources to be reserved in sensing the resources. Since other UEs can use the resources, the use efficiency of the resources can be increased.

Another method is disclosed. Information indicating the absence of new transmission is provided. The UE having no new transmission data includes information indicating the absence of new transmission in the SCI for resource scheduling information for initial transmission and/or retransmission, and notifies the information. The UE may notify the absence of new transmission in the PSCCH with the resources reserved next. Other UEs check whether the PSCCH or the SCI includes the information indicating the absence of new transmission in sensing the resources, and recognize that the reserved resources are not used when the PSCCH or the SCI includes the information. Since other UEs can use the resources, the use efficiency of the resources can be increased.

Consequently, the use efficiency of the resources when the target UE has moved out of the coverage of the source UE can be increased.

When the target UE has moved out of the coverage of the source UE, the source UE may reset the configuration for the unicast communication that has been performed with the target UE. When only the unicast communication is performed through the unicast connection, the unicast communication may be terminated. The configuration in the unicast connection may be reset. Consequently, the radio resources in the source UE can be released to the other services or communication.

A method for the target UE to determine whether the target UE has moved out of the coverage of the source UE is disclosed. The target UE determines that the target UE has moved out of a transmission coverage when the target UE cannot receive a predetermined signal/channel or signaling from the source UE for a predetermined period (a predetermined number of times). The following four examples of the predetermined signal/channel or signaling are disclosed.

(1) The PSCCH
(2) The PSSCH
(3) The RSs: the RSs include the DMRS, the CSI-RS, and the PTRS.
(4) Combinations of (1) to (3) above The predetermined signal/channel or signaling should be cyclically transmitted. The predetermined signal/channel or signaling may be cyclically transmitted for a predetermined period. Consequently, the target UE can determine that the target UE has moved out of the coverage of the source UE.

The aforementioned method, specifically, the processing method when the source UE determines that the target UE has moved out of the coverage of the source UE may be applied to a processing method when the target UE determines that the target UE has moved out of the coverage of the source UE. The method may be applied when the target UE configures the resources.

Furthermore, when the target UE has moved out of the coverage of the source UE, the target UE may reset the configuration for the unicast communication that has been performed with the source UE. When only the unicast communication is performed through the unicast connection, the unicast communication may be terminated. The configuration in the unicast connection may be reset. Consequently, the radio resources in the target UE can be released to the other services or communication.

The source UE and/or target UE may notify the gNB that the reserved resources are not used, in the disclosed methods. The source UE and/or target UE may notify the gNB that the resources are released. For example, application of the notification to the scheduling of the gNB enables the gNB to use the resources that are not used, for scheduling of other UEs. This can increase the use efficiency of the resources.

The third embodiment to the fifth embodiment describe performing retransmission in the SL, in the unicast communication in the SL. When the communication quality between the UEs in the SL continues to be poor, a problem of failing to perform retransmission in the SL occurs. A method for solving such a problem is disclosed.

The retransmission data is transmitted via the Uu. The UE transmits the retransmission data to the gNB, and the gNB transmits the retransmission data to the target UE that is a transmission destination of the retransmission data. The method may be applied to the retransmission of the HARQ feedback. For example, the retransmission data should be switched from the PC5 to the Uu, in a protocol in which the HARQ processes are performed. The aforementioned method may be applied to the RLC retransmission. For example, the retransmission data should be switched from the PC5 to the Uu, in a protocol in which the RLC retransmission is performed. The method may be applied to retransmission of packet data. For example, the retransmission data should be switched from the PC5 to the Uu in the PDCP protocol.

The UE that transmits the retransmission data may evaluate a communication quality state in the SL, and switch the retransmission data from the PC5 to the Uu when the communication quality state in the SL is poorer than a predetermined threshold continuously for a predetermined period. This enables the V2V communication via the Uu even when the poor communication quality in the SL is continued.

The embodiments and the modifications are mere exemplifications of the present invention, and can be freely combined within the scope of the present invention. The arbitrary constituent elements of the embodiments and the modifications can be appropriately modified or omitted.

For example, a subframe in the embodiments and the modifications is an example time unit of communication in the fifth generation base station communication system. The subframe may be configured per scheduling. The processes described in the embodiments and the modifications as being performed per subframe may be performed per TTI, per slot, per sub-slot, or per mini-slot.

While the invention is described in detail, the foregoing description is in all aspects illustrative and does not restrict the present invention. Therefore, numerous modifications and variations that have not yet been exemplified are devised without departing from the scope of the present invention.

DESCRIPTION OF REFERENCES 200 communication system, 202 communication terminal device, 203 base station device.

The invention claimed is:

1. A user apparatus in a communication system, the communication system comprising:

a plurality of user apparatuses including the user apparatus, and configured to communicate with each other in a sidelink; and a base station configured to wirelessly communicate with each of the user apparatuses, wherein the user apparatus is configured to:

transmit, to another user apparatus of the plurality of user apparatuses, a request signaling for requesting a setting related to resources for unicast communication in the sidelink, the request signaling including first information on a priority;

receive, from the another user apparatus, second information on the setting related to resources for unicast communication;

perform received power measurement based on threshold set for each resource use; and configure the resources for transmission by using the second information and excluding, based on the measurement, a first transmission resource and a retransmission resource from resource candidates for the unicast communication in an autonomous resource selection.

2. The user apparatus according to claim 1, wherein the resources are resources for data transmission.

3. The user apparatus according to claim 2, wherein the resources for data transmission include resources for a first transmission data and a retransmission data.

4. The user apparatus according to claim 1, wherein the resources are resources for channel state information (CSI) reporting.

5. The user apparatus according to claim 1, wherein the setting includes at least any of resource sensing, transmission resource selection, and transmission resource reservation.

6. The user apparatus according to claim 1, wherein the user apparatus transmits a control signal, a channel, or a signaling for starting connection establishment prior to the unicast communication.

7. The user apparatus according to claim 1, wherein the user apparatus decides, according to a transmission data type, whether or not to perform the setting related to the resources.

8. The user apparatus according to claim 1, wherein the user apparatus associates a data with an HARQ feedback resource.

9. The user apparatus according to claim 1, wherein the user apparatus evaluates a channel occupied ratio (CR) that indicates a ratio of used resources used for first transmission and retransmission.

10. The user apparatus according to claim 1, wherein the first information is a ProSe Per-Packet Priority (PPPP).

11. A communication system comprising:

a plurality of user apparatuses including the user apparatus, and configured to communicate with each other in a sidelink; and a base station configured to wirelessly communicate with each of the user apparatuses, wherein user apparatus is configured to:

transmit, to another user apparatus of the plurality of user apparatuses, a request signaling for requesting a setting related to resources for unicast communication in the sidelink, the request signaling including first information on a priority;

receive, from the another user apparatus, second information on the setting related to resources for unicast communication;

perform received power measurement based on threshold set for each resource use; and configure the resources for transmission by using the second information and excluding, based on the measurement, a first transmission resource and a retransmission resource from resource candidates for the unicast communication in an autonomous resource selection.

* * * * *